(12) United States Patent
Weinberg et al.

(10) Patent No.: US 10,520,331 B2
(45) Date of Patent: Dec. 31, 2019

(54) CALIBRATION SYSTEM AND METHOD FOR WHOLE ANGLE GYROSCOPE

(71) Applicant: THE CHARLES STARK DRAPER LABORATORY, INC., Cambridge, MA (US)

(72) Inventors: Marc Steven Weinberg, Needham, MA (US); Ralph Cohn, Brookline, MA (US); Eugene H. Cook, Acton, MA (US)

(73) Assignee: THE CHARLES STARK DRAPER LABORATORY, INC., Cambridge, MA (US)

( * ) Notice: Subject to any disclaimer, the term of this patent is extended or adjusted under 35 U.S.C. 154(b) by 117 days.

(21) Appl. No.: 15/906,177

(22) Filed: Feb. 27, 2018

(65) Prior Publication Data
US 2018/0245946 A1     Aug. 30, 2018

Related U.S. Application Data

(60) Provisional application No. 62/464,275, filed on Feb. 27, 2017.

(51) Int. Cl.
| | |
|---|---|
| *G01C 25/00* | (2006.01) |
| *G01C 19/5776* | (2012.01) |
| *G01C 19/5684* | (2012.01) |

(52) U.S. Cl.
CPC ......... *G01C 25/00* (2013.01); *G01C 19/5684* (2013.01); *G01C 19/5776* (2013.01); *G01C 25/005* (2013.01)

(58) Field of Classification Search
CPC .. G01C 25/00; G01C 25/005; G01C 19/5684; G01C 19/5776
See application file for complete search history.

(56) References Cited

U.S. PATENT DOCUMENTS

| | | | | |
|---|---|---|---|---|
| 6,805,007 | B2 * | 10/2004 | Fell | G01C 19/5691 73/504.12 |
| 7,318,347 | B2 | 1/2008 | Lynch et al. | |
| 8,322,213 | B2 | 12/2012 | Trusov et al. | |
| 10,365,102 | B1 * | 7/2019 | Challoner | G01C 19/5677 |

(Continued)

OTHER PUBLICATIONS

Notification of Transmittal of the International Search Report and the Written Opinion of the International Searching Authority from corresponding PCT/US2018/019916 dated May 30, 2018.

(Continued)

*Primary Examiner* — Jamel E Williams
(74) *Attorney, Agent, or Firm* — Lando & Anastasi, LLP

(57) ABSTRACT

According to one aspect, embodiments herein provide a whole angle gyroscope comprising a central point, at least one mass arranged symmetrically about the central point, a plurality of transducers, each configured to perform at least one of driving and sensing motion of the at least one mass, and a processor coupled to the plurality of transducers, the processor configured to operate the plurality of transducers to drive the at least one mass in at least a first vibratory mode and a second vibratory mode, identify a rate dead zone of the whole angle gyroscope, and operate the plurality of transducers to apply a force to the at least one mass to reduce the identified rate dead zone of the whole angle gyroscope.

20 Claims, 34 Drawing Sheets

(56) References Cited

U.S. PATENT DOCUMENTS

2016/0341551 A1* 11/2016 Cook ................. G01C 19/5726
2016/0341552 A1* 11/2016 Kub .................. G01C 19/5684

OTHER PUBLICATIONS

Bryan, G. H., "On the Beats in the Vibrations of a Revolving Cylinder or Bell," Proceedings of the Philosophical Society, vol. VII, 1890, p. 101-111.

Friedland, B. et al., "Theory and Error Analysis of Vibrating-Member Gyroscope," IEEE Transactions on Automatic Control, vol. AC-23, No. 4, Aug. 1978, pp. 545-556.

Lynch, D. D., "Vibratory Gyro Analysis by Method of Averaging," in Second St. Petersburg Conference on Gyroscope Technology and Navigation, St. Petersburg, Russia, 1995, pp. 26-34.

Painter, C. C. et al., "Active Structural Error Suppression in MEMS Vibratory Gyroscopes," IEEE Sensors Journal, vol. 3, No. 5, Oct. 2003. pp. 595-606.

Painter, C. et al., "Experimental Evaluation of a Control System for an Absolute Angle Measuring Micromachined Gyroscope," IEEE Sensors Conf., Irvine, CA, Oct. 20-Nov. 3, 2005, pp. 1084-1087.

Ragout, V. et al., "A New Control Model for Axisymmetrical Vibrating Gyroscopes, Greatly Improving Performance," 18th Saint Petersburg International Conference on Integrated Navigations Systems, May 30-Jun. 1, p. 86-98.

Taheri-Tehrani, P. et al., "A New Electronic Feedback Compensation Method for Rate Integrating Gyroscopes," 2016 IEEE Inertial Sensors and System Symposium, Laguna Beach, CA, Feb. 22-25, 2016.

Taheri-Tehrani, P. et al., "Disk Resonator Gyroscope with Whole-Angle Mode Operation," in IEEE International Symposium on Inertial Sensors and Systems, Hapuna Beach, HI, 2015.

* cited by examiner

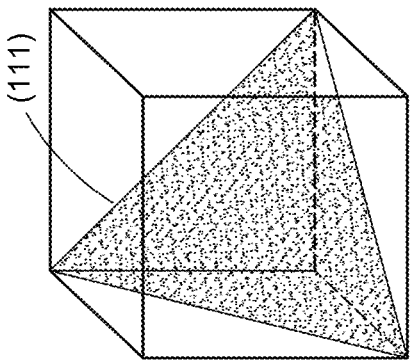
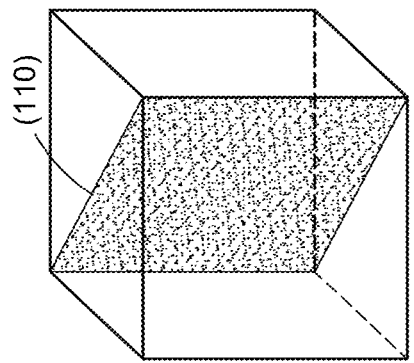
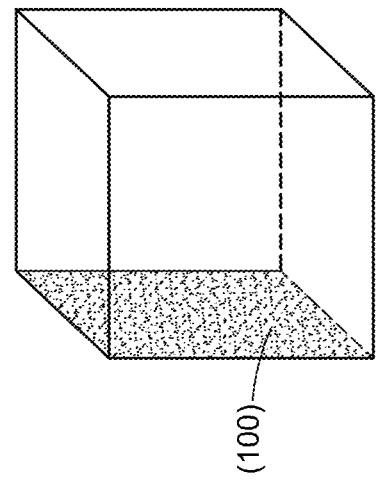
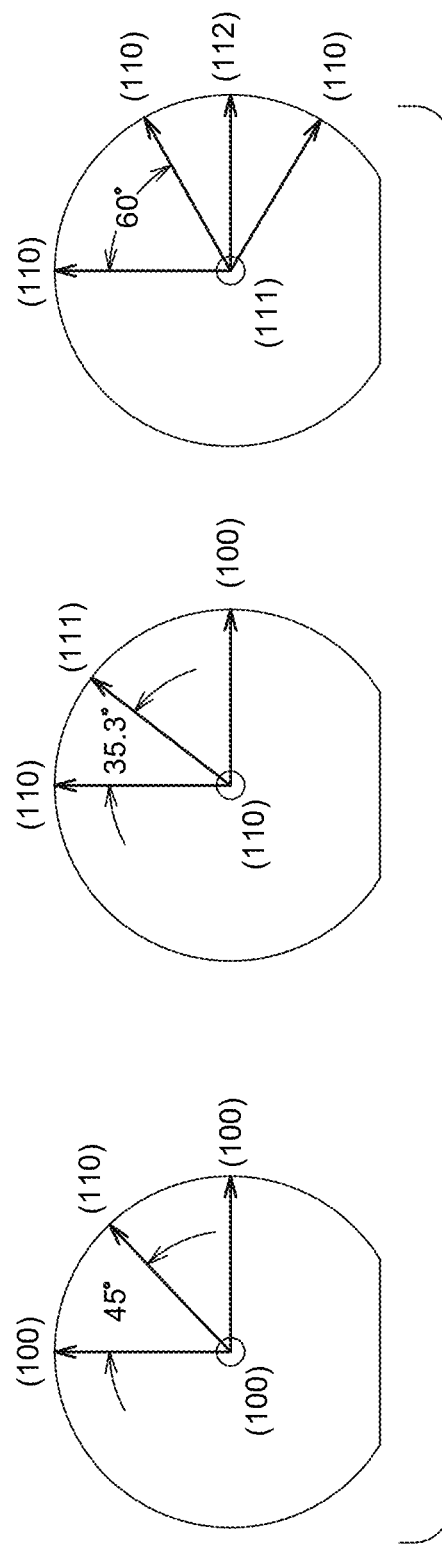
FIG. 5B

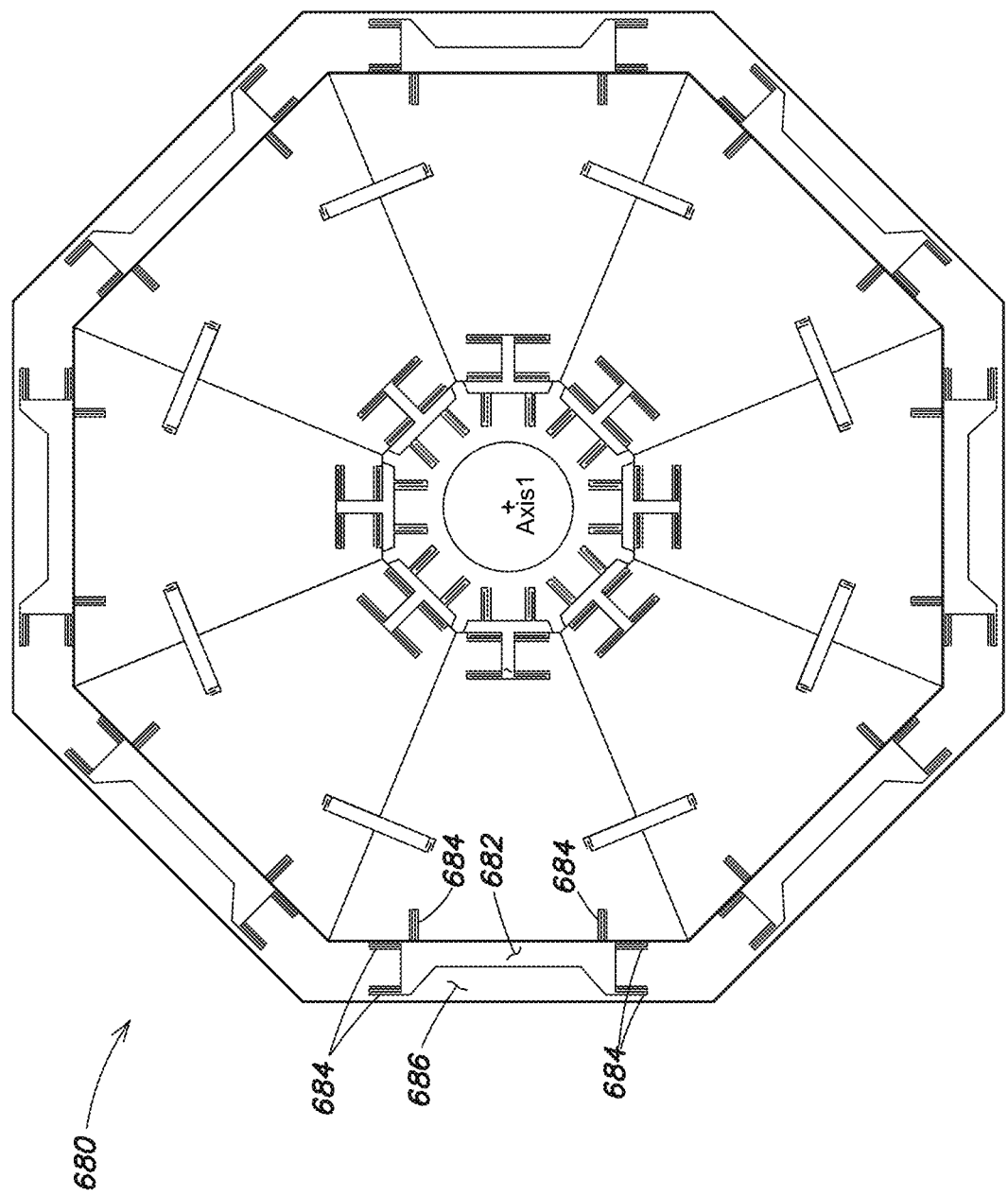

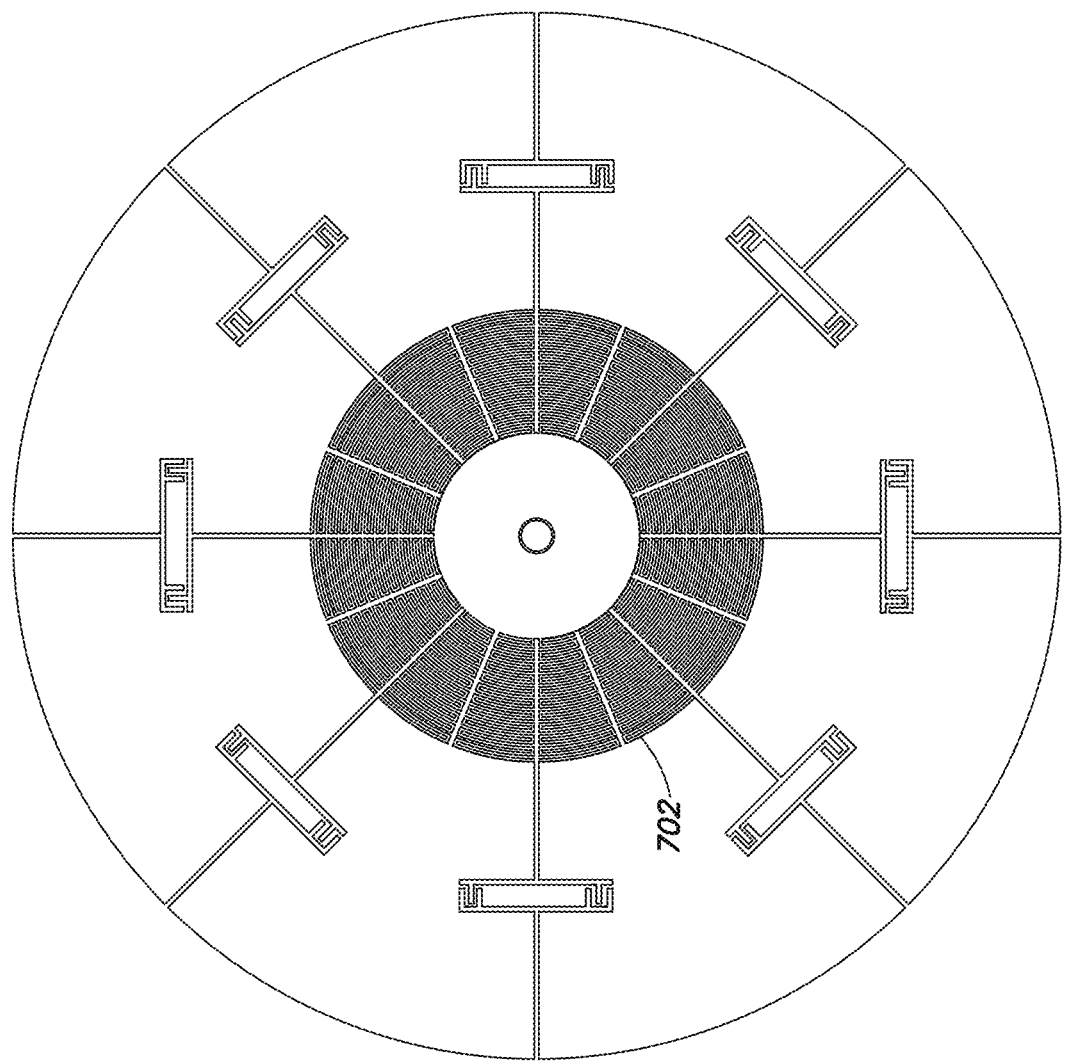

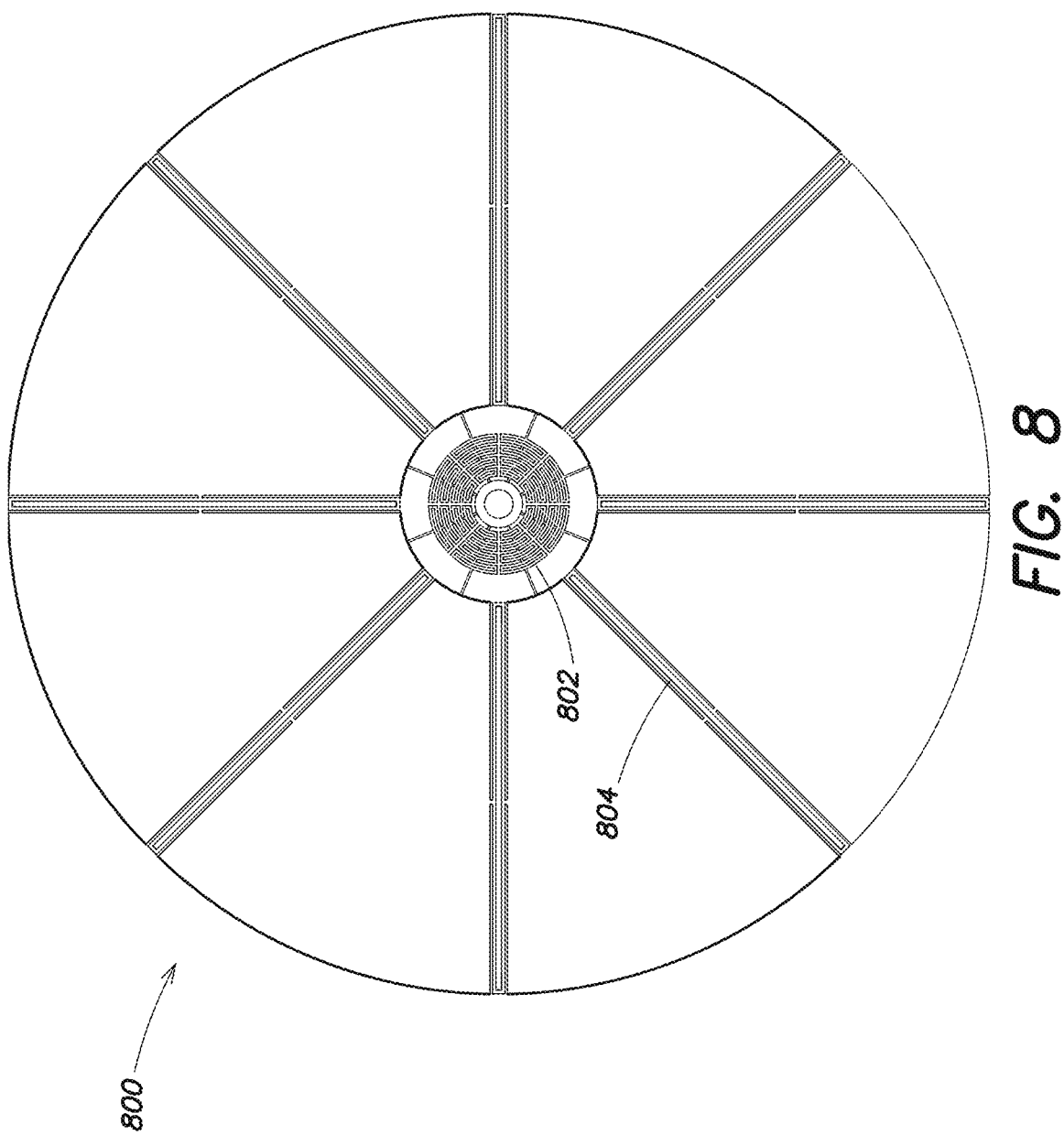

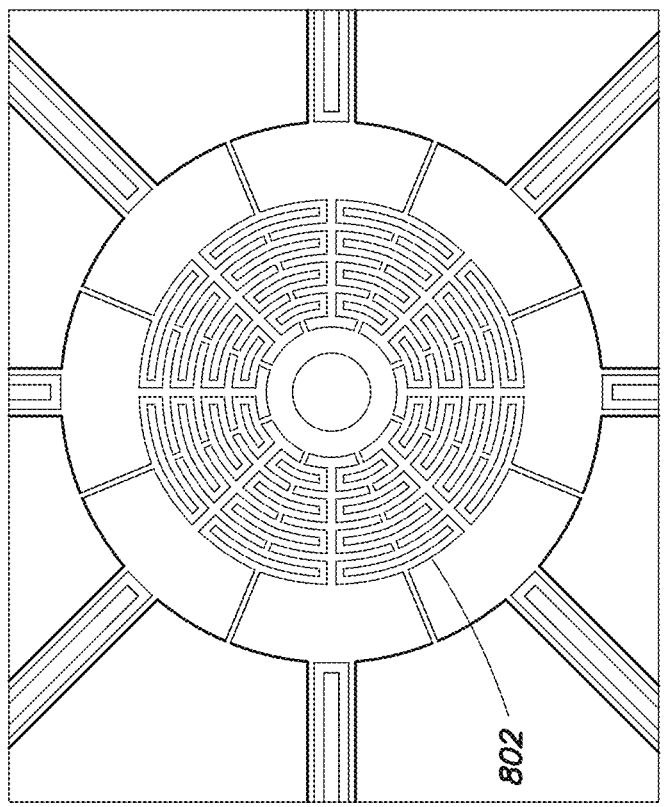

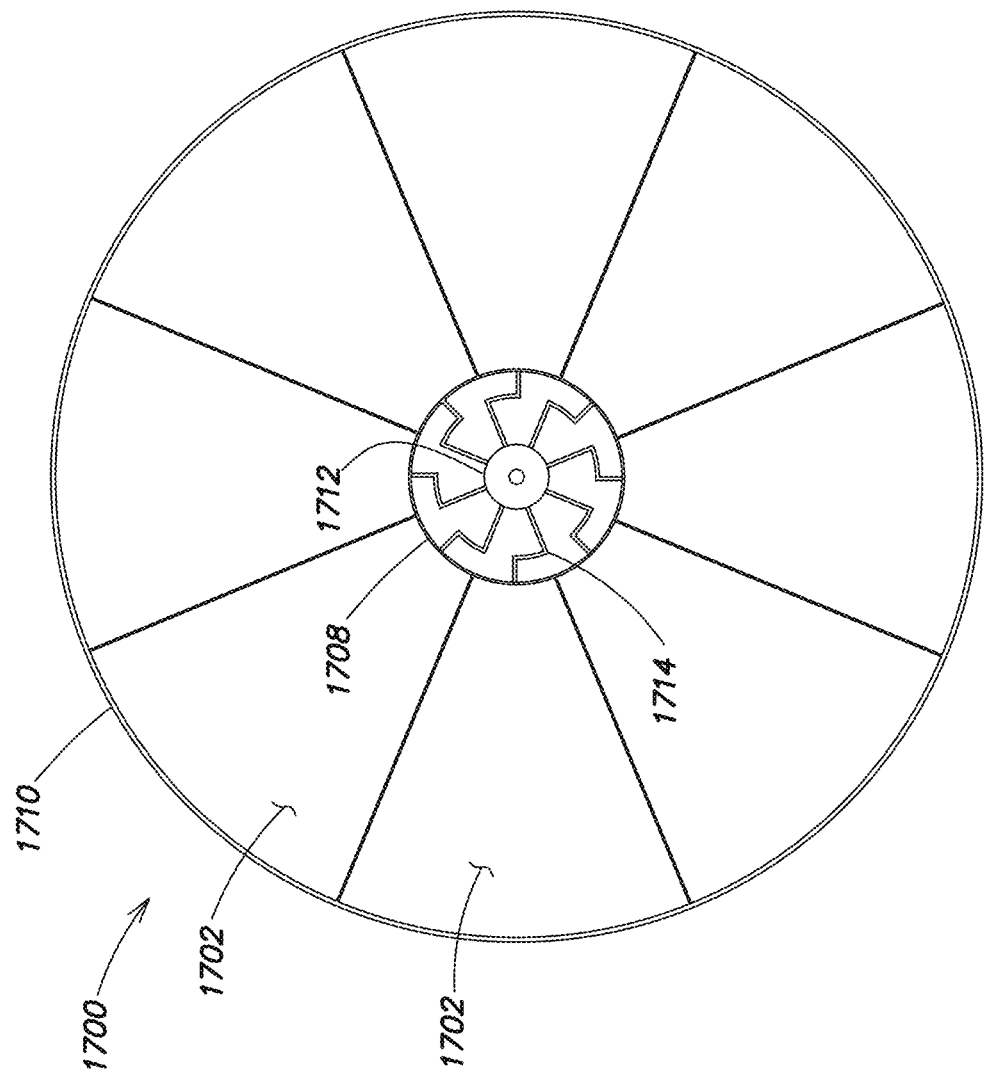

CALIBRATION SYSTEM AND METHOD FOR WHOLE ANGLE GYROSCOPE

CROSS REFERENCE TO RELATED APPLICATION

This application claims priority to U.S. Provisional Patent Application No. 62/464,275 filed Feb. 27, 2017, entitled CALIBRATION SYSTEM AND METHOD FOR WHOLE ANGLE GYROSCOPE, which is incorporated by reference herein in its entirety.

BACKGROUND OF THE INVENTION

The present disclosure generally relates to vibrating structure gyroscopes and more specifically to Microelectromechanical System (MEMS) based vibrating structure gyroscopes. Vibrating structure gyroscopes utilize solid-state resonators, of different shapes, to measure orientation or rotation rate based on the principle that a vibrating object tends to continue vibrating (i.e., oscillate) in a fixed orientation in space as its support rotates, and any vibrational deviation of the object can be used to derive a change in direction. Vibrating structure gyroscopes may be manufactured with MEMS based technology. For example, vibrating structure gyroscopes may be fabricated on silicon or glass wafers using a sequence of steps including photolithography, etching and deposition, or any other MEMS based technology.

Vibrational deviations in a resonator of a MEMS based gyroscope may be caused by a Coriolis force. For example, a mass moving at a given velocity will experience Coriolis acceleration when the mass is also rotated with an angular velocity. The Coriolis acceleration is perpendicular to the velocity and the angular velocity. The Coriolis acceleration vector is given by $a_c=-2(v\times\Omega)$, where v is the velocity vector and $\Omega$ is the angular velocity vector. Coriolis acceleration is thus indicative of the angular velocity of rotation.

Many MEMS based gyroscopes are configured to operate in a rate mode. In a rate mode of operation, vibration of one axis (i.e., a drive axis) of a MEMS based gyroscope is driven at a fixed amplitude in a closed loop while Coriolis-induced motion is read out on the other axis (i.e., a sense axis). In such a rate mode, the amplitude of the Coriolis-induced motion read out on the sense axis is indicative of a rate of angular movement of the gyroscope. Rate mode operated gyroscopes are limited in that the Coriolis-induced motion measurements are limited by the dynamic range of the open-loop sense axis. For fast movements of the gyroscope, the open-loop sense axis may not be able to "keep up" with the movement of the gyroscope. For example, because of the filtering required for demodulation, the gyroscope has limited bandwidth and may not be able to "keep up" with high frequency inputs.

In addition, spring non-linearities at high rates of rotation may cause errors. Some MEMS based gyroscopes operated in rate mode attempt to avoid these problems by also operating the sense axis in a closed loop and monitoring the level of force required to maintain the amplitude of the sense axis at a fixed level. However, such gyroscopes are limited by the closed sense loop bandwidth and the maximum force capable of being exerted by the rebalance.

One example of a MEMS based gyroscope configured to operate in a rate mode is a Tuning Fork (TF) gyroscope. A Tuning Fork gyroscope includes a pair of relatively large lumped-element proof masses that are driven to oscillate, in an in-plane axis, with equal amplitude but in opposite directions. When a TF gyroscope is rotated, the Coriolis force creates an orthogonal vibration (i.e., an out-of-plane vibration) in the proof masses that can be sensed by a variety of mechanisms. By monitoring out-of-plane vibrations of the proof masses, the rate of rotation of the TF gyroscope can be determined.

Another mode of operation for MEMS based gyroscopes is a whole angle mode (otherwise known as an integrating or rate integrating mode). In a whole angle mode of operation, two axes, having identical frequency and damping, are coupled by Coriolis motion. In at least one example, the two axes have control loops and calibration that result in the two axes being nearly identical. The axes are driven such that the total vibrational amplitude of the two axes is sustained, but the distribution of energy between the two axes is allowed to change freely. Accordingly, a Coriolis force causes energy to be transferred from one axis to the other as the gyroscope rotates. By measuring the distribution of energy between the axes, an angle of rotation (with respect to a starting angle) can be read out. As energy can freely transfer from one axis to the other in a MEMS based gyroscope operating in whole angle mode, there is no limit on the rate at which the axes can transfer motion. As such, whole angle operating gyroscopes avoid the dynamic range issues discussed above with regard to rate mode operating gyroscopes and typically provide a higher level of performance and higher bias stability.

SUMMARY

A new calibration system and method for a whole angle gyroscope is provided. The calibration system and method includes a processor/controller that is configured to model motion of a whole angle gyroscope, calculate a rate "dead zone" of the whole angle gyroscope, and calibrate coefficients of the modeled motion to reduce the calculated rate "dead zone". More specifically, the processor calibrates the coefficients of its gyroscope motion model such that the processor operates corresponding transducers to apply forces to the gyroscope to reduce (or even eliminate) the rate "dead zone". By reducing the rate "dead zone" of the gyroscope, the processor can more accurately monitor the motion of the gyroscope.

One aspect of the present disclosure is directed to a whole angle gyroscope comprising a central anchor, a plurality of internal flexures, a plurality of masses, each mass coupled to the central anchor via at least one of the plurality of internal flexures and configured to translate in a plane of the gyroscope, a plurality of mass-to-mass couplers, each mass-to-mass coupler coupled between two adjacent masses of the plurality of masses, a plurality of transducers, each configured to perform at least one of driving and sensing motion of a corresponding one of the plurality of masses, and a processor coupled to the plurality of transducers, the processor configured to operate the plurality of transducers to drive the plurality of masses in at least a first vibratory mode and a second vibratory mode calculate a rate dead zone of the whole angle gyroscope, and operate the plurality of transducers to apply a force to the plurality of masses to reduce the calculated rate dead zone of the gyroscope.

According to one embodiment, in calculating the rate dead zone of the whole angle gyroscope, the processor is further configured to generate a motion model of the gyroscope and calculate the rate dead zone based on the motion model. In one embodiment, in operating the plurality of transducers to apply the force to the plurality of masses, the processor is further configured to calibrate coefficients of the motion model to operate the plurality of transducers to apply the force to the plurality of masses.

According to another embodiment, each transducer is located at a periphery of the corresponding one of the plurality of masses. In one embodiment, the processor is further configured to operate the plurality of transducers to drive the plurality of masses in an n=2 vibratory mode. In another embodiment, the processor is further configured to operate the plurality of transducers to drive motion of the plurality of masses such that a total vibrational energy is maintained across the first vibratory mode and the second vibratory mode and to sense a distribution of energy between the first vibratory mode and the second vibratory mode. In one embodiment, the plurality of transducers is further configured to provide signals to the processor based on the sensed distribution of motion between the first vibratory mode and the second vibratory mode, and the processor is further configured to calculate an angle of rotation of the gyroscope based on the signals.

According to one embodiment, each mass-to-mass coupler includes a bar coupled to each adjacent mass via a flexural hinge, wherein the bar is configured to operate such that circumferential motion of one of the two adjacent masses of the plurality of masses to which it is coupled depends on radial motion of the other one of the two adjacent masses.

According to another embodiment, the whole angle gyroscope further comprises a plurality of outside anchors, a plurality of outside shuttles, each located at a periphery of a corresponding one of the plurality of masses, and a plurality of outside flexures, wherein each mass of the plurality of masses is suspended between the central anchor and the plurality of outside anchors via the plurality of internal flexures and the plurality of outside flexures, and wherein each one of the plurality of outside shuttles is configured to restrict rotation of its corresponding one of the plurality of masses.

According to one embodiment, the whole angle gyroscope further comprises a plurality of internal shuttles, each one of the plurality of internal shuttles coupled between the central anchor and a corresponding one of the plurality of masses and configured to restrict rotation of its corresponding one of the plurality of masses. In one embodiment, the whole angle gyroscope further comprises a plurality of angled electrodes, each angled electrode coupled to a corresponding one of the plurality of masses and configured to trim the cross spring term of the corresponding one of the plurality of masses. In another embodiment, the whole angle gyroscope is a Microelectromechanical System (MEMS) based gyroscope.

Another aspect of the present disclosure is directed to a whole angle gyroscope comprising at least one mass, a plurality of transducers, each configured to perform at least one of driving and sensing motion of the at least one mass, and a processor coupled to the plurality of transducers, the processor configured to operate the plurality of transducers to drive the at least one mass in at least a first vibratory mode and a second vibratory mode, calculate a rate dead zone of the whole angle gyroscope, and operate the plurality of transducers to apply a force to the at least one mass to reduce the calculated rate dead zone of the gyroscope.

At least one aspect of the present disclosure is directed to a gyroscope comprising a central anchor, a plurality of internal flexures, a plurality of masses, each mass coupled to the central anchor via at least one of the plurality of internal flexures and configured to translate in a plane of the gyroscope, and a plurality of mass-to-mass couplers, each mass-to-mass coupler coupled between two adjacent masses of the plurality of masses, and a plurality of transducers, each configured to perform at least one of driving and sensing motion of a corresponding one of the plurality of masses, wherein the plurality of transducers is configured to drive the plurality of masses in at least a first vibratory mode and a second vibratory mode.

According to one embodiment, each transducer is located at a periphery of the corresponding one of the plurality of masses. In another embodiment, at least one transducer is configured to electrostatically drive motion of its corresponding one of the plurality of masses. In one embodiment, at least one transducer is configured to magnetically drive motion of its corresponding one of the plurality of masses. In another embodiment, at least one transducer is configured to optically drive motion of its corresponding one of the plurality of masses. In one embodiment, at least one transducer is configured to piezoelectrically drive motion of its corresponding one of the plurality of masses. In another embodiment, at least one transducer is configured to thermally drive motion of its corresponding one of the plurality of masses.

According to another embodiment, the plurality of transducers is further configured to drive the plurality of masses in an n=2 vibratory mode. In one embodiment, the first vibratory mode and the second vibratory mode are 45° apart. In another embodiment, the plurality of transducers is further configured to drive motion of the plurality of masses at a fixed amplitude in the first vibratory mode and to sense motion of the plurality of masses in the second vibratory mode. In one embodiment, the gyroscope further comprises a controller coupled to the plurality of transducers, wherein the plurality of transducers is further configured to provide signals to the controller based on the sensed motion of the plurality of masses in the second vibratory mode, and wherein the controller is configured to calculate a rate of rotation of the gyroscope based on the signals.

According to one embodiment, the plurality of transducers is further configured to drive motion of the plurality of masses such that a total vibrational energy is maintained across the first vibratory mode and the second vibratory mode and to sense a distribution of energy between the first vibratory mode and the second vibratory mode. In another embodiment, the gyroscope further comprises a controller coupled to the plurality of transducers, wherein the plurality of transducers is further configured to provide signals to the controller based on the sensed distribution of motion between the first vibratory mode and the second vibratory mode, and wherein the controller is configured to calculate an angle of rotation of the gyroscope based on the signals.

According to another embodiment, each mass-to-mass coupler includes a bar coupled to each adjacent mass via a flexural hinge, wherein the bar is configured to operate such that circumferential motion of one of the two adjacent masses of the plurality of masses to which it is coupled depends on radial motion of the other one of the two adjacent masses.

According to one embodiment, the gyroscope further comprises a plurality of outside anchors, a plurality of outside shuttles, each located at a periphery of a corresponding one of the plurality of masses, and a plurality of outside flexures, wherein each mass of the plurality of masses is suspended between the central anchor and the plurality of outside anchors via the plurality of internal flexures and the plurality of outside flexures, and wherein each one of the plurality of outside shuttles is configured to restrict rotation of its corresponding one of the plurality of masses. In one embodiment, each one of the plurality of outside shuttles is further configured to decouple x- and y-motion of its corresponding one of the plurality of masses. In another embodiment, each one of the plurality of outside shuttle is further configured to prevent force from being applied circumferentially to its corresponding one of the plurality of masses.

According to another embodiment, the gyroscope further comprises a plurality of internal shuttles, each one of the plurality of internal shuttles coupled between the central anchor and a corresponding one of the plurality of masses and configured to restrict rotation of its corresponding one of the plurality of masses. In one embodiment, each one of the plurality of internal shuttles is further configured to decouple x- and y-motion of its corresponding one of the plurality of masses.

According to one embodiment, the gyroscope further comprises a plurality of angled electrodes, each angled electrode coupled to a corresponding one of the plurality of masses and configured to trim the cross spring term of the corresponding one of the plurality of masses. In one embodiment, in trimming the cross spring term of its corresponding one of the plurality of masses, each angled electrode is configured to generate a radial force component in the second vibratory mode in response to a circumferential motion of its corresponding one of the plurality of masses in the first vibratory mode, and generate a circumferential force component in the second vibratory mode in response to a radial motion of its corresponding one of the plurality of masses in the first vibratory mode, wherein the radial force component and the circumferential force component are configured to either assist or oppose the vibration of the plurality of masses in the second vibratory mode to trim the cross spring term.

According to another embodiment, the gyroscope is implemented on a cubic crystal based substrate having a (100) direction plane and a (110) direction plane, and wherein at least one of the plurality of internal flexures is oriented equidistant from the (100) direction plane and the (110) direction plane. In one embodiment, the at least one of the plurality of internal flexures is oriented 22.5° from the (100) direction and the (110) direction. In another embodiment, the cubic crystal-based substrate is a Silicon (Si) based substrate.

According to one embodiment, the plurality of masses includes a plurality of wedge-shaped masses. In another embodiment, the plurality of masses is arranged symmetrically about the central anchor. In one embodiment, the gyroscope has a thickness, and the plurality of internal flexures includes flexures having a width that is at least five times narrower than the thickness of the gyroscope. In another embodiment, the gyroscope is a Microelectromechanical System (MEMS) based gyroscope.

Another aspect of the present disclosure is directed to a gyroscope comprising a central anchor, a plurality of internal flexures, a plurality of masses, each mass coupled to the central anchor via one of the plurality of internal flexures and configured to translate in a plane of the gyroscope, means for driving the plurality of masses in a vibratory mode emulating the n=2 vibratory mode of a rotationally symmetric gyroscope, and means for operating the gyroscope in one of a rate mode of operation and a whole angle mode of operation.

According to one embodiment, the gyroscope further comprises means for decoupling radial and circumferential motion of each one of the plurality of masses. In another embodiment, the gyroscope further comprises means for trimming a cross spring term of the gyroscope.

One aspect of the present disclosure is directed to a whole angle gyroscope comprising a central point, at least one mass arranged symmetrically about the central point, a plurality of transducers, each configured to perform at least one of driving and sensing motion of the at least one mass, and a processor coupled to the plurality of transducers, the processor configured to operate the plurality of transducers to drive the at least one mass in at least a first vibratory mode and a second vibratory mode, identify a rate dead zone of the whole angle gyroscope, and operate the plurality of transducers to apply a force to the at least one mass to reduce the identified rate dead zone of the whole angle gyroscope.

According to one embodiment, in identifying the rate dead zone of the whole angle gyroscope, the processor is further configured to generate a motion model of the whole angle gyroscope and identify the rate dead zone based on the motion model. In one embodiment, in operating the plurality of transducers to apply the force to the at least one mass, the processor is further configured to calibrate coefficients of the motion model to operate the plurality of transducers to apply the force to the at least one mass. In another embodiment, in calibrating the coefficients of the motion model, the processor is further configured to perform multiple iterations of the coefficient calibration. In one embodiment, the processor is a Field Programmable Gate Array (FPGA). In another embodiment, each transducer is located at a periphery of the at least one mass.

According to another embodiment, the processor is further configured to operate the plurality of transducers to drive the at least one mass in an n=2 vibratory mode. In one embodiment, the processor is further configured to operate the plurality of transducers to drive motion of the at least one mass such that a total vibrational energy is maintained across the first vibratory mode and the second vibratory mode and to sense a distribution of energy between the first vibratory mode and the second vibratory mode. In another embodiment, the plurality of transducers is further configured to provide signals to the processor based on the sensed distribution of motion between the first vibratory mode and the second vibratory mode, and the processor is further configured to calculate an angle of rotation of the whole angle gyroscope based on the signals.

According to one embodiment, the at least one mass comprises a plurality of masses, the central point comprises a central anchor, the whole angle gyroscope further comprises a plurality of internal flexures, wherein each mass of the plurality of masses is coupled to the central anchor via at least one of the plurality of internal flexures and is configured to translate in a plane of the whole angle gyroscope, a plurality of mass-to-mass couplers, each mass-to-mass coupler coupled between two adjacent masses of the plurality of masses, and a plurality of transducers, each configured to perform at least one of driving and sensing motion of a corresponding one of the plurality of masses, and wherein the processor is further configured to operate the plurality of transducers to drive the plurality of masses in at least the first vibratory mode and the second vibratory mode, and operate the plurality of transducers to apply the force to the plurality of masses to reduce the identified rate dead zone of the whole angle gyroscope.

According to another embodiment, each mass-to-mass coupler includes a bar coupled to each adjacent mass via a flexural hinge, wherein the bar is configured to operate such that circumferential motion of one of the two adjacent masses of the plurality of masses to which it is coupled depends on radial motion of the other one of the two adjacent masses. In one embodiment, the whole angle gyroscope further comprises a plurality of outside anchors, a plurality of outside shuttles, each located at a periphery of a corresponding one of the plurality of masses, and a plurality of outside flexures, wherein each mass of the plurality of masses is suspended between the central anchor and the plurality of outside anchors via the plurality of internal flexures and the plurality of outside flexures, and wherein each one of the plurality of outside shuttles is configured to restrict rotation of its corresponding one of the plurality of masses. In another embodiment, the whole angle gyroscope further comprises a plurality of internal shuttles, each one of the plurality of internal shuttles coupled between the central anchor and a corresponding one of the plurality of masses and configured to restrict rotation of its corresponding one of the plurality of masses.

According to one embodiment, the whole angle gyroscope further comprises a plurality of angled electrodes, each angled electrode coupled to a corresponding one of the plurality of masses and configured to trim the cross spring term of the corresponding one of the plurality of masses. In one embodiment, the whole angle gyroscope is a Microelectromechanical System (MEMS) based gyroscope.

Another aspect of the present disclosure is directed to a method of operating a whole angle gyroscope comprising a central point, at least one mass arranged symmetrically about the central point, and a plurality of transducers, each configured to perform at least one of driving and sensing motion of the at least one mass, wherein the method comprises driving, with the plurality of transducers, the at least one mass in at least a first vibratory mode and a second vibratory mode, identifying a rate dead zone of the whole angle gyroscope, and applying, with the plurality of transducers, a force to the at least one mass to reduce the identified rate dead zone of the whole angle gyroscope.

According to one embodiment, identifying the rate dead zone comprises generating a motion model of the whole angle gyroscope and identifying the rate dead zone based on the motion model. In one embodiment, applying the force to the at least one mass comprises calibrating coefficients of the motion model to operate the plurality of transducers to apply the force to the at least one mass. In another embodiment, calibrating the coefficients of the motion model comprises performing multiple iterations of the coefficient calibration.

At least one aspect of the present disclosure is directed to a whole angle gyroscope comprising a central point, at least one mass arranged symmetrically about the central point, a plurality of transducers, each configured to perform at least one of driving and sensing motion of the at least one mass, and means for driving the at least one mass in an n=2 vibratory mode, for identifying an angle of rotation of the whole angle gyroscope, and for reducing a rate dead zone of the whole angle gyroscope.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures:

FIG. 5B is a diagram illustrating directional planes of a cubic crystal structure according to aspects of the present invention;

FIG. 6F is a diagram of another embodiment of a MEMS based gyroscope according to aspects of the present invention;

FIG. 7A is a diagram of another embodiment of a MEMS based gyroscope according to aspects of the present invention;

FIG. 8 is a diagram of another embodiment of a MEMS based gyroscope according to aspects of the present invention;

FIG. 9 is a diagram illustrating further detail of the MEMS based gyroscope shown in FIG. 8 according to aspects of the present invention;

FIG. 10 is a diagram illustrating further detail of the MEMS based gyroscope shown in FIG. 8 according to aspects of the present invention;

FIG. 17A is a diagram of another embodiment of a MEMS based gyroscope according to aspects of the present invention;

DETAILED DESCRIPTION

Figure 1:
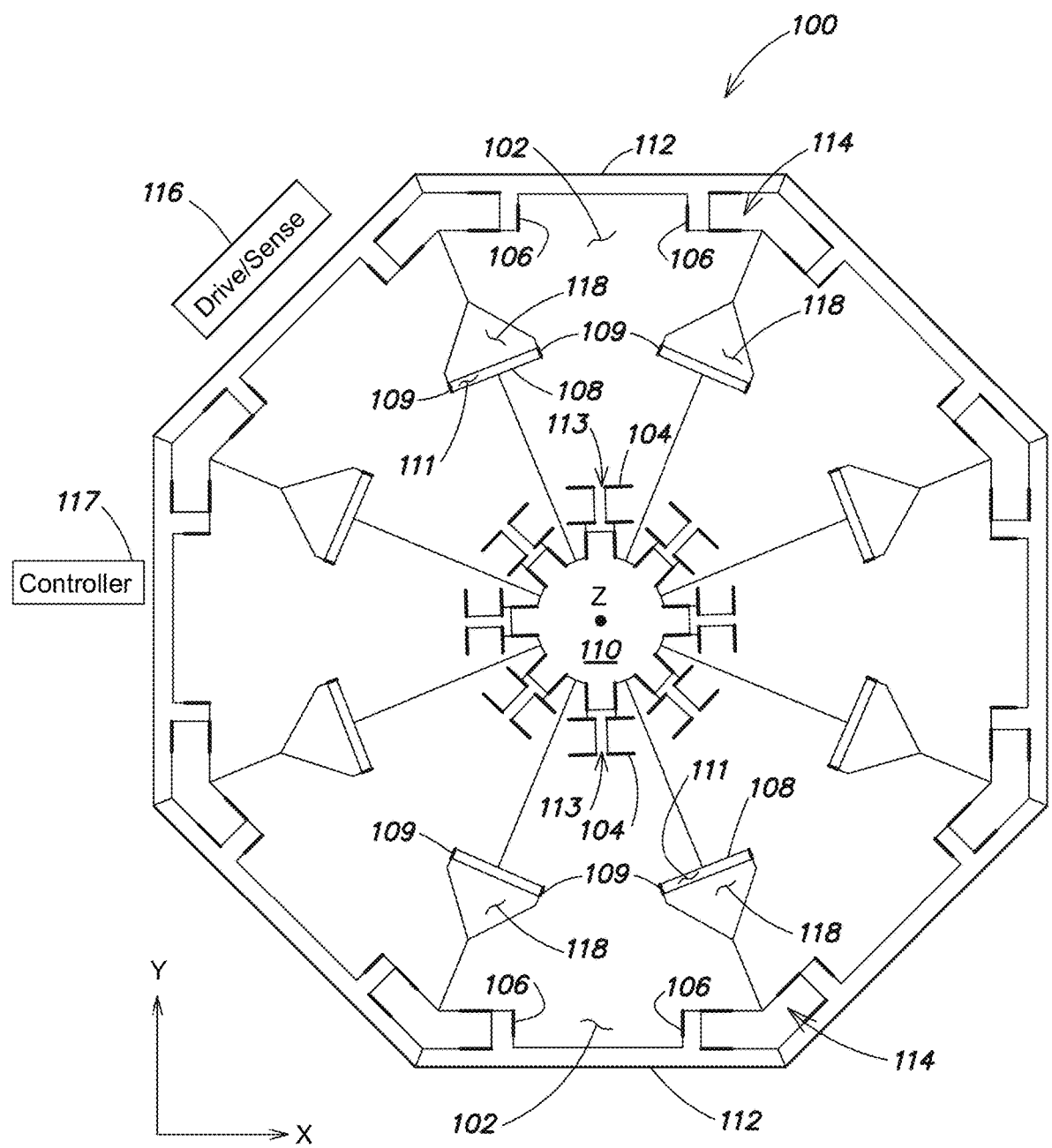
FIG. 1 is a diagram illustrating one embodiment of a MEMS based gyroscope according to aspects of the present invention.

As discussed above, whole angle operating MEMS based gyroscopes include two axes (i.e., two vibratory modes) coupled by Coriolis motion. In a whole angle operating gyroscope, the axes (i.e., vibratory modes) are driven such that the total vibrational amplitude of the two modes is sustained, but the distribution of energy between the two modes is allowed to change freely. By measuring the distribution of motion between the modes, an angle of rotation of the gyroscope can be read out.

One important requirement of a whole angle operating MEMS based gyroscope is that the two modes be identical (i.e., degenerate) with regard to frequency and damping. If the frequencies differ substantially, a Coriolis force caused by rotation of the gyroscope will not be sufficient to transfer energy from one mode to the other and the vibration will stay "locked" to a single axis. This will interfere with the free transfer of motion between modes and the free precession of the mode shape of the gyroscope. A whole angle operating MEMS based gyroscopes must therefore be designed and fabricated with exceptional symmetry and with mode structures that are insensitive to expected fabrication variations. In addition, it is also typically desired for whole angle operating MEMS based gyroscopes to provide low damping (i.e., long ring down time) and matched damping for principle axes. This is because low overall damping correlates to low damping differences between the two axes and on-axis damping may result in gyroscope bias when drive forcers are misaligned. A mismatch (or mismatch drift) may result in a bias (or bias drift).

Traditional whole angle MEMS based gyroscopes include an axially or cylindrically symmetric and continuous structure that is driven to excite two vibratory modes of the structure (i.e., an n=2 vibratory mode where two points of the ring are moving away from the center of the ring while two other points of the ring are moving toward the center of the ring). Rotation of the gyroscope results in a Coriolis force that causes movement (i.e., either inward or outward motion) of other points of the symmetric structure. By monitoring the movement of the symmetric structure in two in-plane axes, the angle of rotation of the gyroscope can be determined.

One common example of a whole angle operating gyroscope is a Hemispherical Resonator Gyroscope (HRG) (otherwise known as a wine-glass gyroscope). An HRG includes a thin hemispherical shell, anchored by a stem. The shell is driven to a flexural resonance and a gyroscopic effect is obtained from the inertial property of resulting flexural standing waves. An HRG is typically reliable and accurate; however, they are also typically large and costly.

Another example of a whole angle operating gyroscope is a ring gyroscope. Ring gyroscopes include axially symmetric and continuous rings that are driven in an n=2 vibratory mode, as discussed above. The movement of the ring is monitored to determine an angle of rotation of the ring gyroscope. The performance of such ring gyroscopes is limited in that due to the limited mass of the rings, the sensitivity of the gyroscope is relatively low and the bias instability is relatively high.

Accordingly, aspects and embodiments provide a MEMS based gyroscope design that combines the best features of a TF gyroscope and a rotationally symmetric gyroscope. Certain embodiments efficiently use relatively large masses (e.g., similar to a TF gyroscope) to provide high sensitivity while maintaining an eight-fold symmetry conducive to the n=2 vibratory mode used in most whole angle based gyroscopes to provide high dynamic range. Certain embodiments are capable of operating in both rate and whole angle mode, may be low cost, and may be easily fabricated.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

Referring to FIG. 1, there is illustrated one embodiment of a MEMS based gyroscope 100 configured according to aspects of the present disclosure. The gyroscope 100 includes eight wedge-shaped masses 102, internal flexures 104, outer flexures 106, a central anchor 110, outer anchors 114, outer shuttles 112, inner shuttles 113, and mass-to-mass couplers 108.

Figure 2:
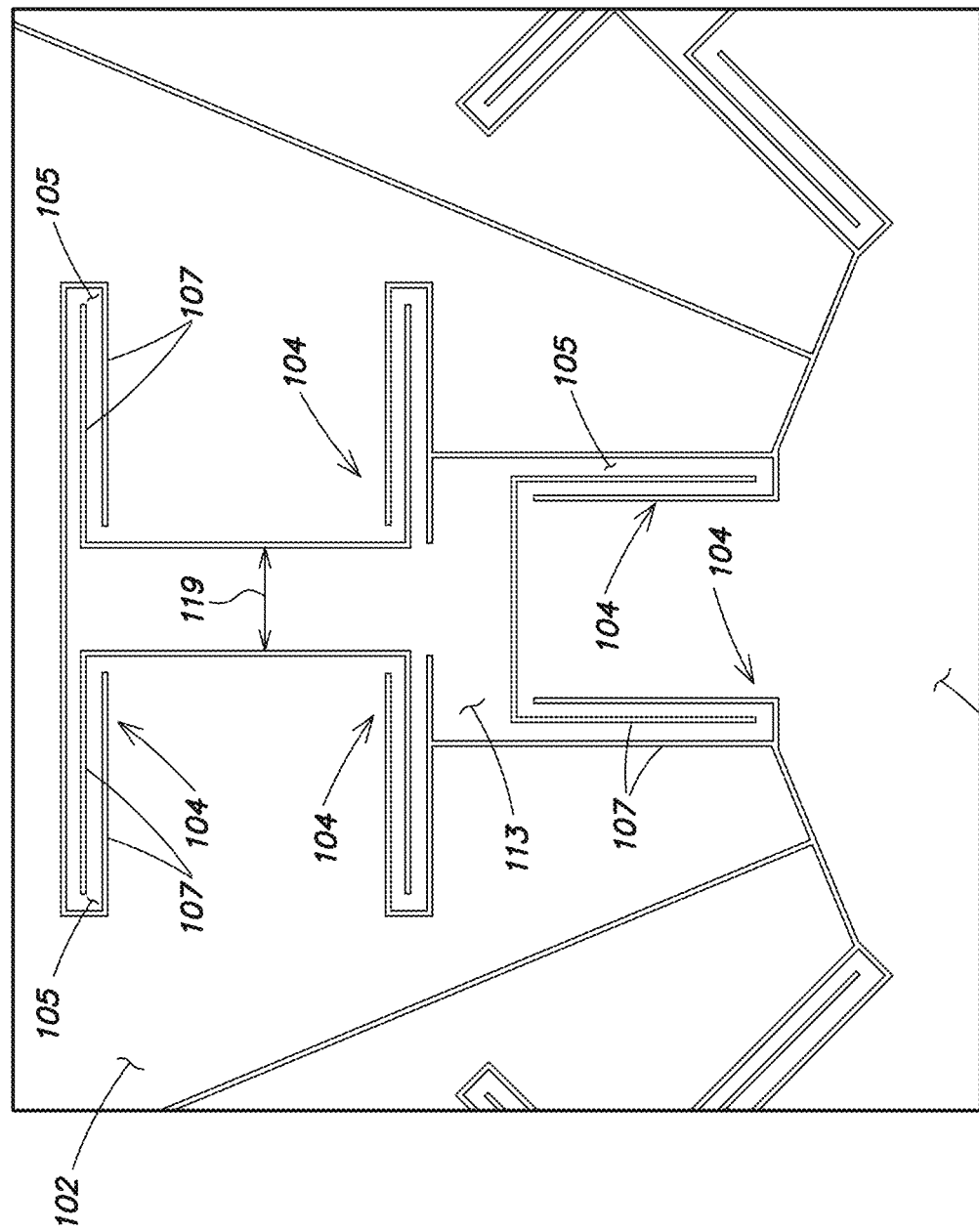
FIG. 2 is a diagram of an internal flexure according to aspects of the present invention.
Figure 3:
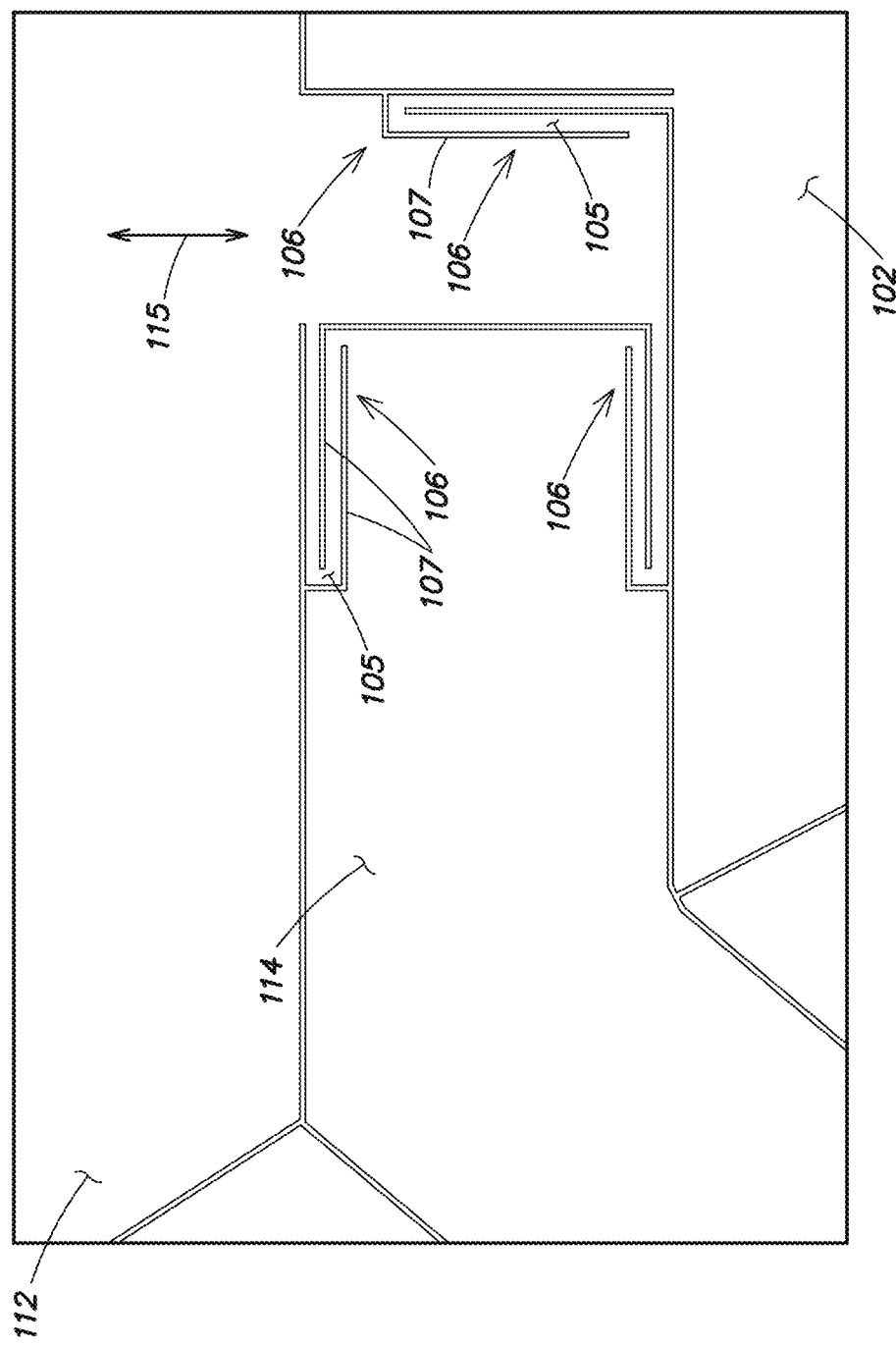
FIG. 3 is a diagram of an outer flexure according to aspects of the present invention.

Each mass 102 is suspended between an inner shuttle 113 and an outer shuttle 112 via internal flexures 104 and outer flexures 106 and is configured to translate in the plane of the gyroscope 100 on the flexures 104, 106. An internal flexure 104 is shown in greater detail in FIG. 2 and an outer flexure 106 is shown in greater detail in FIG. 3. According to one embodiment (shown in FIGS. 2 and 3) where the gyroscope 100 is fabricated on a silicon wafer, the internal flexures 104 and outer flexures 106 include areas of silicon 105 defined by slots 107 (i.e., areas of empty space) in the silicon that are configured to allow a coupled mass 102 to vibrate (i.e., translate) in the plane of the gyroscope 100. In other embodiments, the flexures 104, 106 may be constructed differently. The central anchor 110 and the outer anchors 114 are configured to support the structure. The mass-to-mass couplers 108 are coupled between adjacent masses 102.

Each internal shuttle 113 and outer shuttle 112 is configured to enforce radial forcing on its corresponding mass 102 and restrict rotation of its corresponding mass 102 by decoupling x- (i.e., radial) and y- (i.e., circumferential) motion. For example, each outer shuttle 112 is configured to only move radially (i.e., in a direction 115 in towards the anchor or out away from the anchor 110) and each inner shuttle 113 is configured to move only circumferentially (i.e., in direction 119) around the anchor 110. Accordingly, each mass 102 may only translate in the plane of the gyroscope 100 (i.e. move radially and/or circumferentially in the plane of the gyroscope 100). By decoupling the x- and y-motion, the stiffness of each direction may be designed independently. Also, out-of-plane motion may be suppressed by utilizing flexures of high aspect ratio (i.e. whose width is at least five times narrower than the thickness of the flexure for the whole planar gyroscope 100). For example, a gyroscope that is 100 microns in thickness may utilize flexures which are five times narrower (e.g., 20 microns wide), ten times narrower (e.g., 10 microns wide), or twenty times narrower (5 microns wide). In addition, each outer shuttle 112 may also reduce errors caused by misaligned drive/sense transducer 116 electrodes by being stiff in the direction of the misaligned force component (i.e., by only moving radially in and out, the outer shuttle 112 reduces any erroneous circumferential forces on the mass 102 from the drive).

The gyroscope 100 also includes drive/sense transducers 116. For the ease of illustration, only one drive/sense transducer 116 is shown in FIG. 1; however, a drive/sense transducer 116 is located at the periphery of each mass 102 in the gyroscope 100. Each drive/sense transducer 116 is capable of driving motion of its corresponding mass 102 and of sensing motion of its corresponding mass 102. For example, in at least one embodiment, each drive/sense transducer 116 is an electrostatic transducer (e.g., a variable capacitor) that includes an electrode positioned at the periphery of a corresponding mass 102 and an electrode positioned on a corresponding outer shuttle 112. When a voltage is applied to the electrode at the periphery of the mass 102, motion of the mass is electrostatically driven. Each drive/sense transducer 116 is also configured to sense motion of its corresponding mass and provide a signal indicative of the motion to an external controller/processor 117. According to one embodiment, the drive/sense transducers 116 are clapper or comb drives; however, in other embodiments, any other appropriate type of circuit capable of driving and sensing motion of a mass 102 may be utilized. For example, in other embodiments, magnetic, piezoelectric, thermal, or optical based transducers may be utilized.

As discussed above, the drive-sense transducers 116 are located at the periphery of each mass 102; however, in other embodiments, a transducer 116 may be located at any other position adjacent a mass 102. In addition, according to at least one embodiment, each drive-sense transducer 116 is located internal to a mass 102.

As also discussed above, a single transducer 116 is associated with each mass 102; however, in other embodiments, each mass 102 may be associated with more than one transducer 116. For example, in at least one embodiment, each mass 102 is associated with a first transducer that drives motion of the mass 102 and a second transducer that senses motion of the mass 102. In another embodiment, each mass 102 also includes a third transducer that is utilized for tuning the mass 102 (e.g., tuning the radial spring constant of the mass 102). In other embodiments, the transducer(s) 116 associated with each mass 102 may be configured in any appropriate way to drive motion of the mass 102, sense motion of the mass 102, and/or tune the mass 102.

Figure 4:
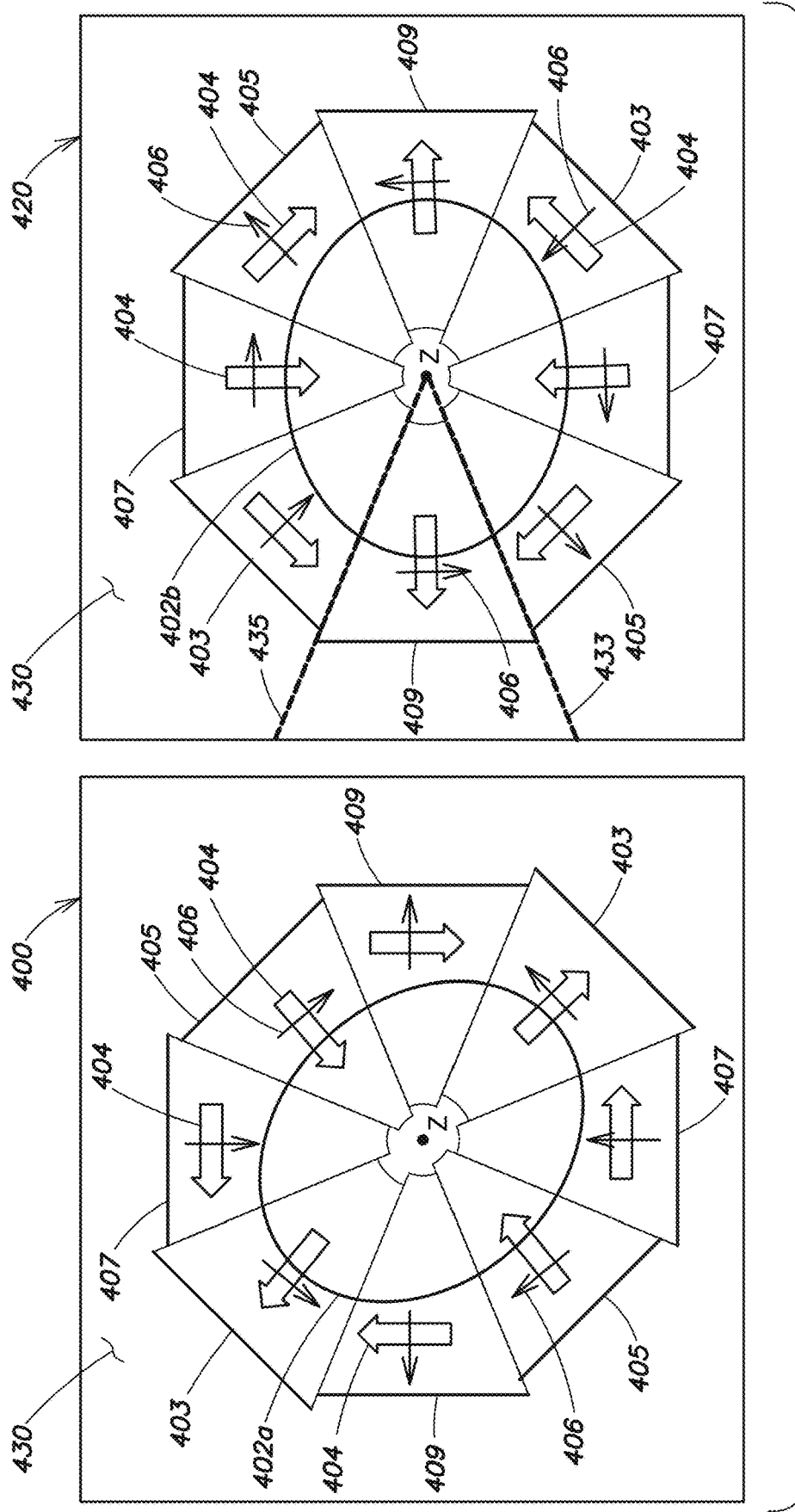
FIG. 4 is a diagram illustrating two degenerate vibratory modes of a MEMS based gyroscope according to aspects of the present invention.

As the masses 102 in the gyroscope 100 vibrate, the mass-to-mass couplers 108 couple the motion of the masses 102 together, resulting in an n=2 vibratory mode resembling that of a rotationally symmetric gyroscope (e.g., a ring, disc, or hemispherical gyroscope). FIG. 4 is a diagram illustrating two degenerate vibratory modes (a first vibratory mode 400 and a second vibratory mode 420) of the gyroscope 100. Considering the first vibratory mode 400, if the gyroscope 100 is not rotating, two of the masses 405 are translating inwardly and two of the masses 403 are translating outwardly. As shown in FIG. 4, the first n=2 vibratory mode shape 400 of the gyroscope is an ellipse 402a. Due to the mass-to-mass couplers 108, the other four masses 407, 409 are translating circumferentially. Resulting velocity vectors 404 are also shown for each mass. Considering the second vibratory mode 420, if the gyroscope 100 is not rotating, two of the masses 407 are translating inwardly and two of the masses 409 are translating outwardly. As shown in FIG. 4, the second n=2 vibratory mode shape 420 of the gyroscope is an ellipse 402b that is rotated 45° in relation to ellipse 402a of the first vibratory mode 400. Due to the mass-to-mass couplers 108, the other four masses 403, 405 are translating circumferentially. Resulting velocity vectors 404 are also shown for each mass.

As the gyroscope 100 is rotated (e.g., due to rotation of the system to which the gyroscope 100 is attached) about axis (Z) which is perpendicular to the plane of the gyroscope 100, the vibratory modes 400, 420 exhibit coupling via Coriolis forces. For example, as shown in FIG. 4, the Coriolis forces 406 ($F_c = -2\ m\Omega \times v$) in the first vibratory mode 400 arising from the velocity vectors 404 force two masses 407 inward and two masses 409 outward, thus exciting the other vibratory mode 420.

The Coriolis forces 406 of the first vibratory mode 400 remove energy from the first vibratory mode 400 and excite motion in the second vibratory mode 420. For example, as shown in FIG. 4, the Coriolis force 406 applied to each mass in the first vibratory mode 400 correspond to the displacement of the mass in the second vibratory mode 420. Therefore, the Coriolis forces 406 resulting from the rotation of the gyroscope 100 result in the transfer of energy from the first vibratory mode 400 to the second vibratory mode 420. Similarly, Coriolis forces of the second vibratory mode 420 reduce motion in the second vibratory mode 420 and excite motion in the first vibratory mode 400. Therefore, the Coriolis forces resulting from the rotation of the gyroscope 100 also result in the transfer of energy from the second vibratory mode 420 to the first vibratory mode 400.

More specifically, the vibratory motion in each mode 400, 420 is sinusoidal and as shown in the first vibratory mode 400 of FIG. 4, the masses 403 and 405 are at one extreme of their displacement (i.e., the outwardly moving masses 403 are at their largest radial distance and the inwardly moving masses 405 are at their smallest radial distance). At a time $T/2=1/(2*f)$, where f is the frequency of the first vibratory mode 400 ($T=1/f$ is the period and $w=2\pi f$ is the frequency in radians per second), the masses 403 are closer to the center and the masses 405 are farther from the center. Accordingly, the position of each mass at any time is related to the phase of the oscillation at that time. In other words, if r403 is the radial position of masses 403 and r405 is the radial position of masses 405, then $r403=r0*\sin(wt)$ and $r405=r0*\sin(wt+\pi)$.

The velocity of each mass is out of phase with the displacement by $\pi/2$. Therefore, when a mass 403 is at the outward extreme (as shown in FIG. 4), its velocity is actually zero. The velocity vector 404 for each mass shown in FIG. 4 is actually the velocity at a time $t=(\pi/2\ w)=1/(4*f)=(T/4)$ seconds ago. As such, the velocity of a mass 403 can be expressed as $v403=v0*\sin(wt+\pi/2)=r0\ w*\cos(wt)$, and the velocity of a mass 405 can be expressed as $v405=v0*\sin(wt+3\pi/2)=r0\ w*\cos(wt+\pi)$. These velocity equations show that in addition to the displacement vectors, the velocity vectors also reverse direction sinusoidally. For example, at each half cycle, the velocity vectors reverse direction. The corresponding Coriolis force vectors also reverse direction at each half cycle. This is necessary to excite motion in the other mode, as the other mode also has sinusoidal motion which requires sinusoidal forcing. In at least one embodiment, it is desired to set the frequency of the force sinusoid equal to the resonance frequency of the mode being excited. By setting these frequencies equal, stronger coupling of the modes may be achieved.

With reference to the first vibratory mode 400 of FIG. 4, the positions of each mass 403, 405, 407, 409 are shown when the masses 403 and 405 are at one extreme of their displacement and the velocity 404 and Coriolis vectors 406 are shown at a time T/4 seconds earlier. The time at which the Coriolis force vectors 406 are shown in the first vibratory mode 400 is the same time at which the velocity vectors 404 are shown in the second vibratory mode 420 (the force is in phase with the velocity of the vibratory motion which is increasing, i.e., the force counteracts damping, which is proportional to velocity), which is again T/4 seconds earlier than the time corresponding to the position of the masses 403, 405, 407, 409 in the second vibratory mode 420. In other words the velocity vectors 404 and force vector 406 shown in each vibratory mode 400, 420 are shown at the same time.

As the Coriolis forces 406 in the first vibratory mode 400 excite the masses in the second vibratory mode 420 (i.e., assist the velocity vectors 404 in the second vibratory mode 420), the Coriolis forces 406 in the second vibratory mode 420 reduce the motion in the first vibratory mode 400 (i.e., are opposed to the velocity vectors 404 in the first vibratory mode 400). As such, energy is transferred from the first vibratory mode 400 to the second vibratory mode 420. At some point, all of the energy will have transferred and the motion in the first vibratory mode 400 will be zero.

At this point, the Coriolis forces 406 in the second vibratory mode 420 remain the same, but are now working with zero velocity in the first vibratory mode 400. The Coriolis forces 406 excite the motion shown in the first vibratory mode 400, but with a phase difference of $\pi$. Accordingly, the time at which the velocity vectors 404 are as shown in the first vibratory mode 400 of FIG. 4 is T/2 different than as previously discussed. This means that the Coriolis force vectors 406 in the first vibratory mode 400 also reverse direction, thus reducing motion in the second vibratory mode 420. As such, energy is transferred back to the first vibratory mode 400 from the second vibratory mode 400. It is to be appreciated that one complete cycle of energy transfer (i.e., the first vibratory mode 400 to the second vibratory mode 420 and back to the first vibratory mode 400) results in a phase shift of $\pi$ in the vibratory oscillation. The next half cycle (i.e., the first vibratory mode 400 to the second vibratory mode 420) will likewise result in motion in the second vibratory mode 420 that is $\pi$ different than before.

The transfer of energy between modes can also appear similar to a rotation of the modal shape (i.e., the second vibratory mode 420 appears as a 45° rotated version of the first vibratory mode 400). It is to be appreciated that, from a frame of reference affixed to the gyroscope 100, the gyroscope structure 100 does not rotate; rather, the orientation of the overall vibratory mode (superposition of modes 400 and 420 in varying proportions) appears to rotate in that frame as that frame of reference is rotated. At overall vibratory mode orientations between 45°, some combination of the two modes 400 and 420 will appear, i.e. all masses will be moving both radially and circumferentially, in proportion to the angular distance between the current orientation and the starting orientation. For rate mode operation, the control commands exert rebalancing forces to null (maintain at zero) the radial motion of either masses 407, 409 or masses 403, 405. For whole angle mode operation, the exchange of energy (or apparent rotation of the overall vibratory mode) is allowed to occur without interference. Because of damping, forces must be continually applied along the direction of largest motion (or the direction of the overall vibratory mode), which is accomplished by applying the appropriate proportion of force (determined by the vector components of the orientation) via both the transducers 116 located at the masses 407, 409 and the masses 403, 405.

By monitoring the motion of the masses 102 in the gyroscope 100 the rotation of the gyroscope 100 can be determined. For example, in a rate mode of operation of the gyroscope 100, one of the modes (e.g., the first vibratory mode 400 or the second vibratory mode 420) is continually driven at a fixed amplitude by the drive/sense transducers 116, and the motion of the other mode is monitored, by the drive/sense transducers 116. Signals from the drive/sense transducers 116 based on the sensed motion are provided to the controller 117 (coupled to the drive/sense transducers 116) and the controller 117 can determine a rate of rotation of the gyroscope 100 based on the signals. For example, in one embodiment, the motion of masses 102 in one mode (e.g., the first vibratory mode 400 or the second vibratory mode 420) is driven at a fixed amplitude (by the drive/sense transducers 116) while the other mode is measured (by the drive/sense transducers 116) in an open loop. In such an embodiment, the amplitude of motion sensed by the drive/sense transducers 116 is proportional to the rate of rotation of the gyroscope. In another embodiment, the motion of masses 102 in one mode (e.g., the first vibratory mode 400 or the second vibratory mode 420) is driven at a fixed amplitude (by the drive/sense transducers 116) while the motion of masses 102 in the other mode is fixed at zero, by the drive/sense transducers 116, in a closed-loop. The required feedback force necessary to maintain the motion of the masses 102 at zero is proportional to the rate of rotation of the gyroscope 100.

In a whole-angle mode of operation, the motion of masses 102 in both modes 400, 420 is driven by the drive/sense transducers 116 such that the total vibrational amplitude of the masses 102 across both modes 400, 420 is sustained, but the distribution of energy between the two modes 400, 420 is allowed to change freely. By measuring the distribution of motion between the modes 400, 420 with the drive/sense transducers 116 and providing signals based on the distribution of motion to the controller 117, an angle of rotation (with respect to a starting angle) can be read out by the controller 117. According to one embodiment, the control scheme discussed in U.S. Pat. No. 7,318,347, titled "HEMISPHERICAL RESONATOR GYRO CONTROL", filed on May 9, 2005, which is herein incorporated by reference in its entirety, is utilized to maintain the total vibrational amplitude constant across the modes 400, 420 while allowing the distribution of energy to transition freely between the modes 400, 420 subject to Coriolis forces.

The arrangement of the masses and flexures in the MEMS based gyroscope discussed above result in a gyroscope that combines the best features of a lumped element TF gyroscope and a rotationally symmetric gyroscope. The use of relatively large masses (e.g., symmetric about a central point (e.g., at the central anchor 110 as shown in FIG. 1)) on relatively weak flexures enables low damping, high momentum, and high sensitivity which may result in low Brownian motion noise (the dominant resolution limit in MEMS based symmetric angular rate gyroscopes). The symmetrical eight mass configuration enables the gyroscope to behave like a continuous rotationally symmetric vibratory gyroscope (e.g., such as a hemisphere, ring, or disc gyroscope). The mass-to-mass couplers cause the eight masses to move in the n=2 vibratory mode, which is characterized by two opposite masses 403 moving out (i.e., away from the center/central point), the two opposite masses 405 (90° from the masses moving out) moving in (i.e., in towards the center/central point), and the other four masses 407, 409 moving circumferentially. This vibratory mode emulates the vibratory mode of a rotationally symmetric gyroscope and is necessary so that the Coriolis forces, due to rotation about the Z axis, couple the two modes together, allowing the rate of rotation or the angle of rotation to be sensed based on the vibrations of the masses.

Figure 5A:
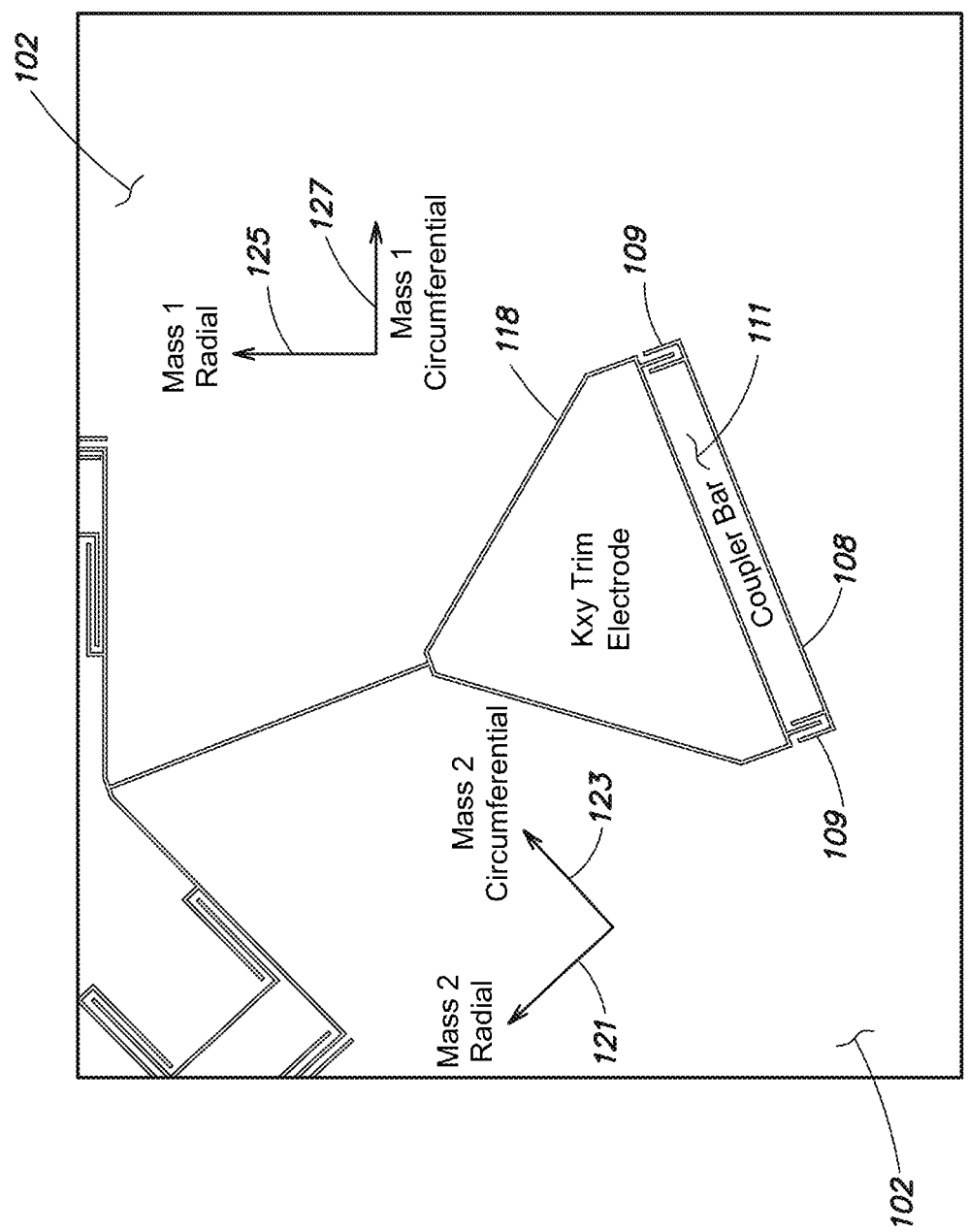
FIG. 5A is a diagram illustrating one embodiment of a $K_{xy}$ trim electrode and a mass-to-mass coupler according to aspects of the present invention.

The particular arrangement of the link between adjacent masses (i.e., the mass-to-mass couplers 108 shown in FIG. 1) is important to ensuring the correct modal structure of the gyroscope. For example, Applicant has appreciated that in order to couple the two modes together, each mass-to-mass coupler 108 must be stiff in the circumferential direction, yet compliant in the radial direction. For example, FIG. 5A is a diagram of one embodiment of a mass-to-mass coupler according to aspects of the present invention. The mass-to-mass coupler 108 includes a stiff "bar" 111 that has a flexural hinge 109 on either side. The stiff "bar" 111 operates such that the circumferential motion of a mass 102 to which it is coupled depends on the radial motion of the masses adjacent partner. Accordingly, as the masses 102 vibrate, the stiff "bar" 111 results in the gyroscope 100 operating in the n=2 vibratory mode. In other embodiments, any other type of mass-to-mass coupler can be used that couples masses together such that the radial and circumferential motions of adjacent masses 102 act in such a way as to result in the n=2 vibratory mode where two opposite masses 102 are moving radially outward, two opposite masses 102 are moving radially inward, and the masses 102 located in between move circumferentially. For example, according to some embodiments, the structure of the mass-to-mass coupler may be configured differently (e.g., as discussed below with regard to FIG. 10), the gyroscope may include multiple mass-to-mass couplers coupled between each adjacent mass (e.g., as discussed below with regard to FIG. 12), and in addition to being coupled between adjacent masses, the mass-to-mass coupler may also be coupled to a central anchor via a flexural hinge (e.g., as discussed below with regard to FIG. 16). According to some other embodiments, a mass-to-mass coupler includes a ring (or rings) that are configured to couple all masses together (e.g., as discussed below with regard to FIGS. 17-19).

According to at least one embodiment, the gyroscope 100 also includes angled electrodes 118 which enable the cross-spring term of the masses 102 to be trimmed. The cross spring term in the gyroscopes 100 equations of motion describes the mechanical coupling between modes 400, 420. More specifically, the cross spring term is a spring constant quantifying the amount of force applied in a direction that increases one mode proportionally in response to the motion of the other mode. It is advantageous to reduce or eliminate this term as it is desirable to have each mode only be excited by rotation of the gyroscope 100. Typically, this coupling is intentionally minimized by the design of the suspension (i.e., the springs or flexures). However, fabrication imperfections may cause the cross spring term to be non-zero. In a rate mode of operation, this may result in a quadrature error when the demodulation phase is also imperfect. As a result, standard TF gyroscopes typically tune out the cross-spring term by compensating it with a variable bias applied to the driver transducers (e.g., the drive combs).

In a whole-angle operating gyroscope, the cross-spring term may also lead to errors. For example, the performance of a whole angle operating gyroscope depends on the frequencies of two vibratory modes being equal. Reducing the frequency split between modes to zero is not possible unless the cross spring term is also reduced to zero. Some existing whole-angle-capable gyroscopes (e.g., such as a quad mass gyroscope) provide a capability of tuning only the on-axis spring term, and hence cannot achieve perfect mode matching. Such gyroscopes rely on the mechanical cross-spring term being small by design. Other vibratory MEMS based gyroscopes (e.g., such as ring gyroscopes) use electrostatic forcers located at specific locations to provide a tunable spring force that compensates for the mechanical cross spring term. None of the rate or whole angle based methods of compensating for the cross spring term are applicable to the gyroscope 100 discussed above. Accordingly, the gyroscope 100 includes the angled electrodes 118 which are configured to trim the cross-spring term of the masses 102.

Each angled electrode 118 is configured such that the electrode generates a radial force component in response to circumferential motion of a corresponding mass 102 and the electrode generates a circumferential force component in response to radial motion of the corresponding mass 102. For example, as shown in FIG. 5A, in response to circumferential motion 127 of a mass 102 (Mass 1), the electrode 118 applies a radial force component 125 to the same mass 102 (Mass 1) and in response to radial motion 125 of the mass 102 (Mass 1), the electrode 118 applies a circumferential force component 127 to the same mass 102 (Mass 1). Similarly, in response to circumferential motion 123 of the mass 102 (Mass 2), the electrode 118 applies a radial force component 121 to the same mass 102 (Mass 2) and in response to radial motion 121 of the mass 102 (Mass 2), the electrode 118 applies a circumferential force component 123 to the same mass 102 (Mass 2).

The magnitude of the circumferential and radial force components applied by an electrode 118 depends on the voltage applied to the electrode 118. Each electrode 118 is angled such that circumferential or radial motion in one vibratory mode (e.g., vibratory mode 400 or 420) results in a corresponding circumferential or radial force in the other mode. The resulting force, due to circumferential or radial motion, will either assist or oppose motion in the vibratory mode depending on which electrodes 118 are used and the voltages applied to them. Therefore, the cross spring term can be cancelled regardless of the polarity of the cross spring term.

According to one embodiment, the MEMS based gyroscope 100 is implemented on a substrate (e.g., substrate 430 shown in FIG. 4). In at least one embodiment, the substrate 430 is a cubic crystal structure. As illustrated in FIG. 5B, a cubic crystal structure (e.g., single crystal silicon (Si)) exhibits anisotropic elastic properties such that flexures oriented along the (100) direction plane behave differently from flexures having the same geometry but oriented along the (110) direction plane (the (100) direction plane and the (110) direction plane being 45° apart). This causes errors in whole angle operation because the natural frequencies of the two vibratory modes will differ.

Figure 5C:
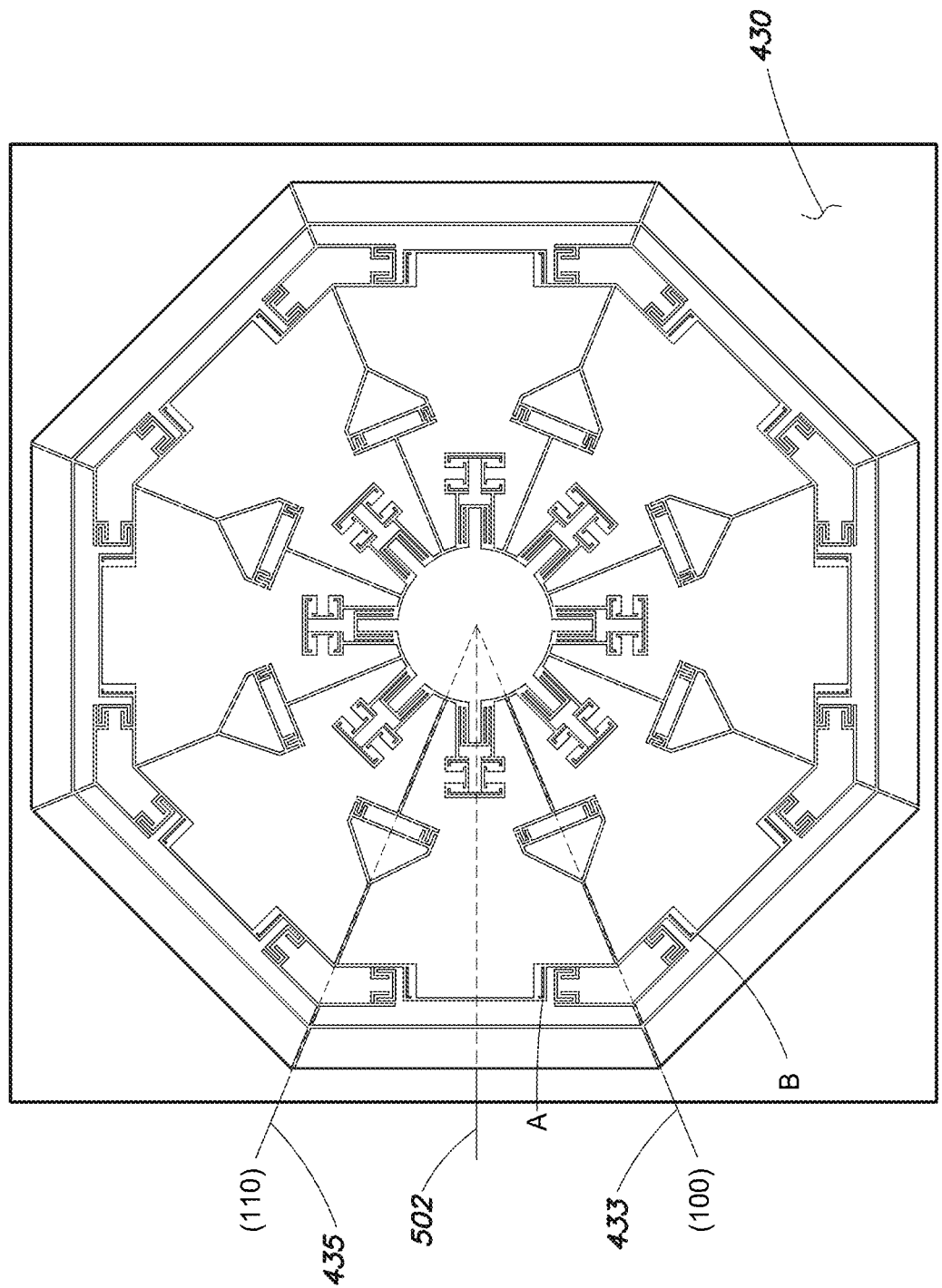
FIG. 5C is a diagram illustrating one embodiment of the orientation of a MEMS based gyroscope relative to the crystallographic orientation of a cubic crystal structure according to aspects of the present invention.

Historically the difference in moduli between the (100) direction and the (110) direction has been compensated for by adjusting flexure width; however, in at least one embodiment, these modulus differences are compensated for by rotating the entire device by 22.5° relative to the (100) direction plane. For example, as shown in FIG. 5C, when constructing the device, the geometry of the device is oriented relative to the crystallographic orientation of silicon such that the (100) plane falls along direction 433 and the (110) plane falls along direction 435. This places the axis of the corresponding flexures (e.g., flexures A and B) along a line 502 that is halfway between the (100) direction plane 433 and the (110) direction plane 435 (i.e., 22.5° between the (100) and (110) direction planes), rather than exactly on either the (100) direction plane 433 or the (110) direction plane 435. The result is that all flexures having the same geometry have the same modulus, and will thus behave in the same way. This may save design time and also reduce errors that arise from imperfect width-based compensation, which is often attempted using simplified analytical models that imperfectly predict the stiffness of complicated flexures. As discussed above, the MEMS based gyroscope 100 is implemented on a silicon based substrate; however, in other embodiments, the MEMS based gyroscope 100 can be implemented on any type of cubic crystal structure.

Figure 5D:
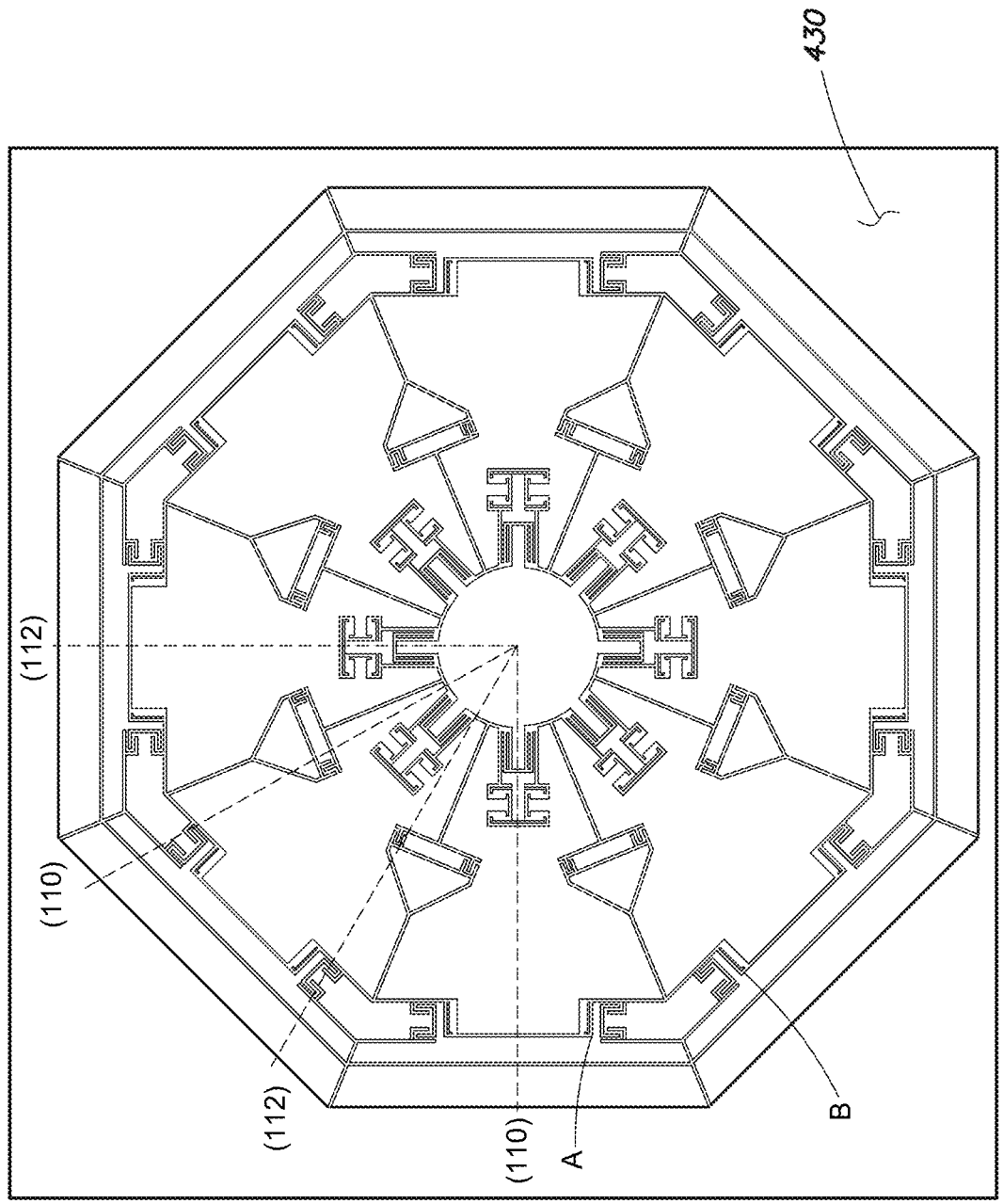
FIG. 5D is a diagram illustrating another embodiment of the orientation of a MEMS based gyroscope relative to the crystallographic orientation of a cubic crystal structure according to aspects of the present invention.
Figure 6A:
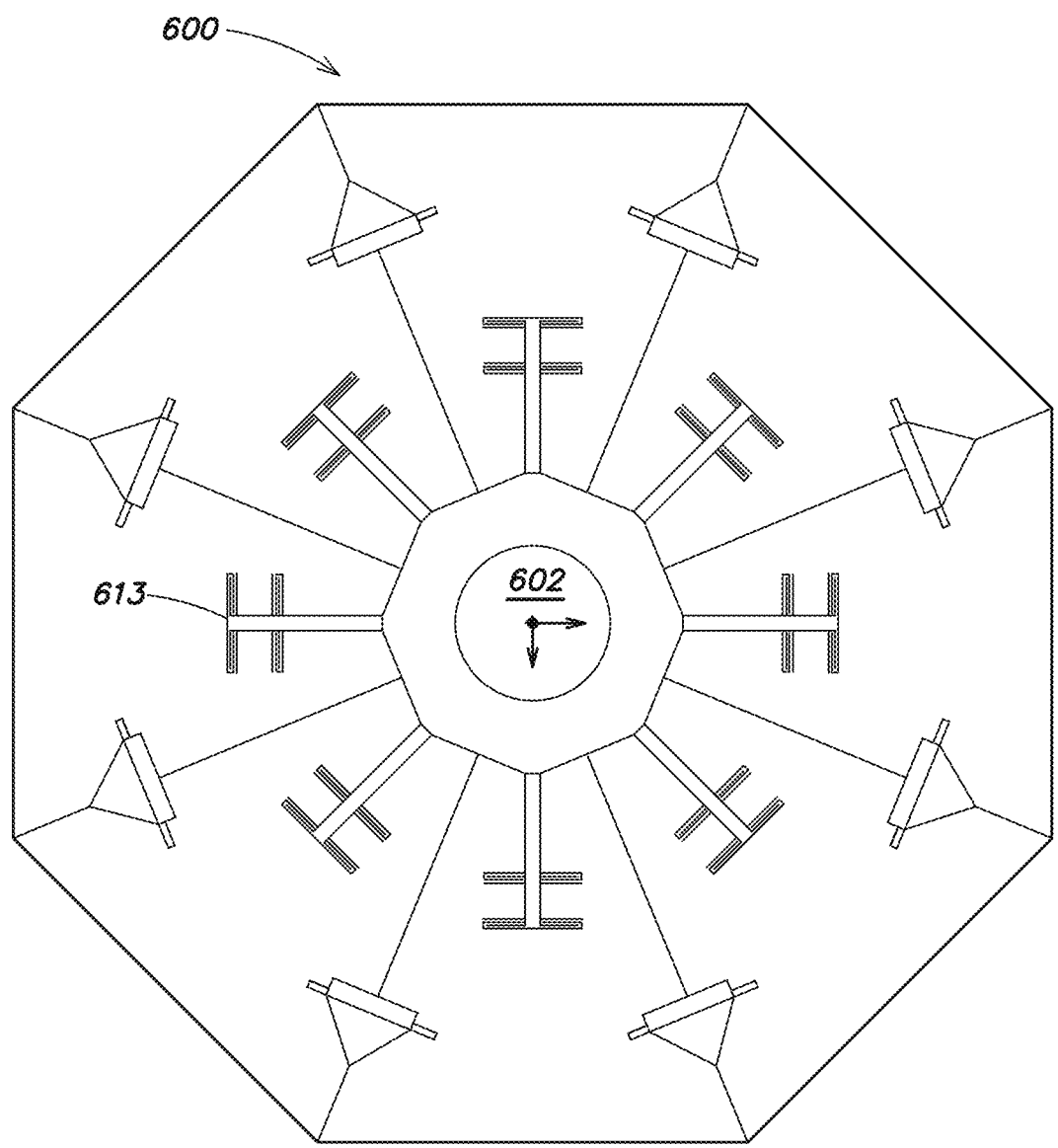
FIG. 6A is a diagram of another embodiment of a MEMS based gyroscope according to aspects of the present invention.

In another embodiment, planar isoelasticity in a cubic crystal based substrate (e.g., substrate 430) is achieved by utilizing a wafer with a (111) crystal orientation. For example, as shown in FIG. 5D, when the device is implemented on a cubic crystal based substrate 430 with a (111) crystal orientation, the in-plane directions are (110) and/or (112), all of which have the same modulus. The result is that all flexures having the same geometry will thus behave in the same way without requiring compensation (e.g., as described above with respect to the (100) crystal orientation). FIG. 6A is a diagram illustrating another embodiment of a MEMS based gyroscope 600 configured according to aspects of the present disclosure. The gyroscope 600 is the same as gyroscope 100 discussed above with regard to FIG. 1 except that the gyroscope 600 does not include outside anchors (e.g., such as outside anchors 114 shown in FIG. 1) or outside shuttles (e.g., such as outside shuttles 112 shown in FIG. 1). In addition, the internal shuttles 613 are configured differently. A benefit of such a configuration is that internal stress (which may arise from such causes as thermal expansion coefficient mismatches between the gyroscope material and the substrate material connecting a central anchor 602 and any outside anchors) are avoided. Such thermal mismatches between materials connecting the two anchors may result in the stretching of masses/flexures suspended between the two anchors. By only including one central anchor 602 in the gyroscope 600, such stretching may be avoided. Additionally, the bias stability of the gyroscope 600 may be improved by reducing the transmission of (unpredictable) external stresses on the gyroscope 600. However, by only including one central anchor 602, the force isolation (i.e., decoupling x- and y-motion as discussed above with regard to FIG. 2) provided by the outer shuttles and anchors is eliminated.

Figure 6B:
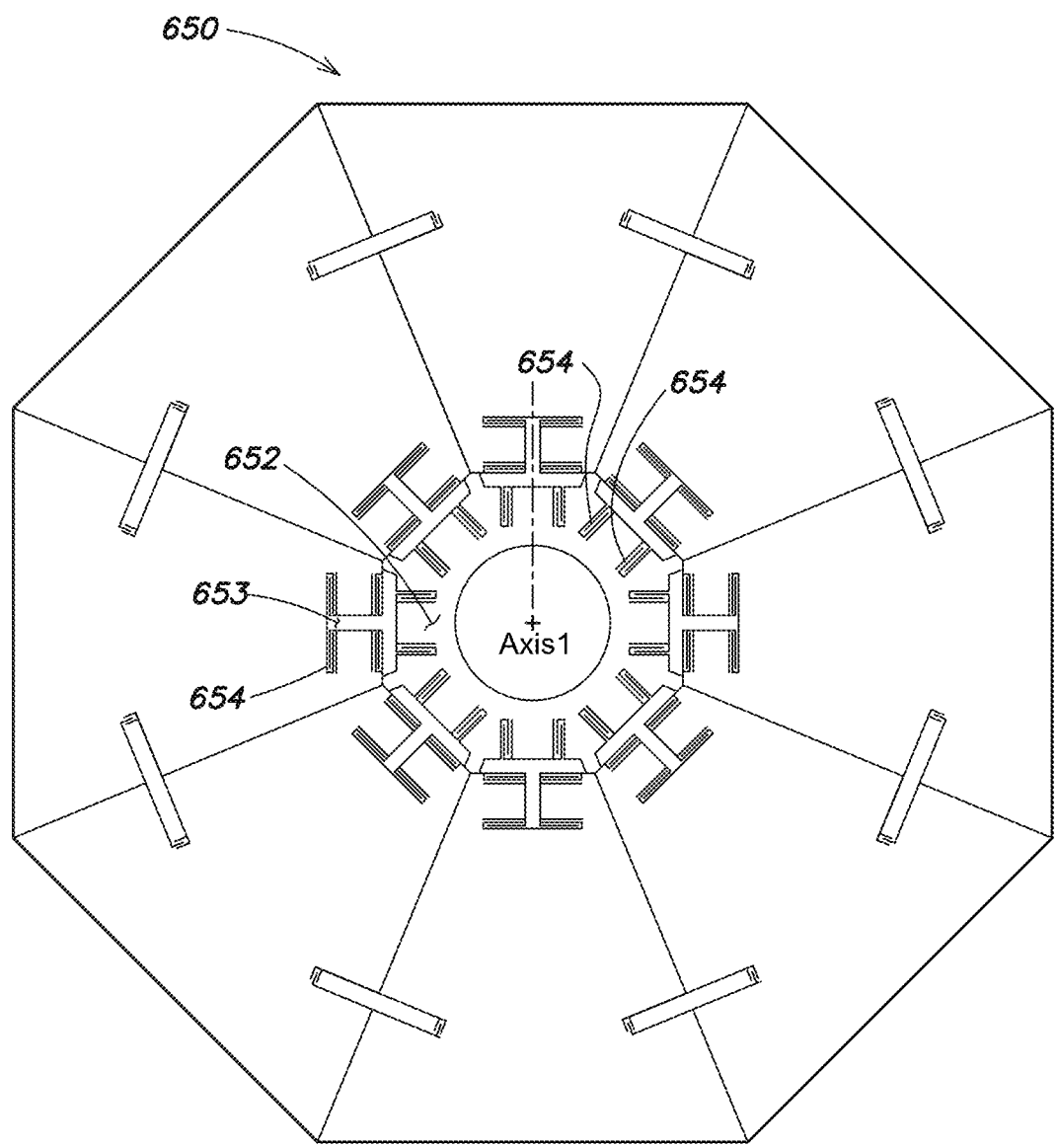
FIG. 6B is a diagram of another embodiment of a MEMS based gyroscope according to aspects of the present invention.
Figure 6C:
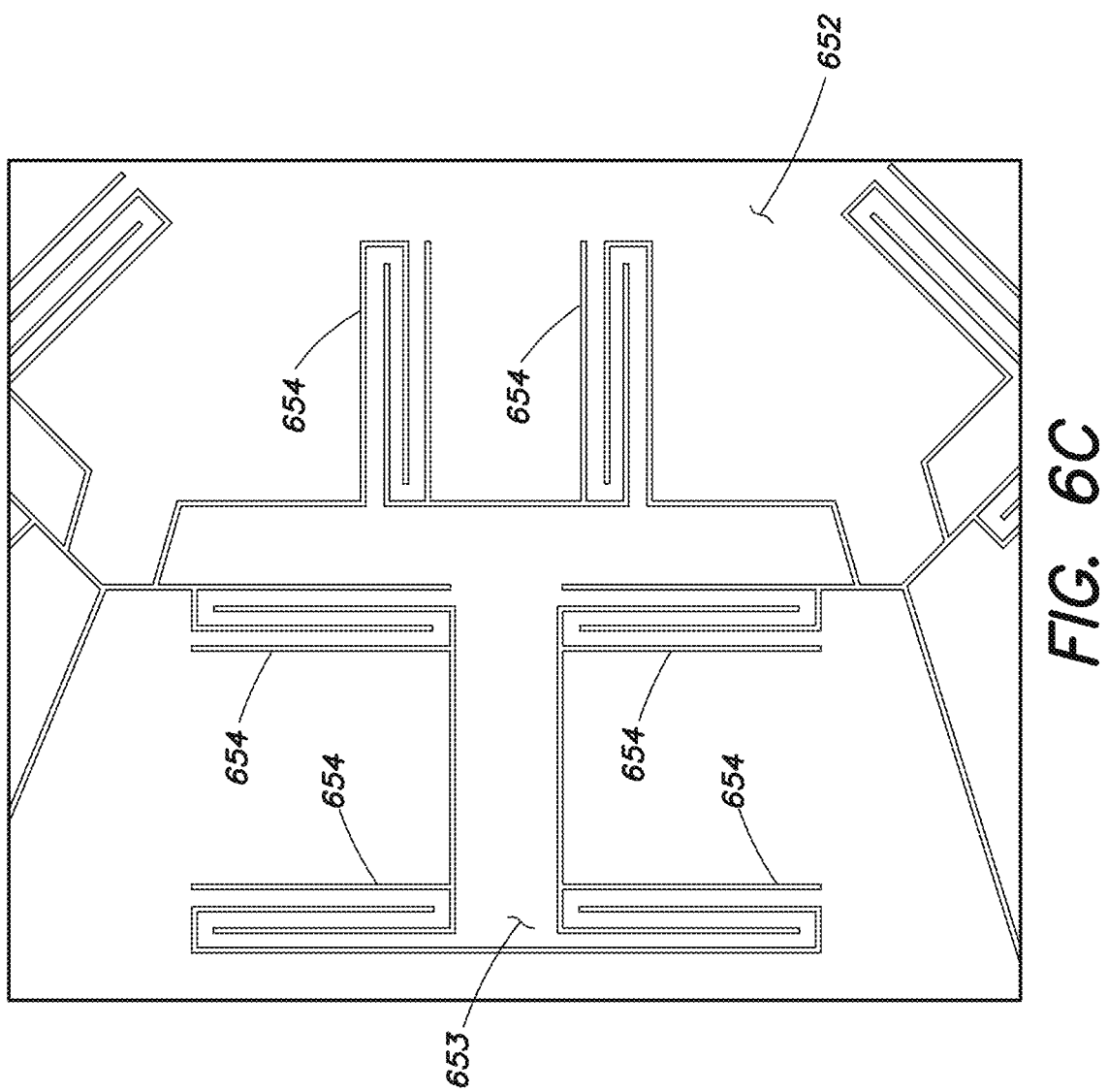
FIG. 6C is a diagram illustrating further detail of the MEMS based gyroscope shown in FIG. 6B according to aspects of the present invention.

FIG. 6B is a diagram illustrating another embodiment of a MEMS based gyroscope 650 configured according to aspects of the present disclosure. The gyroscope 650 is similar to the gyroscope 600 discussed above with regard to FIG. 6A except that the gyroscope 650 does not include angled electrodes (e.g., such as the angled electrodes 118 shown in FIG. 1), and the anchor 652, internal flexures 654, and internal shuttles 653 are configured differently. FIG. 6C is a diagram illustrating further details of the anchor 652, internal flexures 654, and internal shuttle 653 of the gyroscope 650.

Figure 6D:
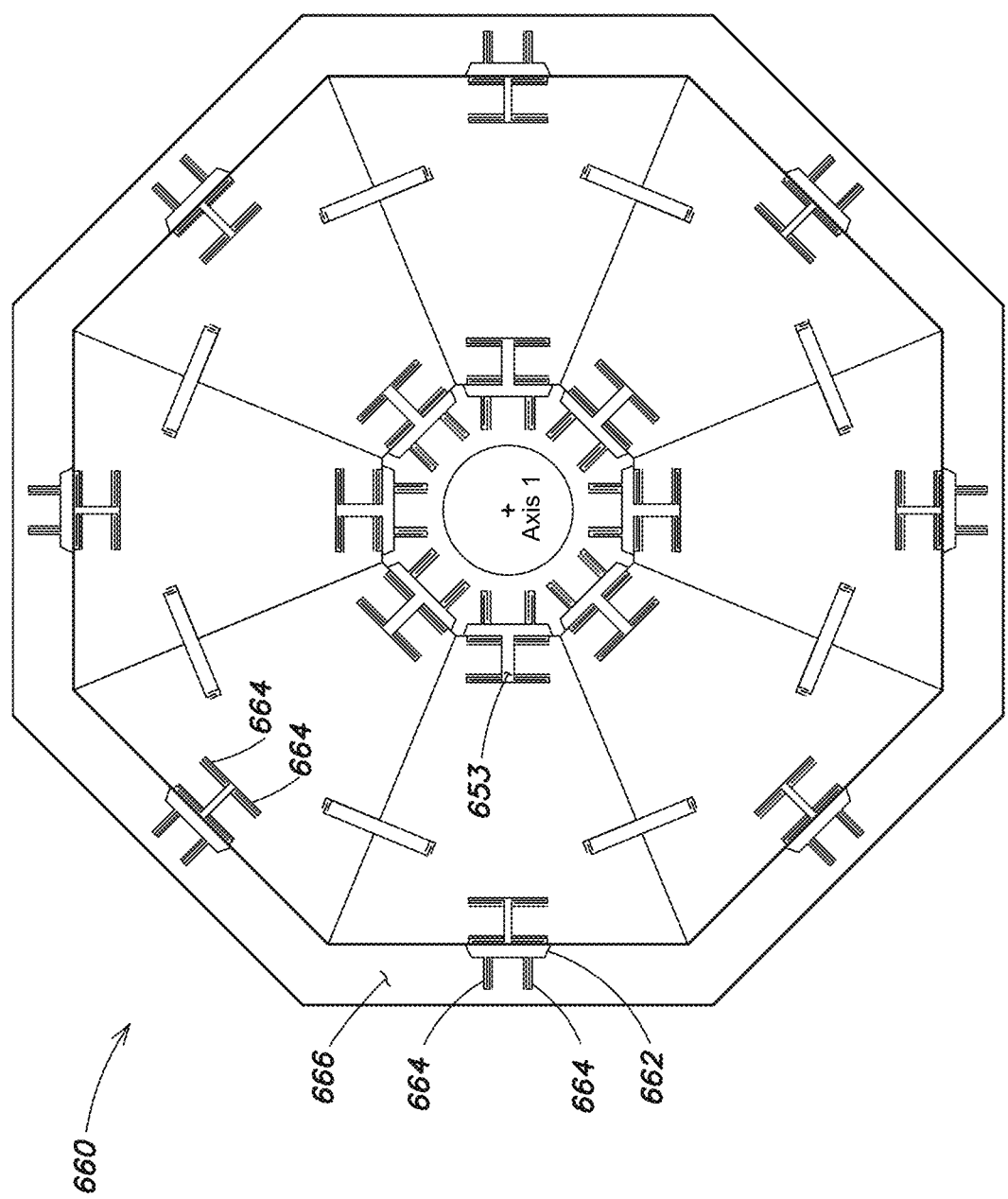
FIG. 6D is a diagram of another embodiment of a MEMS based gyroscope according to aspects of the present invention.
Figure 6E:
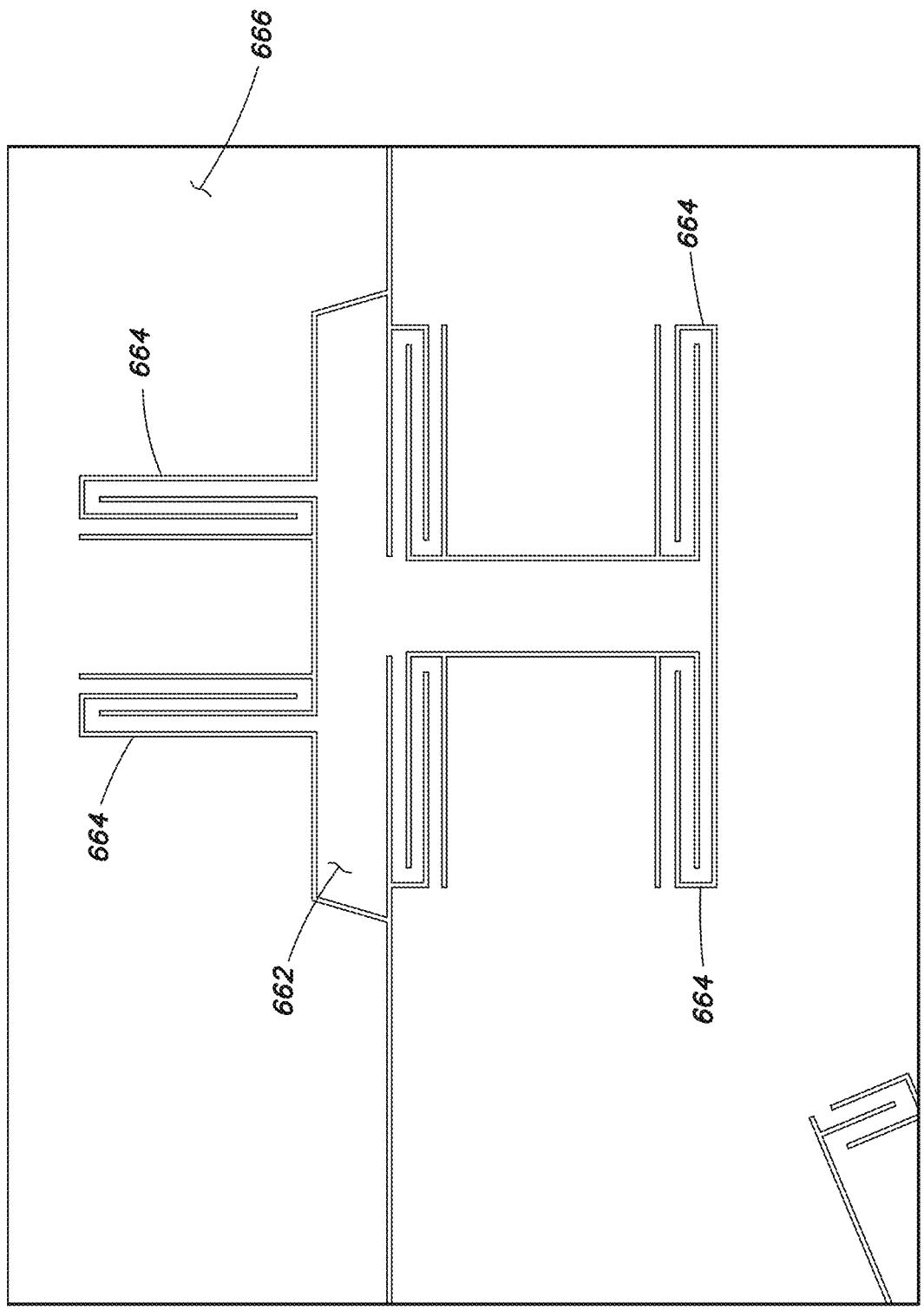
FIG. 6E is a diagram illustrating further detail of the MEMS based gyroscope shown in FIG. 6D according to aspects of the present invention.

FIG. 6D is a diagram illustrating another embodiment of a MEMS bases gyroscope 660 configured according to aspects of the present disclosure. The gyroscope 660 is similar to the gyroscope 650 discussed above with regard to FIG. 6B except that the gyroscope 650 includes outer shuttles 662, outer flexures 664, and outer anchors 666. FIG. 6E is a diagram illustrating further details of the outer shuttles 662, outer flexures 664, and outer anchors 666. According to one embodiment, the internal shuttles 653 and outer shuttles 662 are identical. This may simplify the design process of the gyroscope 660 and also has the benefit of being more symmetric. The outer shuttles 662 and inner shuttles 653 are both configured to move in a circumferential direction and not in a radial direction (e.g., differently than discussed above with regard to FIG. 1).

FIG. 6F is a diagram illustrating another embodiment of a MEMS based gyroscope 680 configured according to aspects of the present disclosure. The gyroscope 680 is substantially the same as the gyroscope 660 discussed above with regard to FIG. 6D except that the outer shuttles, outer flexures and outer anchors are configured differently. For example, as shown in FIG. 6F, the gyroscope 680 includes outer shuttles 682, outer flexures 684, and outer anchors 686.

Figure 7B:
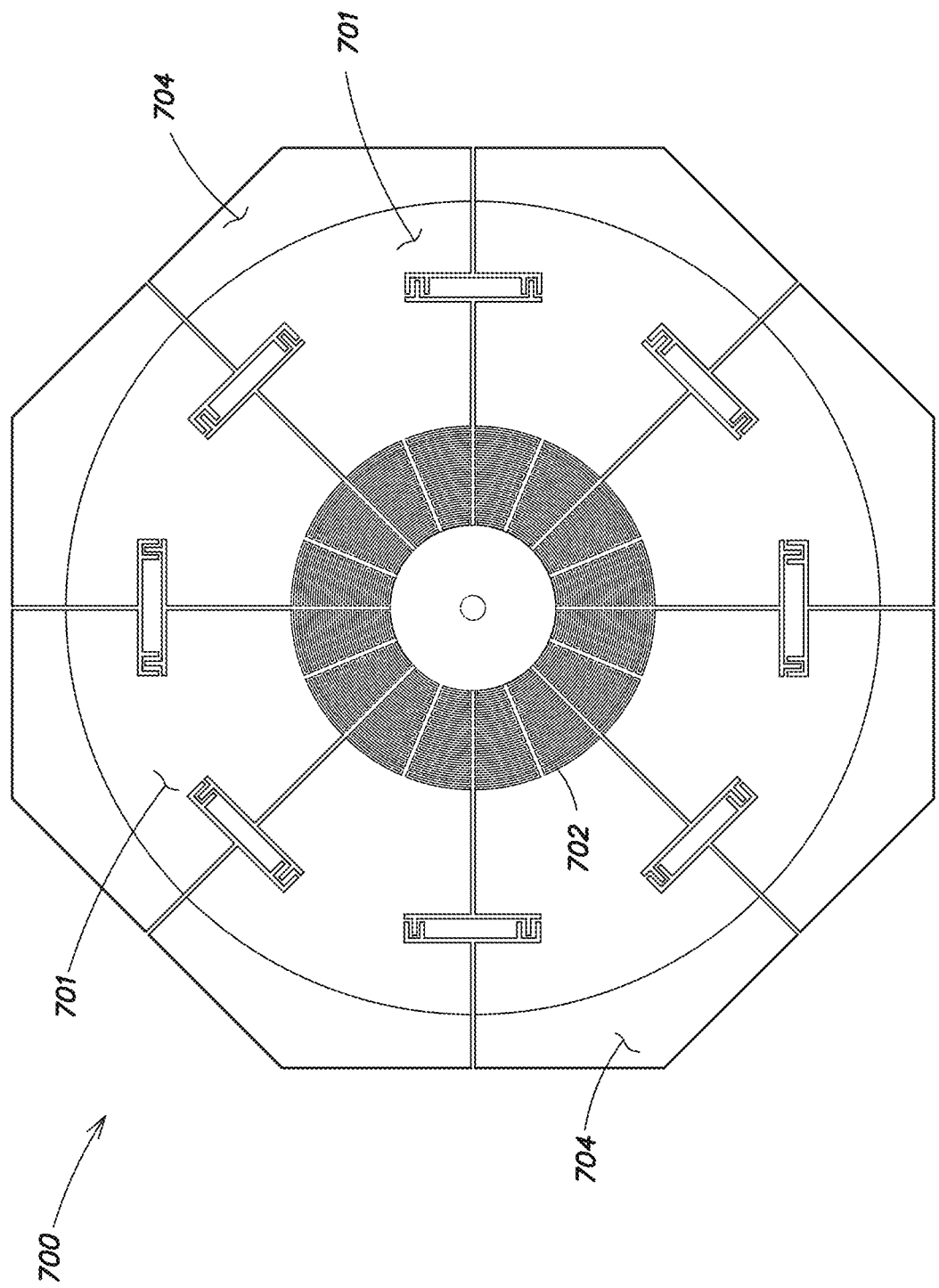
FIG. 7B is a diagram of another embodiment of a MEMS based gyroscope according to aspects of the present invention.

FIG. 7A is a diagram illustrating another embodiment of a MEMS based gyroscope 700 configured according to aspects of the present disclosure. The gyroscope 700 is similar to the gyroscope 100 discussed above with regard to FIG. 1 except that the gyroscope 700 does not include outside anchors or outside shuttles (e.g., as discussed above with regard to FIG. 6), does not include internal shuttles (e.g., such as internal shuttles 113 shown in FIG. 1) and the flexures 702 are configured differently in a serpentine configuration. FIG. 7B is a diagram illustrating the MEMS based gyroscope 700 and outer clapper electrodes 704 adjacent each mass 701 of the gyroscope 700. The outer clapper electrodes 704 are part of adjacent drive/sense transducers (e.g., the drive/sense transducers 116 shown in FIG. 1) utilized to drive and sense motion of the masses 701.

FIG. 8 is a diagram illustrating another embodiment of a MEMS based gyroscope 800 configured according to aspects of the present disclosure. The gyroscope 800 is similar to the gyroscope 100 discussed above with regard to FIG. 1 except that the gyroscope 800 does not include outside anchors or outside shuttles (e.g., as discussed above with regard to FIG. 6), does not include internal shuttles (e.g., such as internal shuttles 113 shown in FIG. 1) and the flexures 802 are configured differently in a stacked configuration. FIG. 9 is a diagram illustrating further details of the stacked configuration of flexures 802. In addition, unlike the mass-to-mass couplers 108 shown in FIG. 1, the gyroscope 800 utilizes different mass-to-mass couplers 804 to couple together adjacent masses. FIG. 10 is a diagram illustrating further details of a mass-to-mass coupler 804. The mass-to-mass coupler 804 is more stiff in the radial direction and more soft in the circumferential direction.

Figure 11:
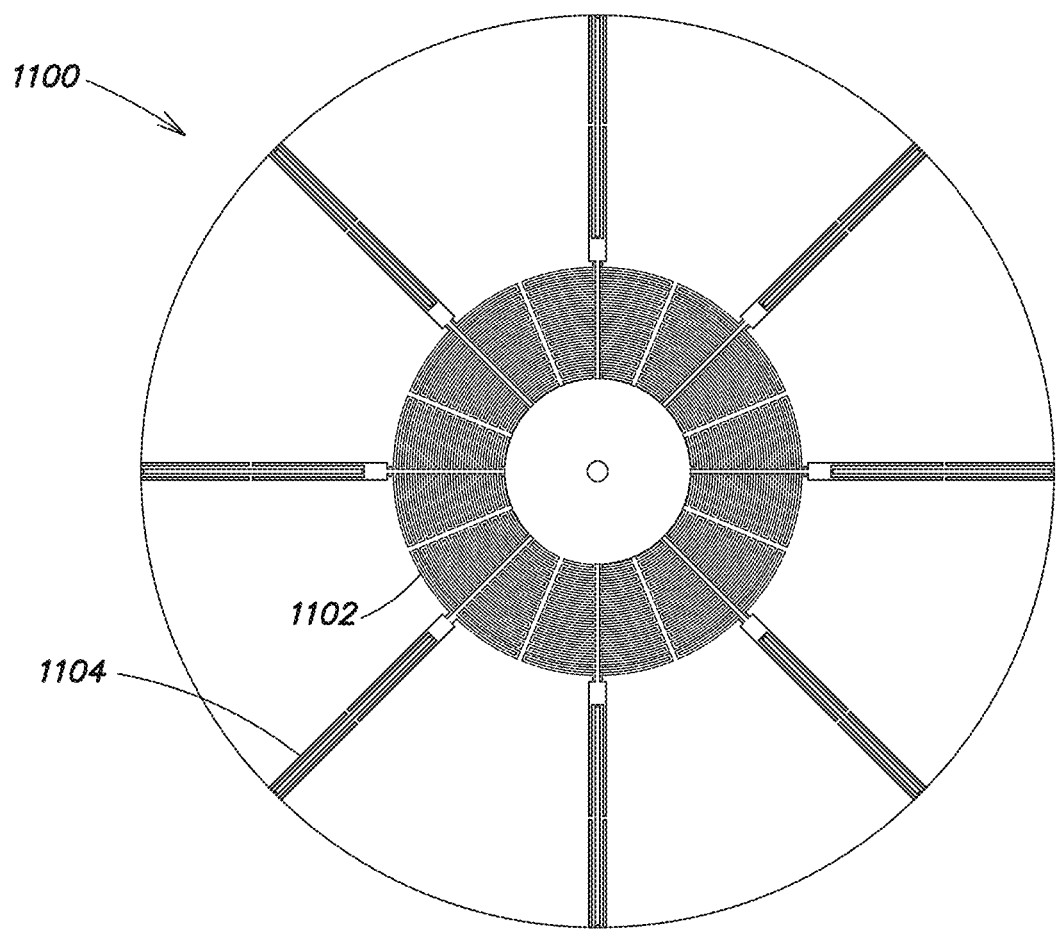
FIG. 11 is a diagram of another embodiment of a MEMS based gyroscope according to aspects of the present invention.

FIG. 11 is a diagram illustrating another embodiment of a MEMS based gyroscope 1100 configured according to aspects of the present disclosure. The gyroscope 1100 is similar to the gyroscope 100 discussed above with regard to FIG. 1 except that the gyroscope 1100 does not include outside anchors or outside shuttles (e.g., as discussed above with regard to FIG. 6), does not include internal shuttles (e.g., such as internal shuttles 113 shown in FIG. 1) and the flexures 1102 are configured differently in a serpentine configuration. In addition, unlike the mass-to-mass couplers 108 shown in FIG. 1, the gyroscope 1100 utilizes mass-to-mass flexures 1104 (e.g., as shown in FIG. 10) to couple together adjacent masses.

Figure 12:
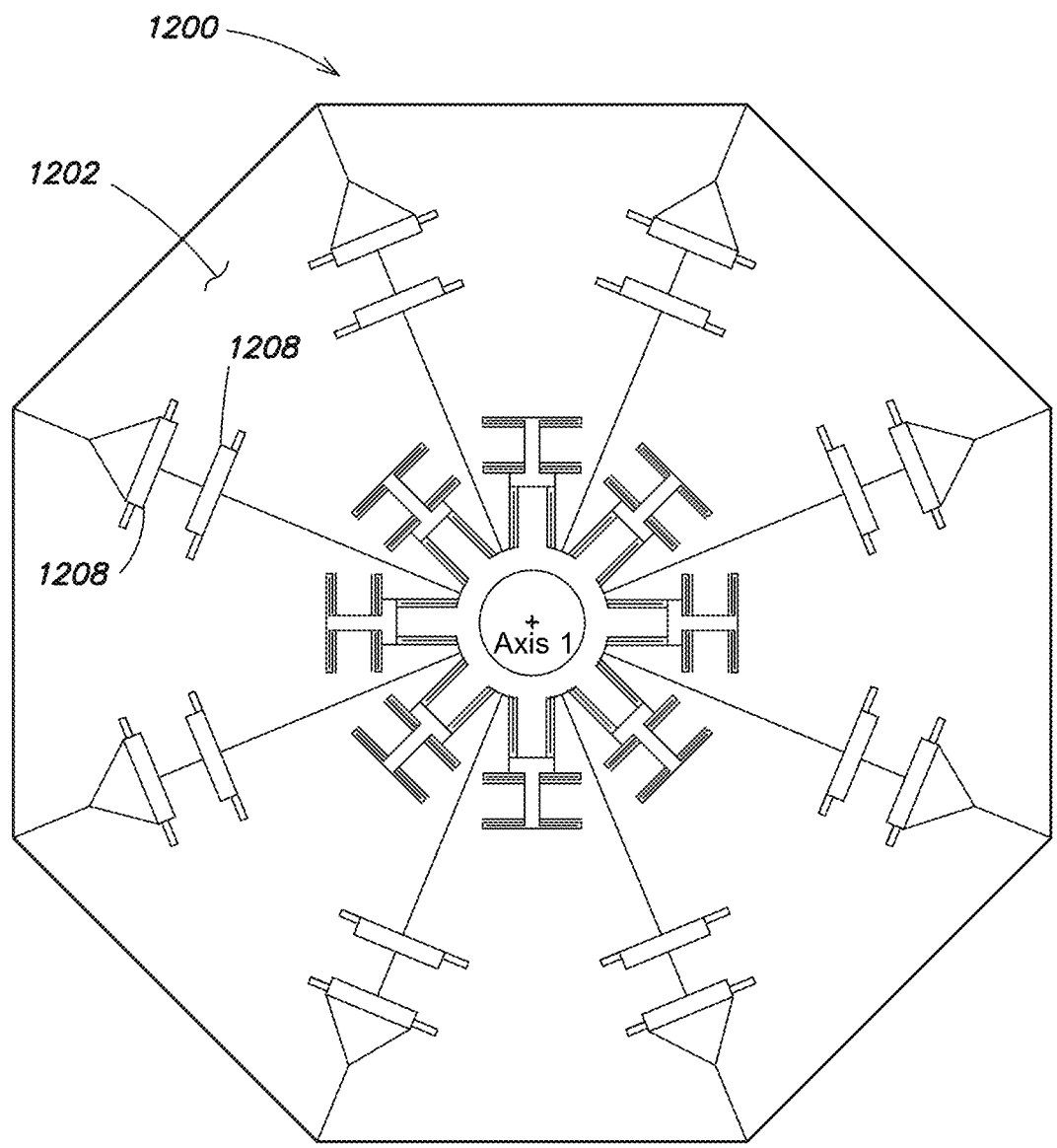
FIG. 12 is a diagram of another embodiment of a MEMS based gyroscope according to aspects of the present invention.

FIG. 12 is a diagram illustrating another embodiment of a MEMS based gyroscope 1200 configured according to aspects of the present disclosure. The gyroscope 1200 is similar to the gyroscope 100 discussed above with regard to FIG. 1 except that the gyroscope 1200 includes two mass-to-mass couplers 1208 coupled between each adjacent mass 1202, and the flexural hinges on the couplers are straight instead of folded.

Figure 13:
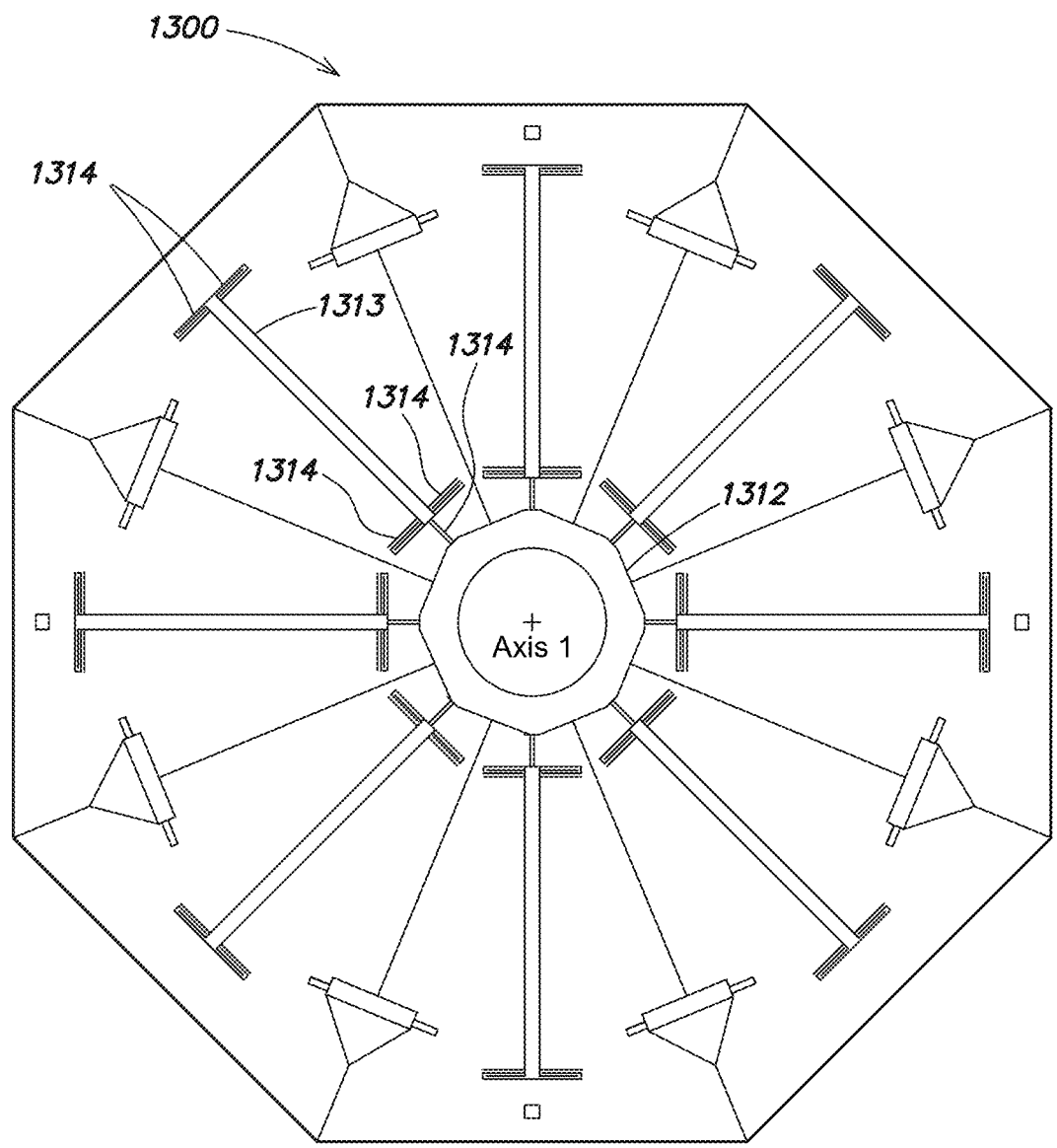
FIG. 13 is a diagram of another embodiment of a MEMS based gyroscope according to aspects of the present invention.

FIG. 13 is a diagram illustrating another embodiment of a MEMS based gyroscope 1300 configured according to aspects of the present disclosure. The gyroscope 1300 is similar to the gyroscope 100 discussed above with regard to FIG. 1 except that the gyroscope 1300 does not include outside anchors (e.g., such as outside anchors 114 shown in FIG. 1) or outside shuttles (e.g., such as outside shuttles 112 shown in FIG. 1), and the internal flexures 1314, internal shuttles 1313, and anchor 1312 are configured differently. For example, as shown in FIG. 13, the internal shuttles 1313 are extended length shuttles.

Figure 14:
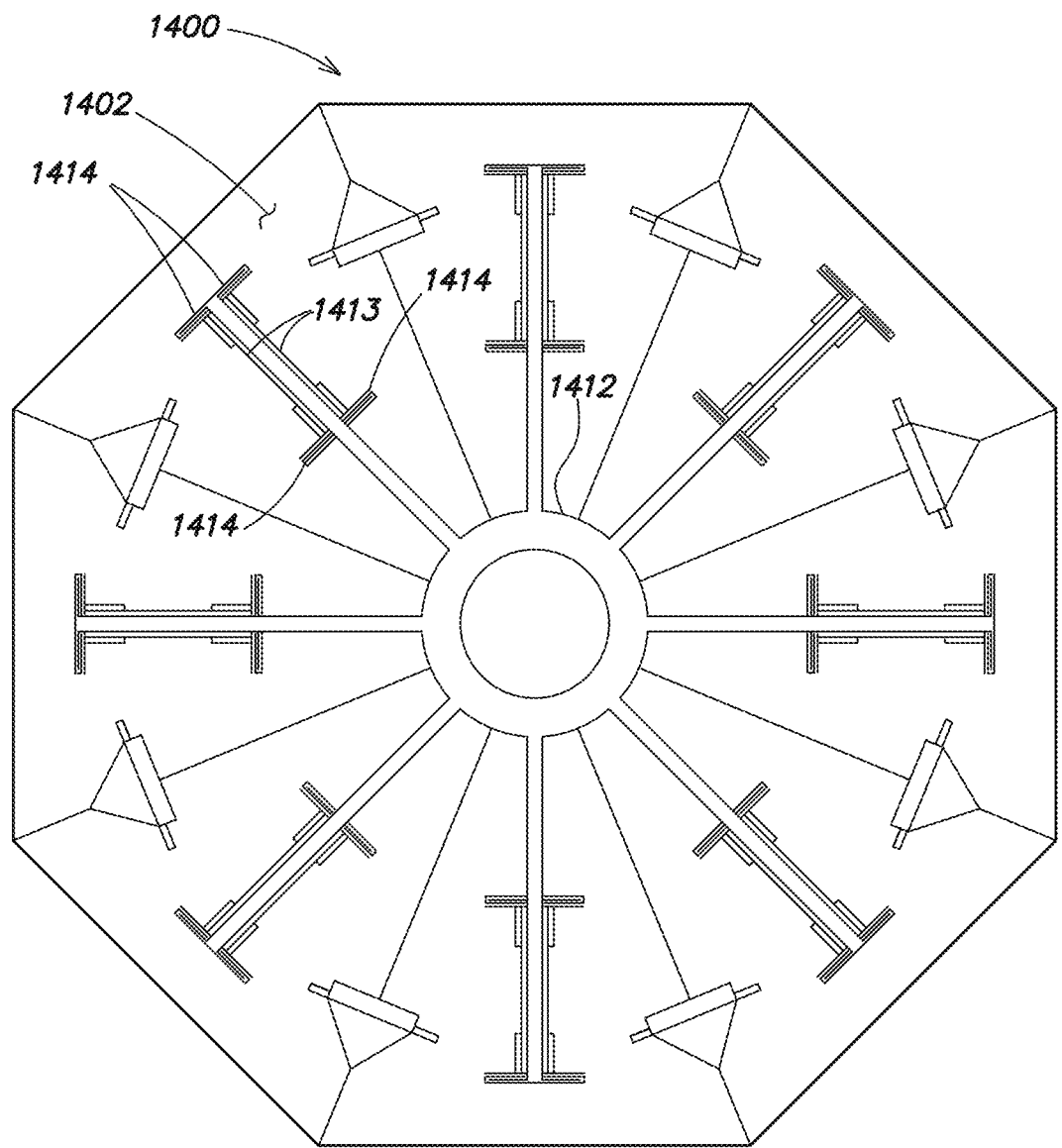
FIG. 14 is a diagram of another embodiment of a MEMS based gyroscope according to aspects of the present invention.

FIG. 14 is a diagram illustrating another embodiment of a MEMS based gyroscope 1400 configured according to aspects of the present disclosure. The gyroscope 1400 is similar to the gyroscope 100 discussed above with regard to FIG. 1 except that the gyroscope 1400 does not include outside anchors (e.g., such as outside anchors 114 shown in FIG. 1) or outside shuttles (e.g., such as outside shuttles 112 shown in FIG. 1), and the internal flexures 1414, internal shuttles 1413, and anchor 1412 are configured differently. For example, as shown in FIG. 14, each mass 1402 includes two extended length internal shuttles 1413 and the anchor 1412 extends into each mass 1402.

Figure 15:
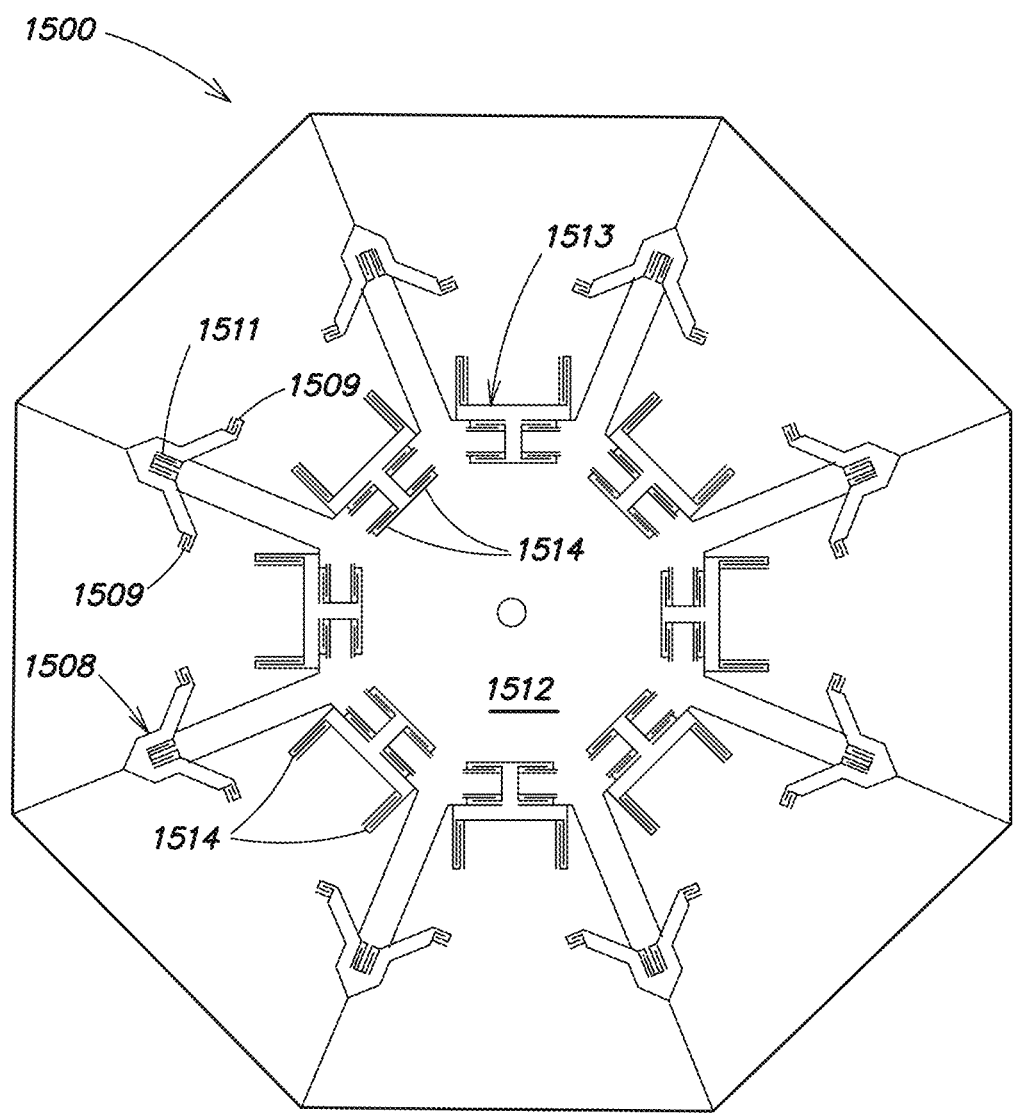
FIG. 15 is a diagram of another embodiment of a MEMS based gyroscope according to aspects of the present invention.
Figure 16:
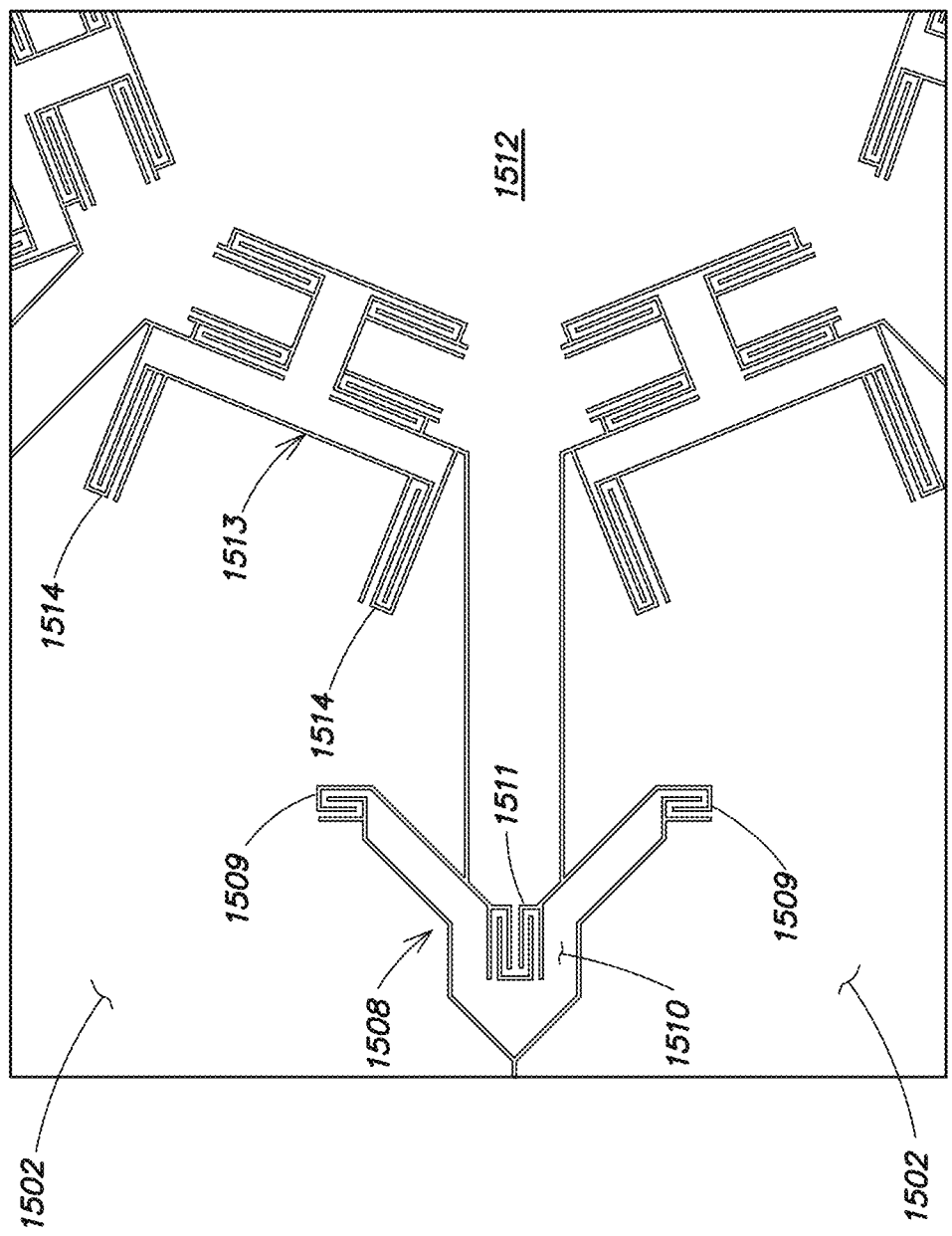
FIG. 16 is a diagram illustrating further detail of the MEMS based gyroscope shown in FIG. 15 according to aspects of the present invention.

FIG. 15 is a diagram illustrating another embodiment of a MEMS based gyroscope 1500 configured according to aspects of the present disclosure. The gyroscope 1500 is similar to the gyroscope 100 discussed above with regard to FIG. 1 except that the gyroscope 1500 does not include outside anchors (e.g., such as outside anchors 114 shown in FIG. 1) or outside shuttles (e.g., such as outside shuttles 112 shown in FIG. 1), and the internal flexures 1514, internal shuttles 1513, anchor 1512, and mass-to-mass couplers 1508 are configured differently. FIG. 16 is a diagram illustrating further detail regarding the internal flexures 1514, internal shuttles 1513, anchor 1512, and mass-to-mass coupler 1508. The anchor 1512 extends between each mass 1502. The mass-to-mass coupler 1508 includes a "stiff" bar 1510 that is coupled between adjacent masses 1502 via flexural hinges 1509. The bar 1510 is also coupled to the anchor 1512 via a flexural hinge 1511.

Figure 17B:
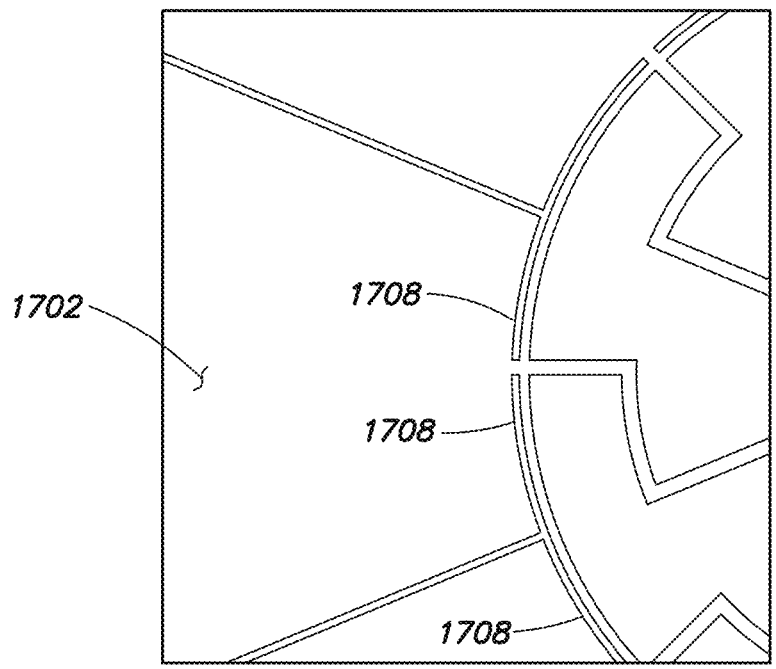
FIG. 17B is a diagram illustrating further detail of the MEMS based gyroscope shown in FIG. 17A according to aspects of the present invention.
Figure 17C:
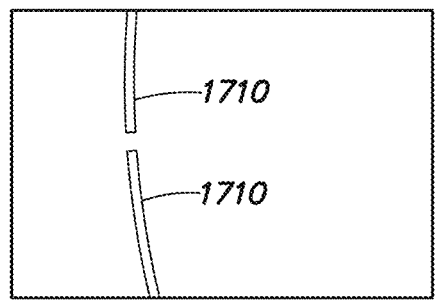
FIG. 17C is a diagram illustrating further detail of the MEMS based gyroscope shown in FIG. 17A according to aspects of the present invention.

FIG. 17A is a diagram illustrating another embodiment of a MEMS based gyroscope 1700 configured according to aspects of the present disclosure. The gyroscope 1700 is similar to the gyroscope 100 discussed above with regard to FIG. 1 except that the gyroscope 1700 does not include outside anchors (e.g., such as outside anchors 114 shown in FIG. 1) or outside shuttles (e.g., such as outside shuttles 112 shown in FIG. 1), and the internal flexures 1714, anchor 1712, and mass-to-mass couplers are configured differently. As shown in the gyroscope 1700 of FIG. 17, the mass-to-mass coupler includes an internal ring 1708 and an external ring 1710 which are configured to couple together adjacent masses 1702. For example, FIGS. 17B and 17C are diagrams illustrating further detail of the internal ring 1708 and the external ring 1710. According to one embodiment, the internal ring 1708 and external ring 1710 are single continuous rings. In another embodiment, the internal ring 1708 may include multiple independent portions, each portion configured to couple together two adjacent masses 1702. Similarly, the external ring 1710 may include multiple independent portions, each portion configured to couple together two adjacent masses 1702.

Figure 18:
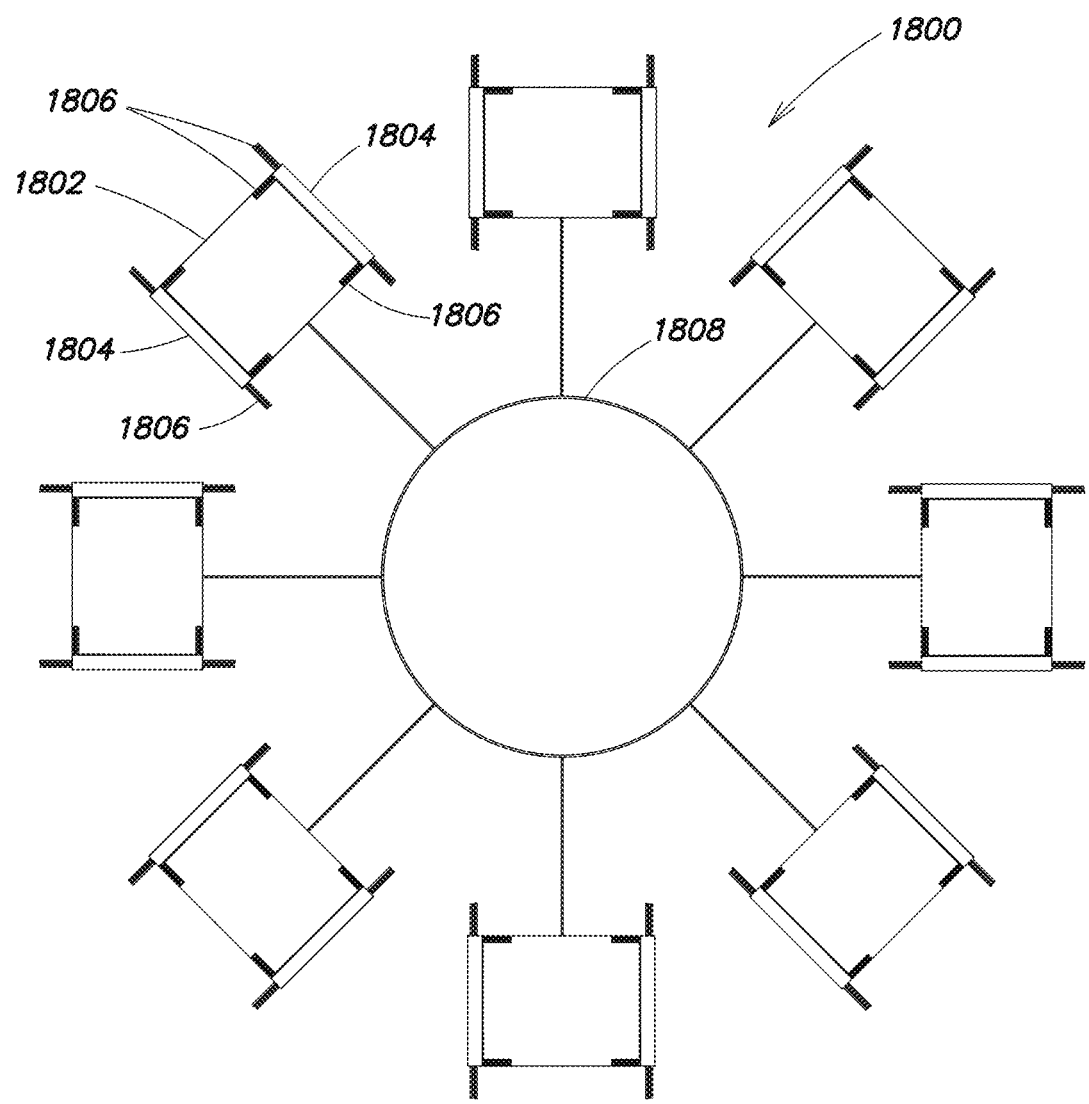
FIG. 18 is a diagram of another embodiment of a MEMS based gyroscope according to aspects of the present invention.
Figure 19:
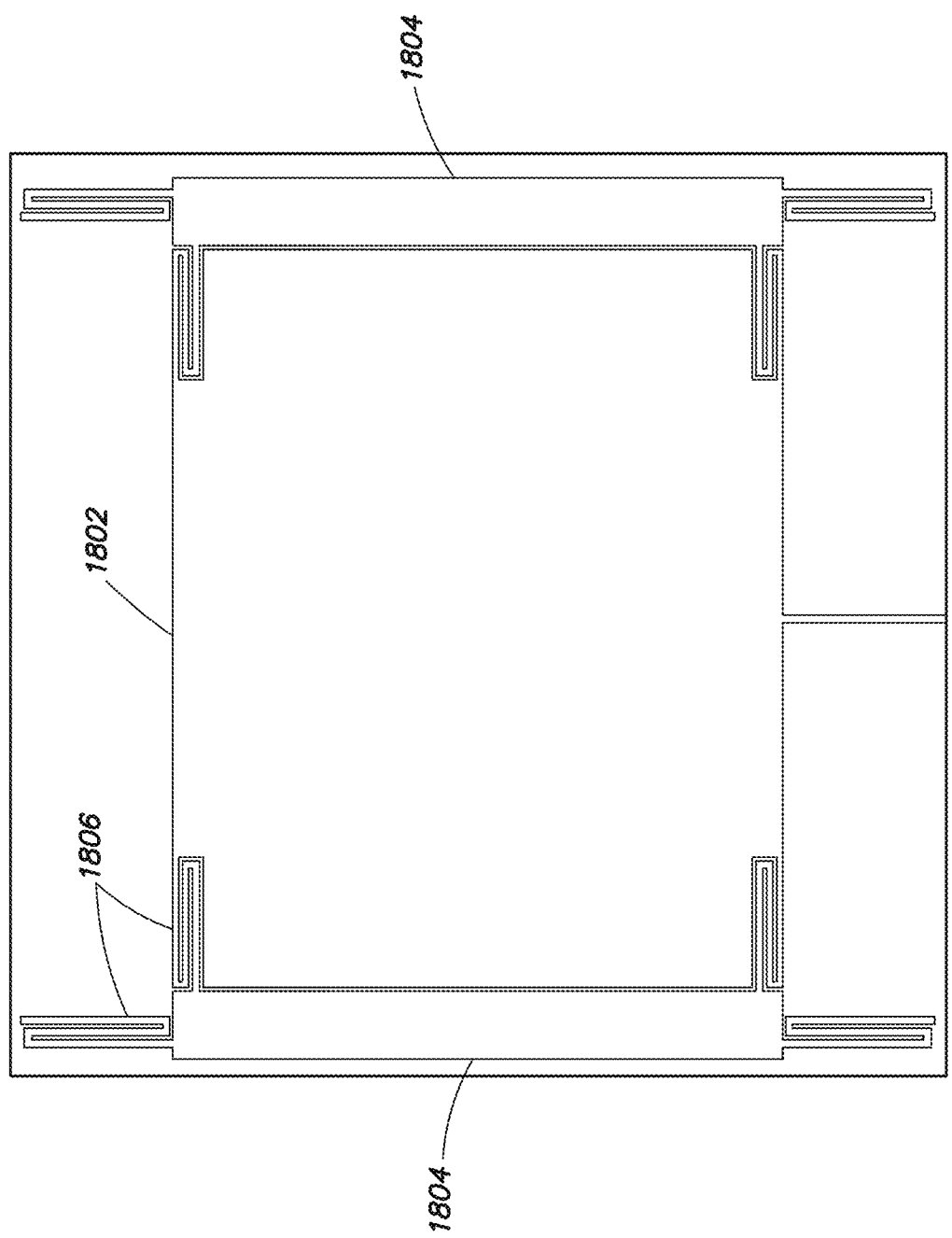
FIG. 19 is a diagram illustrating further detail of the MEMS based gyroscope shown in FIG. 18 according to aspects of the present invention.

FIG. 18 is a diagram illustrating another embodiment of a MEMS based gyroscope 1800 configured according to aspects of the present disclosure. The gyroscope 1800 includes a plurality of masses 1802. Each mass 1802 is suspended between two shuttles 1804 via flexures 1806. Each mass is also coupled to a ring 1808. The gyroscope 1800 operates in substantially the same way as the gyroscope 100 discussed above with regard to FIG. 1 except that with the gyroscope 1800, the ring 1808 acts as the mass-to-mass coupler. FIG. 19 is a diagram illustrating further details of the mass 1802, shuttles 1804, and flexures 1806.

As discussed above, the gyroscope 100 includes drive/sense transducers 116, each capable of driving motion of its corresponding mass 102 and of sensing motion of its corresponding mass 102. For example, in at least one embodiment, each drive/sense transducer 116 is an electrostatic transducer, for example a variable capacitor, that includes an electrode positioned at the periphery of a corresponding mass 102 and an electrode positioned on a corresponding outer shuttle 112. When a voltage is applied to the electrode at the periphery of the mass 102, motion of the mass is electrostatically driven. Each drive/sense transducer 116 is also configured to sense motion of its corresponding mass and provide a signal indicative of the motion to an external controller/processor 117.

Figure 20:
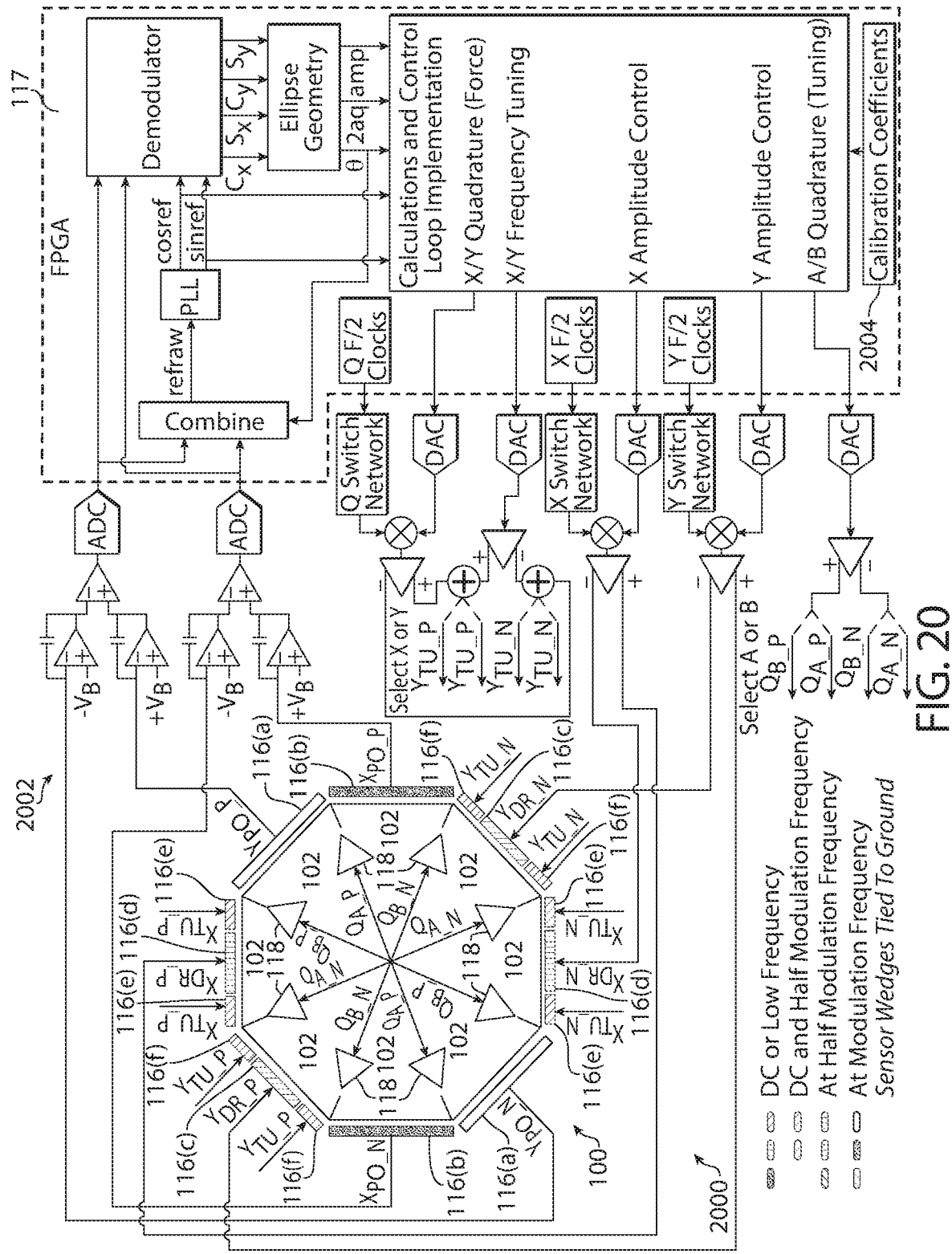
FIG. 20 is a block diagram of a control system for operating a MEMS based gyroscope according to aspects of the present invention.

FIG. 20 is a block diagram of a control system 2000 for operating the gyroscope 100 in a whole angle mode of operation according to at least one embodiment. The control system 2000 includes the processor 117, control logic 2002, and a plurality of drive/sense transducers 116. In one embodiment, the processor 117 is a Field Programmable Gate Array (FPGA); however, in other embodiments, the processor 117 may be another type of processor/controller. The processor 117 is coupled to the plurality of drive/sense transducers 116 via the control logic 2002 and is configured, as discussed above, to both drive and sense motion of the gyroscope 100 in a whole angle mode of operation.

More specifically, the processor 117 is coupled to a first pair of transducers 116(a) via a first portion of the logic circuitry 2002 and is configured to receive signals from the first pair of transducers 116(a), via the first portion of the logic circuitry 2002, corresponding to movement of the transducer pair's 116(a) corresponding masses 102 along a first axis (e.g., a Y axis). The processor 117 is also coupled to a second pair of transducers 116(b) via a second portion of the logic circuitry 2002 and is configured to receive signals from the second pair of transducers 116(b), via the second portion of the logic circuitry 2002, corresponding to movement of the transducer pair's 116(b) corresponding masses 102 along a second axis (e.g., an X axis). By analyzing the signals received from the transducers 116(a-b) corresponding to the motion of the corresponding masses along the first and second axes, the processor 117 can determine an angle of rotation of the gyroscope 100 as discussed above.

The processor 117 is also configured to drive motion of the gyroscope 100 such that the total vibrational amplitude of the two axes is sustained, but the distribution of energy between the two axes is allowed to change freely. More specifically, the processor 117 is coupled to a third pair of transducers 116(c) via a third portion of the logic circuitry 2002 and is configured to provide signals, along with the third portion of the logic circuitry 2002, to the third pair of transducers 116(c) to drive the amplitude of motion of the transducer pair's 116(c) corresponding masses 102 along the first axis (e.g., the Y axis). The processor 117 is also coupled to a fourth pair of transducers 116(d) via a fourth portion of the logic circuitry 2002 and is configured to provide signals, along with the fourth portion of the logic circuitry 2002, to the fourth pair of transducers 116(d) to drive the amplitude of motion of the transducer pair's 116(d) corresponding masses 102 along the second axis (e.g., the X axis).

The processor 117 is also configured to drive motion of the gyroscope 100 such that the frequency of each vibratory mode is equal. More specifically, according to at least one embodiment, the processor 117 is configured to tune the radial spring constant of each mass 102 in the gyroscope 100 as described above. For example, as shown in FIG. 20, the processor 117 is coupled to a fifth group of transducers 116(e) via a fifth portion of the logic circuitry 2002 and is configured to provide signals, along with the fifth portion of the logic circuitry 2002, to the fifth group of transducers 116(e) to tune the radial spring constant of each corresponding mass 102. The processor 117 is also coupled to a sixth group of transducers 116(f) via a sixth portion of the logic circuitry 2002 and is configured to provide signals, along with the sixth portion of the logic circuitry 2002, to the sixth group of transducers 116(f) to tune the radial spring constant of each corresponding mass 102. According to at least one embodiment, the processor 117 is also configured to operate angled electrodes 118 in the gyroscope 100, for example as described above, to trim the cross-spring term of adjacent masses 102. For example, as shown in FIG. 20, the processor 117 is coupled to the angled electrodes 118 via a seventh portion of the logic circuitry 2002 and is configured to provide signals, along with the seventh portion of the logic circuitry 2002, to the angled electrodes to trim the cross-spring term of adjacent masses 102.

Figure 21:
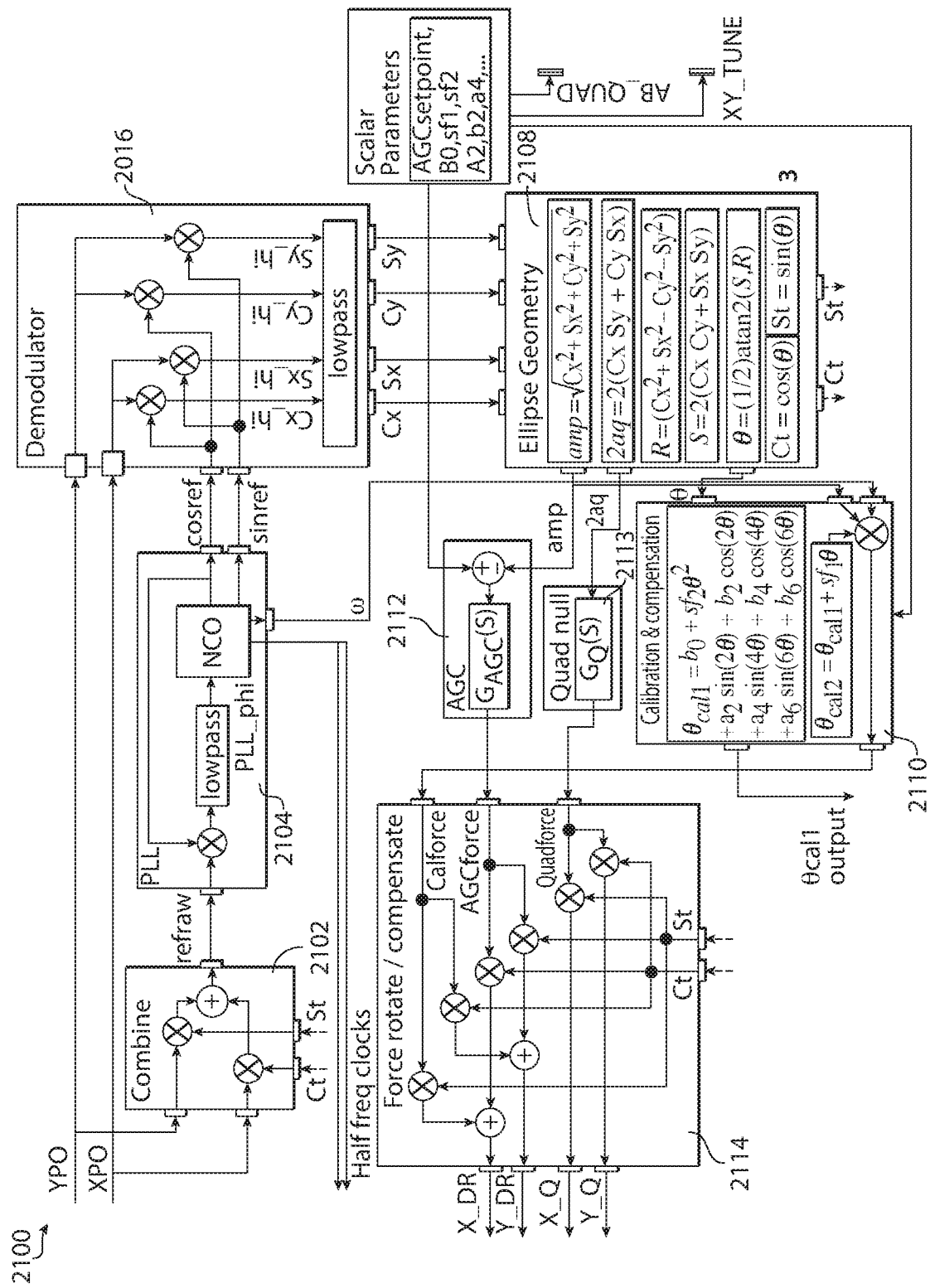
FIG. 21 is a block diagram of an FPGA according to aspects of the present invention.

As discussed above, according to one embodiment, the processor 117 is a Field Programmable Gate Array (FPGA) that operates, in conjunction with the control logic 2002 and the transducers 116, the gyroscope 100 in a whole angle mode of operation. For example, FIG. 21 is a block diagram of an FPGA 2100 that can be utilized in the control system 2000 (e.g., as the processor 117). The FPGA is coupled to the control logic 2002 and the transducers 116 and includes a combine module 2102, a Phase Locked Loop (PLL) module 2104, a demodulator 2106, an ellipse geometry module 2108, a calibration and compensation module 2110, an Automatic Gain Control (AGC) module 2112, a quadrature loop module 2113, and a force rotate/compensate module 2114. As described below, the FPGA 2100 (and its corresponding modules/components) utilizes regenerator loops, automatic gain control, quadrature control, and phase locked loops to operate the gyroscope in a whole angle mode of operation.

Sensor Equations of Motion

Single Mode Point Mass Model

Figure 22:
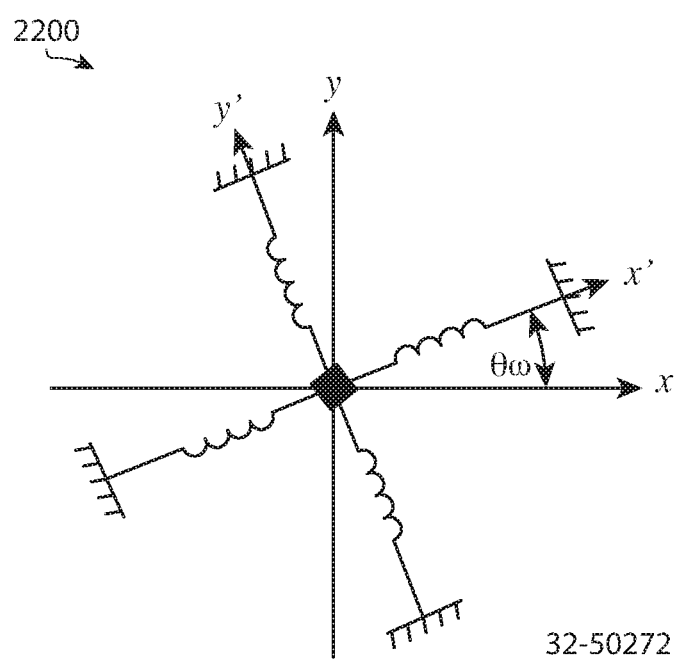
FIG. 22 is a single mode model according to aspects of the present invention.

In at least one embodiment, a gyroscope can be represented by a single mode model 2200 as shown in FIG. 22. As shown in FIG. 22, the x and y axes are physically separated by 90°. However, for the N=2 mode (as discussed above), the x and y axes are physically separated by 45°. Accordingly, a factor of two is included when converting from the model 2200 of FIG. 22 to physical measurements. For example, if the x and y axes are fixed to the substrate on which a gyroscope is implemented and are aligned with the pick off and forcer transducers, and the principal (p) coordinates are aligned with the mode's principal stiffness direction (where the cross stiffness ($k_{xy}$) is zero); in the principal coordinate frame the equations of motion are:

$$\ddot{x}_p - 2\Omega \dot{y}_p - \dot{\Omega} y_p + (\omega_1^2 - \Omega^2) x_p = f_1 \quad (1)$$

$$\ddot{y}_p + 2\Omega \dot{x}_p + \dot{\Omega} x_p + (\omega_2^2 - \Omega^2) y_p = f_2 \quad (2)$$

where $\omega_1, \omega_2$=natural frequencies of $x_p$ and $y_p$ motions.

$\Omega$=input angular rate of the substrate. This is the quantity that the gyroscope is intended to sense. $\Omega$ includes a slip factor, which according to at least one embodiment, is typically 0.6 to 0.8. The modal pattern precesses with respect to the substrate at, for example, 0.3 to 0.4 times the input rate. Multiplied by two to account for the N=2 mode.

$f_1, f_2$=control forces applied to the masses via the transducers 116.

Rotating Coordinate Frame

Displacements in the principal coordinates are related to those of the substrate coordinates through the rotation matrix from substrate to principal frame:

$$C_R = \begin{bmatrix} \cos[\theta_\omega] & \sin[\theta_\omega] \\ -\sin[\theta_\omega] & \cos[\theta_\omega] \end{bmatrix} \quad (3)$$

where $\theta_\omega$=angle from substrate to principal axes (e.g., as shown in FIG. 22). The positions in the principal axes frame are related to those of the substrate through:

$$\begin{bmatrix} x_p \\ y_p \end{bmatrix} = C_R \begin{bmatrix} x \\ y \end{bmatrix} \quad (4)$$

Using equation (4) and a similar relationship for the forces, the equations of motion in the substrate frame are:

$$\ddot{x} - 2\Omega\dot{y} - \dot{\Omega}y + k_{xy}y + (\omega_x^2 - \Omega^2)x = f_x \qquad (5)$$

$$\ddot{y} + 2\Omega\dot{x} + \dot{\Omega}x + k_{xy}x + (\omega_y^2 - \Omega^2)y = f_y \qquad (6)$$

where $f_x = x$ force defined in substrate frame
$\quad = f_1 \text{Cos}[\theta_\omega] - f_2 \text{Sin}[\theta_w]$ $f_y = y$ force defined in substrate frame
$\quad = f_1 \text{Cos}[\theta_\omega] + f_2 \text{Sin}[\theta_w]$ $k_{xy} = $ dimensionless cross stiffness
$\quad = \frac{1}{2}(\omega_1^2 - \omega_2^2)\text{Sin}[2\theta_\omega]$ $\omega_x^2 = $ dimensionless $x$ stiffness (substrate frame)
$\quad = \frac{1}{2}\{\omega_1^2 + \omega_2^2 + (\omega_1^2 - \omega_2^2)\text{Cos}[2\theta_\omega]\}$ $\omega_y^2 = $ dimensionless $y$ stiffness (substrate frame)
$\quad = \frac{1}{2}\{\omega_1^2 + \omega_2^2 - (\omega_1^2 - \omega_2^2)\text{Cos}[2\theta_\omega]\}$ The stiffness and cross stiffness are functions of the frame angle $\theta_\omega$.

Coarse Trim

The objective of a coarse trim is typically to reduce the stiffness cross coupling and frequency difference between axes to zero. A coarse trim may be necessary where there is limited authority of the fine control electrodes and/or the fine control reduces errors but because of loop dynamics and integrations, finite errors in rate and angle can still leak through. In at least one embodiment, the before coarse trimming quadrature can be large (equivalent to rad/s of input rate) so that reduction with DC voltage before applying fine control is required.

Applying voltages to trim electrodes implements negative springs. In at least one embodiment, the spring is aligned with the radius at an angle $\theta_t$, for example, 22.5° physically from the sense/drive electrodes or 45° for the point model. From equations (5) and (6), the trim electrode results in a cross-coupling in the sense/drive electrode frame $$\frac{k_t}{2}\text{Sin}[2 \times 2\theta_t] = \frac{k_t}{2},$$

which can be configured to offset any as-built quadrature. With cross-coupling removed, 0 and 45° (physical) can be used to adjust the resonant frequency difference. The gyroscope 100 shown in FIG. 1 includes triangular electrodes 118 designated for quadrature.

Closed Loop Control and Fine Trim

Ellipse Geometry

Figure 23:
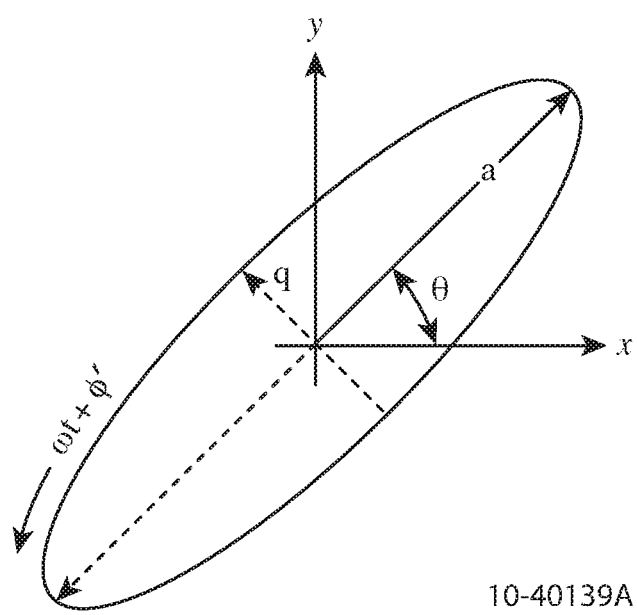
FIG. 23 is an illustration of a modal pattern according to aspects of the present invention.

Equations (1) and (2) for a whole angle gyroscope assume that the modal pattern (proof mass) follows an approximately elliptical path (e.g., as shown in FIG. 23). The elliptical path implies that harmonics of the modal frequency are relatively small and the following relationships exist between the ellipse parameters a, q, and θ (as shown in FIG. 23) and the demodulated outputs of the x and y pick offs. For the motion amplitude:

$$xamp = \sqrt{a^2 + q^2} = \sqrt{cx^2 + sx^2 + cy^2 + sy^2} \qquad (7)$$

The ellipse area indicates the quadrature, which is zeroed by the quadrature control loop:

$$taq = 2aq = 2(c_x s_y - c_y s_x) \qquad (8)$$

Calculated from the demodulated pick off signals, the output of the whole angle gyro is calculated per.

$$R = (a^2 - q^2)\text{Cos}[2\theta] = c_x^2 + s_x^2 - c_y^2 - s_y^2 \qquad (9a)$$

$$S = (a^2 - q^2)\text{Sin}[2\theta] = 2(c_x c_y + s_x s_y) \qquad (9b)$$

The estimated modal position is determined from $$\hat{\theta} = \frac{\text{Atan2}[S, R]}{2} \qquad (9c)$$

where a=amplitude of ellipse motion.
  q=quadrature of ellipse motion (e.g., in FIG. 23).
  θ=angular position of modal pattern (e.g., in FIG. 23).
  ^=Hat indicates a quantity in the computer or FPGA 2100 as opposed to a physical quantity.
  cx=in phase demodulated output of x mode pick off.
  sx=quadrature demodulated output of x mode pick off.
  cy=in phase demodulated output of x mode pick off.
  sy=quadrature demodulated output of y mode pick off.
  Atan 2=four quadrant calculation of tan[S/R].

In the equation (9c), the four quadrant arc tangent calculates angles between −π and π so that there is "2π logic."

Control Laws for Continuous Operation

Reference Signal and Phase Locked Loop

According one embodiment, the raw reference signal can be defined as a weighted sum of the x and y pick offs:

$$\text{refraw} = \text{Cos}[\hat{\theta}]x + \text{Sin}[\hat{\theta}]y \qquad (10)$$

In at least one embodiment, the x and y pick off signals are digitized and the calculation is done in the FPGA 2100 or a digital computer. The raw reference signal is in phase with the mode position and the signal refraw at the mode resonant frequency is demodulated by the Phase Locked Loop (PLL) 2104. Once the control loops have settled, refraw is a constant amplitude sine wave whose frequency changes slightly with θ, the angle of the modal pattern.

Figure 24:
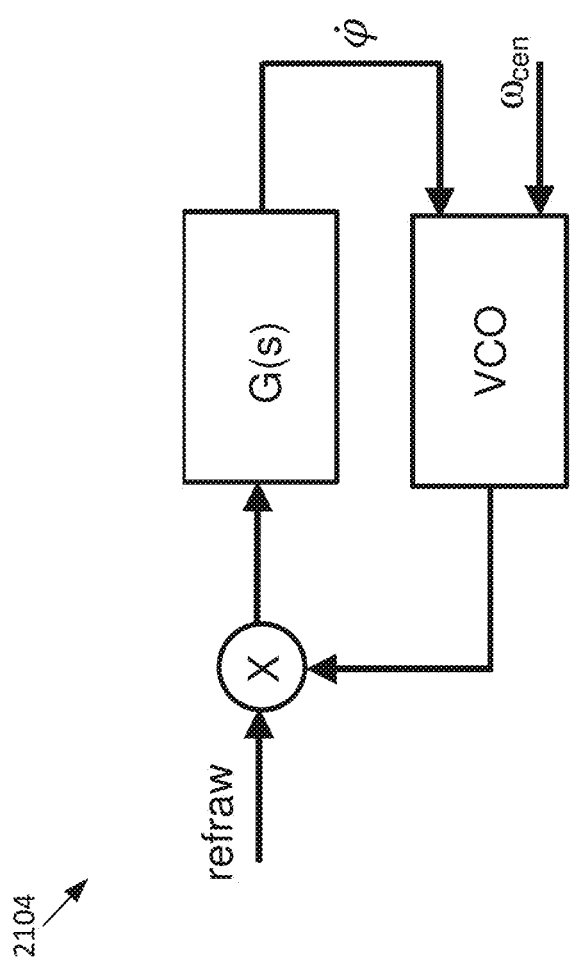
FIG. 24 is a block diagram of a Phase Locked Loop (PLL) according to aspects of the present invention.

The PLL 2104 generates in phase (cosine) and quadrature references from the raw reference. One example of a PLL 2104 is shown in FIG. 24 and represented by:

$$s\varphi(s) = L(\text{refraw} \times \text{Sin}[\omega_{cen}t + \varphi])G_{pll}(s) \qquad (11)$$

where φ=phase difference between reference signal and the VCO center frequency.

$G(s) = $ compensator $$= \frac{k_{pU}(s + a_{pU})}{s(s + b_{pU})}$$

$a_{pll}$=break frequency of compensator lead=$\omega_{pll}/\sqrt{\alpha}$
$b_{pll}$=break frequency of compensator lag=$\omega_{pll}\sqrt{\alpha}$ α=ratio of lag to lead frequencies (typically, for example, 6 to 10) for double integrator transfer function to obtain 40 to 50 degrees phase margin.

$\omega_{pll}$=PLL approximate roll off frequency (typically a percentage of the drive resonant frequency)

$k_{pll}$=compensator gain. The following equation results in the loop gain being 1 at the desired loop frequency $\omega_{pll}$.=$2\omega_{pll}^2 \alpha$/agcref s=Laplace transform of d/dt L=Laplace transform operator agcref=reference signal for AGC. Because xamp is compared to agcref, the 0-p amplitude of rawref is twice agcref.

By operation of the PLL 2104, the feedback signal −Sin[$\omega_{cen}t+\varphi$]=sin ref is out of phase with the position signal; therefore, it is the velocity reference used for the feedback in the regenerator loop. The PLL 2104 includes several integrators. G(s) yields two integrators while the VCO adds an additional integrator to the loop. Additional low pass or band filtering may be added.

Demodulated Pick Off Outputs

The demodulated outputs of the x and y pick offs are obtained, multiplied by the appropriate reference, and low pass filtered:

$$cx(s) = L[x(t) \cos \text{ref}] G_d(s) \quad (12)$$

$$sx(s) = L[x(t) \sin \text{ref}] G_d(s) \quad (13)$$

$$cy(s) = L[y(t) \cos \text{ref}] G_d(s) \quad (14)$$

$$sy(s) = L[y(t) \sin \text{ref}] G_d(s) \quad (15)$$

where sin ref=−Sin[$\omega_{cen}t+\varphi$]
cos ref=Cos[$\omega_{cen}t+\varphi$]
$G_d(s)$=low pass filter. An example is a second order filter:

$$G_d(s) = \text{low pass filter. An example is a second order filter:}$$

$$= \frac{\omega_d^2}{s^2 + 2\zeta_d \omega_d + \omega_d^2}$$

$\omega_d$=break frequency of demodulation filter. Typically smaller than the drive frequency.

$\zeta_d$=damping ratio of demodulation filter. Typically 0.5 to 0.7.

Mathematically, the regenerator force having an amplitude controlled by the Automatic Gain Control (AGC) loop 2112 is applied along the a axis of the ellipse. The AGC force is converted to the fixed x and y electrodes 116. The output of the low frequency AGC loop is multiplied by the sin ref, which is nominally in phase with the modal velocity:

$$f_a(s) = [\text{agcref} - \text{xamp}(s)] G_{AGC}(s) \quad (16)$$

where $$G_{AGC}(s) = \text{compensator}$$

$$= \frac{k_{AGC}(s + a_{AGC})}{s(s + b_{AGC})}$$

$a_{AGC}$=break frequency of compensator lead=$\omega_{AGC}/\sqrt{\alpha}$
$b_{AGC}$=break frequency of compensator lag=$\omega_{AGC}\sqrt{\alpha}$
α=ratio of lag to lead frequencies (typically, for example, 6 to 10) for double integrator transfer function to obtain 40 to 50 degrees phase margin.

$\omega_{AGC}$=AGC approximate roll off frequency (typically a percentage of the drive resonant frequency)

$k_{AGC}$ = compensator gain. The following results in the loop gain being 1 at the desired loop frequency $\omega_{AGC}$.

$$= 2m \, \alpha \, \omega_1 \omega_{AGC} \sqrt{\omega_{AGC}^2 + \left(\frac{\omega_2}{2Q_1}\right)^2}$$

As described above, the AGC compensator is described as two states; however, other roll offs can be used.

Quadrature Loop

Similar to the AGC loop module 2112, the quadrature loop module 2113 nulls the quantity 2aq measured in equation (8). Mathematically, the quadrature force is applied along the q axis of the ellipse. The quadrature force is converted to the fixed x and y electrodes 116. The output of the low frequency quadrature loop is multiplied by cosref, which is nominally in phase with the modal position:

$$f_q(s) = taq(s) G_q(s) \quad (17)$$

where $$G_q(s) = \text{compensator}$$

$$= -\frac{k_q(s + a_q)}{s(s + b_q)}$$

$a_q$=break frequency of compensator lead=$\omega_q/\sqrt{\alpha}$
$b_q$=break frequency of compensator lag=$\omega_q\sqrt{\alpha}$
α=ratio of lag to lead frequencies (typically, for example, 6 to 10) for double integrator transfer function to obtain 40 to 50 degrees phase margin.

$\omega_q$=quadrature loop approximate roll off frequency (typically a percentage of the drive resonant frequency)

$k_q$ = compensator gain. The following results in the loop gain being 1 at the desired loop frequency $\omega_q$.

$$= \frac{m \, \alpha \, \omega_1 \omega_q}{\text{agcref}} \sqrt{\omega_q^2 + \left(\frac{\omega_1}{2Q_1}\right)^2}$$

As described above, the quad loop compensator is described as two states; however, in other embodiments, different roll offs can be used. The quad loop gain differs from the AGC gain because the quad loop nulls 2aq. The fine trim does not include frequency matching as done in the coarse trim.

x and y Forces at Drive Frequency

In equations (16) and (17), the forces are low frequency envelopes defined in the frame of the modal pattern. Converted to the fixed electrode frame at drive frequency:

$$f_x = \cos[\hat{\theta}] f_a \sin \text{ref} + \sin[\hat{\theta}] f_q \cos \text{ref} \quad (18)$$

$$f_y = \sin[\hat{\theta}] f_a \sin \text{ref} - \cos[\hat{\theta}] f_q \cos \text{ref} \quad (19)$$

The force for the regeneration/AGC is applied along the ellipse's long axis while the quadrature force is applied along the short axis.

Dead Zone

Using the method of averaging, the pattern angle rate as a function of input rate and gyro parameters is derived as:

$$(\dot{\theta}+k\Omega_z)(a^2-q^2)-\frac{1}{2}\Delta\left(\frac{1}{\tau}\right)\sin 2(\theta-\theta_\tau)(a^2+q^2)- \quad (20)$$
$$\frac{1}{2}\Delta\omega\cos 2(\theta-\theta_\omega)(2aq)=\mathcal{R}\left[\frac{i}{2\omega}e^{-i\delta\phi}(F_q a-iF_a q)\right]$$

Assuming the quadrature loop nulls correctly, the pattern angle propagation can be modified to:

$$\dot{\theta}+S\Omega-\dot{\theta}_Q-\dot{\theta}_\alpha-\dot{\theta}_\gamma-\dot{\theta}_F=0 \quad (21)$$

Before calibration and corrections, the case rate is estimated from the pattern angle by:

$$\hat{\Omega}=-\frac{\dot{\theta}}{S}=\Omega+\frac{\dot{\theta}_Q+\dot{\theta}_\alpha+\dot{\theta}_\gamma}{2S} \quad (22)$$

where $\hat{\Omega}$=estimated input angular rate.
  S=slip factor modal pattern (roughly 0.75 for whole angle gyroscope in at least one embodiment. For n=2 the pattern move, for example, 0.37 times the case rate with respect to the case)
  θ=pattern angle with respect to gyro case
  $\dot{\theta}_Q/S$=bias from damping mismatch (22°/h 0-p, 0.003° 0-p at 1 rad/s input rotation)=Δ(1/τ) sin[2(θ−θ_τ)]/2S
  $\dot{\theta}_\alpha/S$=bias from frequency split and demodulation spill over (e.g., 43°/h 0-p, 0.006° 0-p at 1 rad/s input rotation)=Δω sin (α) cos[2(θ−θ_τ)]/2S $\dot{\theta}_\gamma/S$ = bias from forcer-pickoff misalignment (e.g., 0.4°/h constant bias)

$$=[\sin(\gamma)\frac{\omega}{Q}]/2S$$

$\dot{\theta}_{PO}/S$=bias from pick off gain mismatch (0.004° 0-p)=$\Delta k_{PO}\dot{\theta}$ cos (2θ)2S
  Q=nominal quality factor for n=2 mode
  Δ(1/τ)=time constant mismatch between modes (e.g., stability $10^{-4}$ 2 Q/ω)
  Δω=frequency mismatch between modes ($10^{-5}\times\omega$)
  ω=nominal resonant frequency for n=2 mode (e.g., 50×2π rad/s)
  α=phase error of demodulation (e.g., stability $10^{-5}$ rad)
  γ=pick off to forcer misalignment (e.g., stability $10^{-6}$ rad)
  $\Delta k_{PO}$=x and y pick off sensitivity relative mismatch (e.g., stability 0.01%)

Applicant has appreciated that in sensing motion of the gyroscope 100, for example as described above, there may be small input rates of the gyroscope 100 that go undetected. Such rates may be called "dead zones". For example, when the input angular rate is smaller than bias errors such as damping or resonant frequency mismatch, the pattern angle does not continually increase but becomes locked up; that is, the gyroscope will not detect low angular rate inputs (i.e. equation (3) is satisfied with $\dot{\theta}$=0 and constant pattern angle θ).

Rate errors such as the pick off mismatch, which include $\dot{\theta}$ terms are finite errors in angle since the time integral of $$\frac{\dot{\theta}_{PO}}{S}$$

is $\Delta k_{PO}$ sin (2θ)/4S. With whole angle operation, gyro pick off noise becomes white noise in angle rather than rate and is not Angle Random Walk (ARW). Calculations for angle random walk from Brownian motion are similar to those for rate vibrating gyro.

Calibration and Compensation to Reduce Dead Zone

According to at least one embodiment, the FPGA 2100 is configured to account for such "dead zones." For example, in at least one embodiment, based on the above equations, the rate "dead zone" of the gyroscope 100 is defined as:

$$\text{Rate "Dead Zone"}=\frac{1}{2k}\left(\frac{1}{\tau_x}-\frac{1}{\tau_y}\right) \quad (23)$$

where k is the slip factor, and τ is the time constant.

In one example, k=0.75 and τ=2Q/ωn ($10^5/(\eta 3\times 10^4$ Hz=1 s). In such an example, for a 1% mismatch, the rate "dead zone" is 0.0067 rad/s=1400°/h. In other embodiments, the variables k and τ may be other appropriate values, resulting in a different rate "dead zone". Per equation (21), the damping difference is one of several terms that can result in a "dead zone".

According to one embodiment, the FPGA 117 is configured to calibrate the coefficients 2004 of its gyroscope motion model to reduce the calculated rate "dead zone". More specifically, in at least one embodiment, the FPGA 117 is used to estimate the coefficients for the following equation:

$$\Omega=\text{Bias}+SF\frac{d\theta}{dt}+C_3\cos(2\theta)+C_4\sin(2\theta)+C_5\sin(4\theta)+ \quad (24)$$
$$C_6\sin(4\theta)+C_7\cos(6\theta)+C_8\sin(6\theta)+C_9\frac{d\theta}{dt}\cos(2\theta)+$$
$$C_{10}\frac{d\theta}{dt}\sin(2\theta)+C_{11}\frac{d\theta}{dt}\cos(4\theta)+C_{12}\frac{d\theta}{dt}\sin(4\theta)$$

For calibration, the input rate is known and the control algorithms estimate the pattern angle. The constants are determined by least squares or other techniques. The calibrations may be done with ramps in case rate, with case rate steps (calculations after transients pass), or with other rate trajectories. One can take this calculated rate, except for the $$SF\frac{d\theta}{dt}$$

term and cancel these terms from the gyroscope dynamics to define the compensated rate $\Omega_c$. The required pseudo-Coriolis force amplitude is estimated from the Coriolis force per:

$$F_{ce}=2m\Omega_c x_{amp}\omega_{PLL} \quad (25)$$

where $x_{amp}$=modal amplitude, the AGC loop reference
  $\omega_{PLL}$=instantaneous rate indicated by the PLL, which varies with θ because stiffness varies.
  m=modal mass Adding to equations (18) and (19), the new compensation is added to the x and y forcer which become:

$$f_x = \cos[\hat{\theta}] f_a \sin \text{ref} + \sin[\hat{\theta}] f_q \cos \text{ref} + \sin[\hat{\theta}] F_{ce} \sin \text{ref} \quad (26)$$

$$f_y = -\sin[\hat{\theta}] f_a \sin \text{ref} - \cos[\hat{\theta}] f_q \cos \text{ref} - \cos[\hat{\theta}] F_{ce} \sin \text{ref} \quad (27)$$

where $\hat{\theta}$=estimated pattern angle
cos ref=phase locked loop output in phase with the drive position
sin ref=phase locked loop output in phase with the drive velocity
$f_a$=oscillator drive force, the automatic gain control loop's output
$f_q$=quadrature nulling force, the quadrature nulling loop output The pseudo-Coriolis amplitude contains the drive amplitude (set by the AGC 2112) and the vibration frequency (indicated by the phase locked loop rate.) The applied Coriolis force is the Coriolis amplitude multiplied by the PLL in phase with the modal velocity and multiplied by $\cos(\theta)$ or $\sin(\theta)$ to resolve the force into components along the fixed forcers 116 so that the force drives along the modal pattern.

Because of the approximations in the Coriolis calculations and the compliance in the servo loops (i.e., finite bandwidth), according to at least one embodiment, the compensation generally requires several iterations before the residual errors become smaller than those induced by gyro noise sources.

The FPGA 2100 calibrates the coefficients of its gyroscope motion model such that the FPGA 2100 operates the transducers 116, for example as described above, based on the model to apply forces (e.g., $F_q$) to the gyroscope to reduce (or even eliminate) the rate "dead zone" and bias errors. By reducing the rate "dead zone" of the gyroscope 100, the FPGA 2100 can more accurately monitor the motion of the gyroscope 100.

Figure 25:
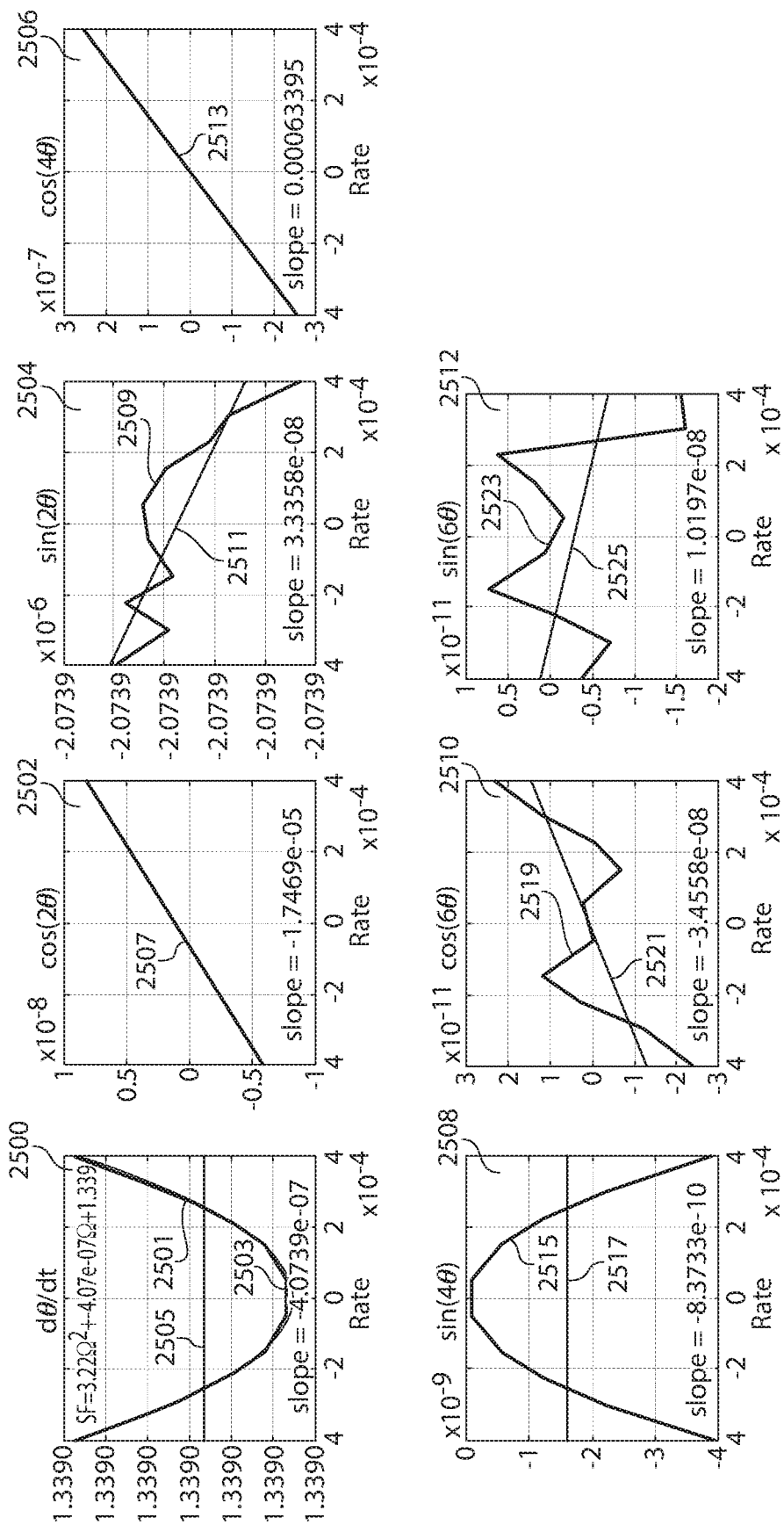
FIG. 25 includes graphs illustrating calibration of a MEMS based gyroscope according to aspects of the present invention.

FIG. 25 includes graphs illustrating coefficient calibration of the gyroscope 100. A first graph 2500 illustrates a scale factor of the gyroscope 100. The first graph 2500 includes a first trace 2501 representing the quadratic fit to $d\theta/dt$, a second trace 2503 representing the coefficients by iteration, and a third trace 2505 representing the linear fit to coefficients (slope value at bottom of graph).

A second graph 2502, third graph 2504, fourth graph 2506, fifth graph 2508, sixth graph 2510, and seventh graph 2512, illustrate multipoint coefficient calibration of the gyroscope 100. Each graph 2502-2512 represents a different coefficient iteration calculated to compensate for the rate "dead zone". The second graph 2502 includes a trace 2507 representing the linear fit to the $\cos(2\theta)$ coefficient. The third graph 2504 includes a first trace 2509 representing the $\sin(2\theta)$ coefficient by iteration and a second trace 2511 representing the linear fit to the $\sin(2\theta)$ coefficient. The fourth graph 2506 includes a trace 2513 representing the $\cos(4\theta)$ coefficient. The fifth graph 2508 includes a first trace 2515 representing the $\sin(4\theta)$ coefficient by iteration and a second trace 2517 representing the linear fit to the $\sin(4\theta)$ coefficient. The sixth graph includes a first trace 2519 representing the $\cos(6\theta)$ coefficient by iteration and a second trace 2521 representing the linear fit to the $\cos(6\theta)$ coefficient. The seventh graph 2512 includes a first trace 2523 representing the $\sin(6\theta)$ coefficient by iteration and a second trace 2525 representing the linear fit to the $\sin(6\theta)$ coefficient.

In one example, build imperfections are represented as: Kf=0.0001 (stiffness couple), b1=1.01 b2 (damping mismatch), and kpox=kpoy=1.01 (pick off gain); however in other embodiments, such variables may be defined differently.

As described above, the whole angle gyro control algorithms, (e.g., equations (7) through (27)), are implemented in the FPGA 2100; however, in other embodiments, the algorithms can be implemented in another type of digital logic.

As discussed above, in certain embodiments, the MEMS based gyroscope includes eight masses; however, in other embodiments, the MEMS based gyroscope may include any number of masses. For example, in one embodiment, the MEMS based gyroscope includes any number of masses that is greater than four and a multiple of four. As also discussed above, the MEMS based gyroscope includes wedge-shaped masses; however, in other embodiments, the masses may be configured in any appropriate shape capable of operating in the n=2 vibratory mode. As discussed above, the MEMS based gyroscope is operated in an n=2 vibratory mode; however, in other embodiments, the MEMS based gyroscope may be operated in some other vibratory mode. For example, in at least one embodiment, the MEMS based gyroscope includes 12 masses and is configured to operate in the n=3 vibratory mode. In other embodiments, the MEMS based gyroscope may be configured to operate in any other vibratory mode (e.g., n=3 vibratory mode, n=4 vibratory mode, n=5 vibratory mode, etc.) and may include an appropriate number of masses.

As discussed above, the control/calibration system and method to operate the gyroscope and reduce the rate "dead zone" of the gyroscope is described with respect to a MEMS based gyroscope including different large masses; however, in other embodiments, the calibration system and method may be utilized with any other type of whole angle gyroscope, such as a whole angle gyroscope with an axially symmetric (e.g., about a central point) and continuous structure, for example a ring gyroscope or HRG.

A new MEMS based gyroscope design is provided that combines the best features of a lumped element TF gyroscope and a rotationally symmetric gyroscope. The new design efficiently uses relatively large masses (e.g., like a TF gyroscope) on relatively weak flexures to provide high sensitivity while maintaining an eight-fold symmetry conducive to the n=2 vibratory mode used in most whole angle based gyroscopes to provide high dynamic range. The new design is capable of operating in both rate and whole angle mode, is low cost, and is easily fabricated.

According to one embodiment, the MEMS based gyroscope design discussed above may be utilized as a whole angle gyroscope in a miniature system. In another embodiment, the MEMS based gyroscope may be utilized as a whole angle gyroscope in a platform having a high rotation rate that requires a high dynamic range instrument. The MEMS based gyroscope may be utilized in any other whole angle application.

The MEMS based gyroscope design could also be used in any application where traditional MEMS gyroscopes are currently used. The combination of large masses on weak springs (providing high momentum and low damping) and matched modes (providing high gain) yields a low Angle Random Walk (ARW), one of the primary performance parameters for gyroscopes. Applicant has appreciated that an ARW on the order of 0.01 deg/rt-hr will be obtained with this gyroscope design and improvement of 10× (or more) could be possible by increasing the size of the gyroscope.

Various embodiments of systems and methods disclosed herein may have applications in various fields. Applications may encompass the field of precision inertial guidance and navigation, particularly in GPS denied environments. For example, embodiments may be used to guide platforms such as strategic missiles, submarines, Unmanned Underwater Vehicles (UUV), Unmanned Aerial Vehicles (UAV), cruise missiles, aircraft, and tactical munitions. Other examples of applications may include commercial aviation, self-driving vehicles, robotic machinery, personal navigation and consumer electronics such as various computing devices and mobile communication devices.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the disclosure. Accordingly, the foregoing description and drawings are by way of example only, and the scope of the disclosure should be determined from proper construction of the appended claims, and their equivalents.

What is claimed is:

1. A whole angle gyroscope comprising:
    a central point;
    at least one mass arranged symmetrically about the central point;
    a plurality of transducers, each configured to perform at least one of driving and sensing motion of the at least one mass; and
    a processor coupled to the plurality of transducers, the processor configured to:
        operate the plurality of transducers to drive the at least one mass in at least a first vibratory mode and a second vibratory mode;
        identify a rate dead zone of the whole angle gyroscope; and
        operate the plurality of transducers to apply a force to the at least one mass to reduce the identified rate dead zone of the whole angle gyroscope.

2. The whole angle gyroscope of claim 1, wherein in identifying the rate dead zone of the whole angle gyroscope, the processor is further configured to generate a motion model of the whole angle gyroscope and identify the rate dead zone based on the motion model.

3. The whole angle gyroscope of claim 2, wherein in operating the plurality of transducers to apply the force to the at least one mass, the processor is further configured to calibrate coefficients of the motion model to operate the plurality of transducers to apply the force to the at least one mass.

4. The whole angle gyroscope of claim 3, wherein in calibrating the coefficients of the motion model, the processor is further configured to perform multiple iterations of the coefficient calibration.

5. The whole angle gyroscope of claim 1, wherein the processor is a Field Programmable Gate Array (FPGA).

6. The whole angle gyroscope of claim 1, wherein each transducer is located at a periphery of the at least one mass.

7. The whole angle gyroscope of claim 1, wherein the processor is further configured to operate the plurality of transducers to drive the at least one mass in an n=2 vibratory mode.

8. The whole angle gyroscope of claim 7, wherein the processor is further configured to operate the plurality of transducers to drive motion of the at least one mass such that a total vibrational energy is maintained across the first vibratory mode and the second vibratory mode and to sense a distribution of energy between the first vibratory mode and the second vibratory mode.

9. The whole angle gyroscope of claim 8, wherein the plurality of transducers is further configured to provide signals to the processor based on the sensed distribution of motion between the first vibratory mode and the second vibratory mode, and
    wherein the processor is further configured to calculate an angle of rotation of the whole angle gyroscope based on the signals.

10. The whole angle gyroscope of claim 1, wherein the at least one mass comprises a plurality of masses, wherein the central point comprises a central anchor, wherein the whole angle gyroscope further comprises:
    a plurality of internal flexures, wherein each mass of the plurality of masses is coupled to the central anchor via at least one of the plurality of internal flexures and is configured to translate in a plane of the whole angle gyroscope;
    a plurality of mass-to-mass couplers, each mass-to-mass coupler coupled between two adjacent masses of the plurality of masses; and
    a plurality of transducers, each configured to perform at least one of driving and sensing motion of a corresponding one of the plurality of masses, and
    wherein the processor is further configured to:
        operate the plurality of transducers to drive the plurality of masses in at least the first vibratory mode and the second vibratory mode; and
        operate the plurality of transducers to apply the force to the plurality of masses to reduce the identified rate dead zone of the whole angle gyroscope.

11. The whole angle gyroscope of claim 10, wherein each mass-to-mass coupler includes a bar coupled to each adjacent mass via a flexural hinge, wherein the bar is configured to operate such that circumferential motion of one of the two adjacent masses of the plurality of masses to which it is coupled depends on radial motion of the other one of the two adjacent masses.

12. The whole angle gyroscope of claim 11, further comprising:
    a plurality of outside anchors;
    a plurality of outside shuttles, each located at a periphery of a corresponding one of the plurality of masses; and
    a plurality of outside flexures;
    wherein each mass of the plurality of masses is suspended between the central anchor and the plurality of outside anchors via the plurality of internal flexures and the plurality of outside flexures; and
    wherein each one of the plurality of outside shuttles is configured to restrict rotation of its corresponding one of the plurality of masses.

13. The whole angle gyroscope of claim 12, further comprising a plurality of internal shuttles, each one of the plurality of internal shuttles coupled between the central anchor and a corresponding one of the plurality of masses and configured to restrict rotation of its corresponding one of the plurality of masses.

14. The whole angle gyroscope of claim 10, further comprising a plurality of angled electrodes, each angled electrode coupled to a corresponding one of the plurality of masses and configured to trim the cross spring term of the corresponding one of the plurality of masses.

15. The whole angle gyroscope of claim 1, wherein the whole angle gyroscope is a Microelectromechanical System (MEMS) based gyroscope.

16. A method of operating a whole angle gyroscope comprising a central point, at least one mass arranged symmetrically about the central point, and a plurality of transducers, each configured to perform at least one of driving and sensing motion of the at least one mass, wherein the method comprises:

driving, with the plurality of transducers, the at least one mass in at least a first vibratory mode and a second vibratory mode;

identifying a rate dead zone of the whole angle gyroscope; and applying, with the plurality of transducers, a force to the at least one mass to reduce the identified rate dead zone of the whole angle gyroscope.

17. The method of claim 16, wherein identifying the rate dead zone comprises generating a motion model of the whole angle gyroscope and identifying the rate dead zone based on the motion model.

18. The method of claim 17, wherein applying the force to the at least one mass comprises calibrating coefficients of the motion model to operate the plurality of transducers to apply the force to the at least one mass.

19. The whole angle gyroscope of claim 18, wherein calibrating the coefficients of the motion model comprises performing multiple iterations of the coefficient calibration.

20. A whole angle gyroscope comprising:

a central point;

at least one mass arranged symmetrically about the central point;

a plurality of transducers, each configured to perform at least one of driving and sensing motion of the at least one mass; and means for driving the at least one mass in an n=2 vibratory mode, for identifying an angle of rotation of the whole angle gyroscope, and for reducing a rate dead zone of the whole angle gyroscope.

\* \* \* \* \*